(12) United States Patent
Chen et al.

(10) Patent No.: US 11,629,223 B2
(45) Date of Patent: Apr. 18, 2023

(54) SYNTHESIS OF POLYMERS FROM CYCLIC DIOLIDES

(71) Applicant: Colorado State University Research Foundation, Fort Collins, CO (US)

(72) Inventors: Eugene Y. Chen, Fort Collins, CO (US); Xiaoyan Tang, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 75 days.

(21) Appl. No.: 17/206,400

(22) Filed: Mar. 19, 2021

(65) Prior Publication Data

US 2021/0206912 A1 Jul. 8, 2021

Related U.S. Application Data

(63) Continuation of application No. 16/246,302, filed on Jan. 11, 2019, now Pat. No. 10,954,335.

(Continued)

(51) Int. Cl.
*C08G 63/08* (2006.01)
*C08L 67/04* (2006.01)
(Continued)

(52) U.S. Cl.
CPC .......... *C08G 63/08* (2013.01); *B01J 31/2243* (2013.01); *C08G 63/823* (2013.01); *C08L 67/04* (2013.01);
(Continued)

(58) Field of Classification Search
None
See application file for complete search history.

(56) References Cited

U.S. PATENT DOCUMENTS

| 6,469,133 B2 * | 10/2002 | Baker | C08G 63/823 |
| | | | 525/415 |
| 9,388,275 B2 * | 7/2016 | Coulembier | C08G 63/06 |
| 2019/0211144 A1 * | 7/2019 | Chen | C08G 63/08 |

FOREIGN PATENT DOCUMENTS

| EP | 0723983 A3 | 11/1997 |
| JP | 4770092 B2 | 9/2011 |

OTHER PUBLICATIONS

Ajellal et al., "Polymerization of Racemic Beta-Butyrolactone Using Supported Catalysts: A Simple Access to Isotactic Polymers.," Chem Commun (Camb)., 46(7):1032-1034, Feb. 2010.

(Continued)

*Primary Examiner* — Peter A Salamon
(74) *Attorney, Agent, or Firm* — Haukaas Fortius PLLC; Michael Haukaas

(57) ABSTRACT

Biodegradable polymers with advantageous physical and chemical properties are described, as well as methods for making such polymers. In one embodiment, a new chemical synthesis route to technologically important biodegradable poly(3-hydroxybutyrate) (P3HB) with high isotacticity and molecular weight required for a practical use is described. The new route can utilize racemic eight-membered cyclic diolide (rac-DL), meso-DL, or a rac-DL and meso-DL mixture, derived from bio-sourced dimethyl succinate, and enantiomeric (R,R)-DL and (S,S)-DL, optically resolved by metal-based catalysts. With a stereoselective racemic molecular catalyst, the ROP of rac-DL under ambient conditions produces rapidly P3HB with essentially perfect isotacticity ([mm]>99%), high crystallinity and melting temperature ($T_m$=171° C.), as well as high molecular weight and low dispersity ($M_n$=1.54×10$^5$ g/mol, =1.01).

10 Claims, 14 Drawing Sheets

Related U.S. Application Data

(60) Provisional application No. 62/671,069, filed on May 14, 2018, provisional application No. 62/616,277, filed on Jan. 11, 2018.

(51) Int. Cl.
 C08G 63/82 (2006.01)
 B01J 31/22 (2006.01)
 C08G 63/664 (2006.01)

(52) U.S. Cl.
 CPC .... *B01J 2531/0213* (2013.01); *B01J 2531/35* (2013.01); *B01J 2531/36* (2013.01); *C08G 63/664* (2013.01); *C08G 2230/00* (2013.01)

(56) References Cited

OTHER PUBLICATIONS

Carpentier, J., "Discrete Metal Catalysts for Stereoselective Ring-Opening Polymerization of Chiral Racemic b-Lactones," Macromol Rapid Commun., 31(19):1696-1705, Oct. 2010.

Carpentier, J., "Rare-Earth Complexes Supported by Tripodal Tetradentate Bis(phenolate) Ligands: A Privileged Class of Catalysts for Ring-Opening Polymerization of Cyclic Esters," Organometallics, 34(17):4175-4189, Aug. 2015.

Coulembier, et al., "From Controlled Ring-Opening Polymerization to Biodegradable Aliphatic Polyester: Especially Poly(B-Malic Acid) Derivatives," Prog Polym Sci., 31(8):723-747, Aug. 2006.

Le Borgne, et al., "Stereoselective Polymerization of B-Butyrolactone," Polymer, 30(12):2312-2319, Dec. 1989.

Ligny et al., "Highly Syndiotactic or Isotactic Polyhydroxyalkanoates by Ligand-Controlled Yttrium-Catalyzed Stereoselective Ring-Opening Polymerization of Functional Racemic β-Butyrolactone," Angew Chem Int Ed., 56(35):10388-10393, Jun. 2017.

Liu et al., "Cationic Rare-Earth Metal SALEN Complexes," Dalton Trans., (44):6170-6178, Nov. 2008.

Muhammadi et al., "Bacterial Polyhydroxyalkanoates-Eco-Friendly Next Generation Plastic: Production, Biocompatibility, Biodegradation, Physical Properties and Applications," Green Chem Lett Rev., 8(3-4):56-77, Oct. 2015.

Spassky et al., "Highly Stereoelective Polymerization of Rac-(D, L)-Lactide With a Chiral Schiff's Base/Aluminium Alkoxide Initiator," Macromol Chem Phys., 197(9):2627-2637, Sep. 1996.

Thomas C.M., "Stereocontrolled Ring-Opening Polymerization of Cyclic Esters: Synthesis of New Polyester Microstructures," Chem Soc Rev., 39(1):165-173, Jan. 2010.

* cited by examiner

SYNTHESIS OF POLYMERS FROM CYCLIC DIOLIDES

RELATED APPLICATIONS

This application is a continuation application of U.S. patent application Ser. No. 16/246,302, filed Jan. 11, 2019, which application claims priority under 35 U.S.C. § 119(e) to U.S. Provisional Patent Application Nos. 62/616,277 filed Jan. 11, 2018, and 62/671,069 filed May 14, 2018, the contents of each which are incorporated herein by reference in their entirety.

GOVERNMENT SUPPORT

This invention was made with government support under Grant No. 1664915 awarded by the National Science Foundation. The government has certain rights in the invention.

BACKGROUND OF THE INVENTION

Naturally produced poly(hydroxyalkanoate)s (PHAs) are a commercially important class of biodegradable/biocompatible aliphatic polyesters. The most extensively studied PHA, poly(3-hydroxybutyrate) (P3HB), is considered an attractive biodegradable alternative to petroleum-based plastics. P3HB is an attractive alternative to petroleum-based plastics due to its stereoregularity and properties resulting therefrom. However, high production costs and limited production volumes of naturally produced PHAs, including P3HB, currently renders their commercial use impractical.

In the context of creating a synthetic equivalent of naturally produced P3HB, both stereoregularity, more specifically high isotacticity, and high molecular weight are typically required for practical use. Current routes to synthetic P3HB include the ring opening polymerization (ROP) of β-butyrolactone (β-BL) via alkyl aluminoxanes, Zn, Co, Cr, Lanthanide, and Y initiator/catalyst complexes. Commercially viable ROP of β-BL in these processes has required the use of the racemic monomer, rac-β-BL. Unfortunately, these initiator/catalyst complexes do not yield P3HB with the desired stereoregularity and desired properties resulting therefrom nor the high molecular weight necessary for a synthetic equivalent of naturally produced P3HB to be commercially viable.

Accordingly, there is a need for a new synthetic route to produce highly stereoregular P3HB of high molecular weight. There is also a need for a new initiator/catalyst complex for use in the production of the highly stereoregular P3HB of high molecular weight.

SUMMARY

The invention provides technologically important biodegradable polymers with physical and chemical properties required for practical use. The invention also provides methods for making such polymers. Accordingly, the invention provides a highly isotactic polymer comprising Formula I:

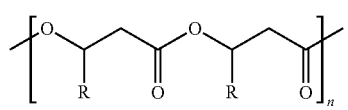

wherein:
n is about 10 to about 10,000;
R is $(C_1-C_{18})$alkyl, $(C_1-C_8)$alkenyl, $(C_1-C_8)$alkynyl, benzyl, or aryl; and
Formula I comprises at least 95% isotactic triads with respect to the stereocenters of substituents R on the polymer chain, wherein the at least 95% isotactic triads (mm) have consecutive (R) stereochemical configurations or consecutive (S) stereochemical configurations.

In one embodiment, the polymer comprises at least 99% isotactic triads with respect to the stereocenters of substituents R on polymer chain.

In various embodiments, the molecular weight $M_n$ is at least about 100 kDa.

In various embodiments, the polymer has a melting temperature, $T_m$, of at least 170° C.

The invention also provides a composition comprising polymers described herein, such as those of Formula I above, wherein the composition comprises approximately equal amounts of polymers having isotactic triads of (R) stereochemical configurations and polymers having isotactic triads of (S) stereochemical configurations.

The dispersity index $M_w/M_n$ of the polymers described herein can be less than 1.2.

Copolymers described herein can include a polymer described herein in combination with a polyester of lactone monomers.

The invention further provides a copolymer comprising Formula II:

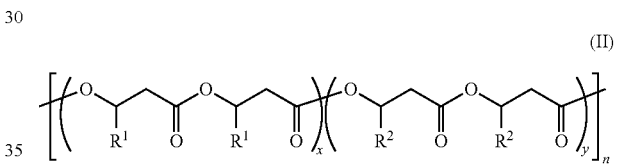

wherein:
x is about 1 to about 100;
y is about 1 to about 100;
n is about 10 to about 5,000;
each $R^1$ is $(C_1-C_{18})$alkyl, $(C_1-C_8)$alkenyl, $(C_1-C_8)$alkynyl, benzyl, or aryl;
each $R^2$ is $(C_1-C_{18})$alkyl, $(C_1-C_8)$alkenyl, $(C_1-C_8)$alkynyl, benzyl, or aryl;
the x block of Formula II comprises at least 95% isotactic triads with respect to the stereocenters of substituents $R^1$ on the polymer chain, wherein the at least 95% isotactic triads (mm) have consecutive (R) stereochemical configurations or consecutive (S) stereochemical configurations; and
the y block of Formula II comprises at least 95% isotactic triads with respect to the stereocenters of substituents $R^2$ on the polymer chain, wherein the at least 95% isotactic triads (mm) have consecutive (R) stereochemical configurations or consecutive (S) stereochemical configurations;
wherein the polymer of Formula II is an isotactic random copolymer.

The invention yet further provides a copolymer comprising Formula III:

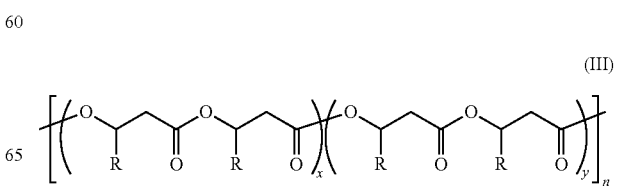

wherein:
x is about 10 to about 5,000;
y is about 10 to about 5,000;
n is 1-50;
each R is $(C_1-C_{18})$alkyl, $(C_1-C_8)$alkenyl, $(C_1-C_8)$alkynyl, benzyl, or aryl;
the x block of Formula III comprises at least 95% isotactic triads with respect to the stereocenters of substituents R on the polymer chain, wherein the at least 95% isotactic triads (mm) have consecutive (R) stereochemical configurations or consecutive (S) stereochemical configurations; and
the y block of Formula III comprises consecutive R groups having (R) and (S) configurations, consecutive R groups having (S) and (R) configurations, or consecutive R groups having stereochemical configurations the opposite of the main stereochemical configuration of the x block;
wherein the polymer of Formula III is an isotactic-b-syndiotactic stereodiblock or stereotapered copolymer.

The invention additionally provides a copolymer comprising Formula IV:

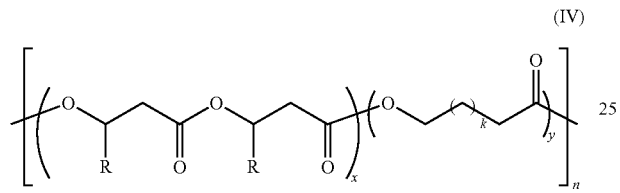

(IV)

wherein:
x is about 1 to about 100;
y is about 1 to about 100;
k is about 1 to 16;
n is 10 to about 5,000;
R is $(C_1-C_{18})$alkyl, $(C_1-C_8)$alkenyl, $(C_1-C_8)$alkynyl, benzyl, or aryl; and
the x block of Formula IV comprises at least 95% isotactic triads with respect to the stereocenters of substituents R on the polymer chain, wherein the at least 95% isotactic triads (mm) have consecutive (R) stereochemical configurations or consecutive (S) stereochemical configurations.

The invention also provides a metal complex of Formula X:

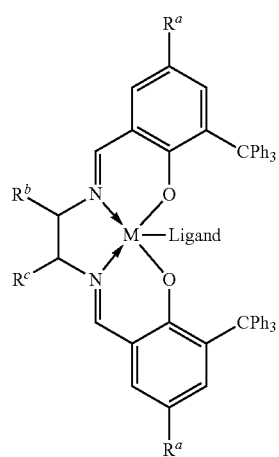

(X)

wherein:
M is Sc, Y, or a lanthanide(III) metal;
Ligand is —OR$^x$, —NR$^x_2$, or —N(SiR$^y_3$)$_2$, wherein R$^x$ is alkyl, and each R$^y$ is H or alkyl, wherein at least two R$^y$ groups are alkyl;

R$^a$ is H, alkyl, or phenyl; and
R$^b$ and R$^c$ are H, alkyl, or phenyl; or
R$^b$ and R$^c$ together with the carbon atoms to which they are attached form a 5, 6, 7, or 8 membered cycloalkyl group.

In one embodiment, the metal complex is the complex 4d:

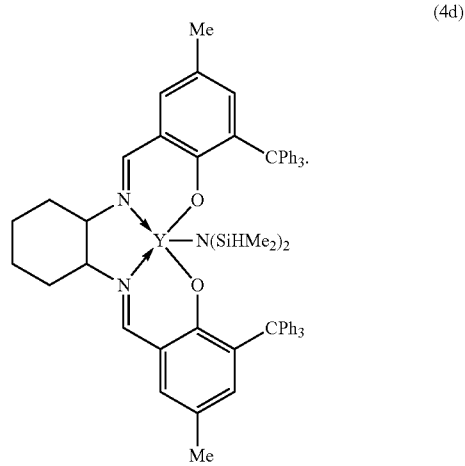

(4d)

The invention also provides a method for preparing an isotactic or syndiotactic polymer of Formula I:

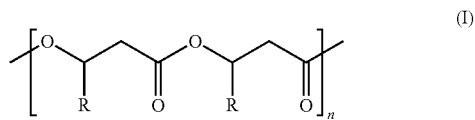

(I)

wherein:
n is about 10 to about 10,000; and
R is $(C_1-C_{18})$alkyl, $(C_1-C_8)$alkenyl, $(C_1-C_8)$alkynyl, benzyl, or aryl;
the method comprising contacting one or more monomers, an effective amount of a metal complex, and an alcohol initiator to initiate a ring opening polymerization reaction;
wherein:
the monomer is a monomer of Formula V:

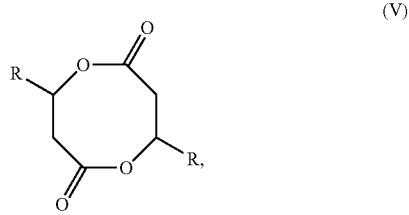

(V)

wherein R is as defined for Formula I; and
the metal complex is a metal complex of Formula X, for example, the metal complex 4d; to thereby form the isotactic or syndiotactic polymer of Formula I.

In one embodiment, Formula I comprises at least 95% isotactic triads with respect to the stereocenters of substituents R on the polymer chain, wherein the at least 95% isotactic triads (mm) have consecutive (R) stereochemical configurations or consecutive (S) stereochemical configurations.

In another embodiment, the monomer of Formula V is a racemic mixture, the metal complex of Formula X is a racemic mixture, and the polymers of Formula I formed are a mixture of highly isotactic (R) polymers and highly isotactic (S) polymers.

In further embodiments, the polymer of Formula I has a molecular weight $M_n$ of at least 40 kDa, a dispersity index of less than 1.2, and a melting temperature, $T_m$, of at least 171° C.

In additional embodiments, the monomer of Formula V is a meso diastereomer, and the polymers of Formula I formed are highly syndiotactic polymers wherein probability of racemic linkages between monomers, $P_r$, is greater than 0.94 and the melting temperature, $T_m$, of the polymers formed is greater than 174° C.

The invention also provides a method for preparing a polymer of Formula II:

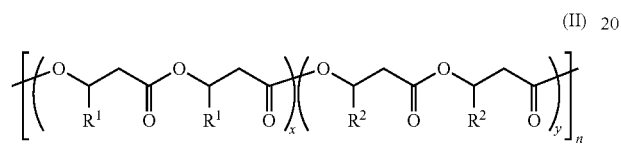

wherein:
  x is about 1 to about 100;
  y is about 1 to about 100;
  n is about 10 to about 5,000;
  each $R^1$ is $(C_1-C_{18})$alkyl, $(C_1-C_8)$alkenyl, $(C_1-C_8)$alkynyl, benzyl, or aryl;
  each $R^2$ is $(C_1-C_{18})$alkyl, $(C_1-C_8)$alkenyl, $(C_1-C_8)$alkynyl, benzyl, or aryl;
  the method comprising contacting two or more monomers, an effective amount of a metal complex, and an alcohol initiator to initiate a ring opening polymerization reaction;
  wherein:
  the two or more monomers are monomers of Formula V-A and V-B:

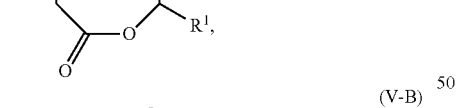

wherein $R^1$ and $R^2$ are as defined for Formula II; and
the metal complex is a metal complex of Formula X, for example, the metal complex 4d; to thereby form a isotactic, syndiotactic, or isotactic-b-syndiotactic stereodiblock or stereotapered polymers polymer of Formula II.

In one embodiment, the monomers of Formulas V-A and V-B comprise a mixture of meso and racemic diastereomers and the polymers formed are isotactic-b-syndiotactic stereodiblock or stereotapered polymers.

In another embodiment, the monomers of Formulas V-A and V-B comprise a mixture of racemic monomers wherein $R^1$ of Formula V-A is different than $R^2$ of Formula V-B, and the polymers formed are isotactic random copolymers.

In further embodiments, the monomers of Formulas V-A and V-B comprise a mixture of meso and racemic diastereomers, and wherein $R^1$ of Formula V-A is different than $R^2$ of Formula V-B, and the polymers formed are isotactic-b-syndiotactic diblock copolymers or stereotapered copolymers.

The invention yet further provides a method of kinetically resolving a racemic mixture of diolides comprising (R,R)-diolides and (S,S)-diolides of Formula V:

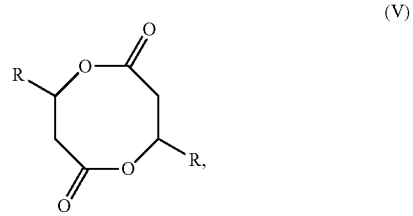

wherein R is $(C_1-C_6)$alkyl, $(C_1-C_6)$alkenyl, $(C_1-C_6)$alkynyl, benzyl, or aryl;
  the method comprising contacting the racemic mixture of diolides of Formula V with an effective amount of a metal complex of Formula (S,S)-X or (R,R)-X, such as a yttrium complex of (S,S)-4d or (R,R)-4d:

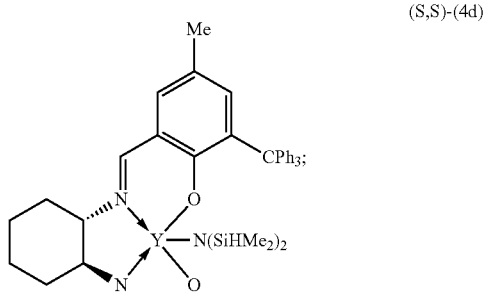

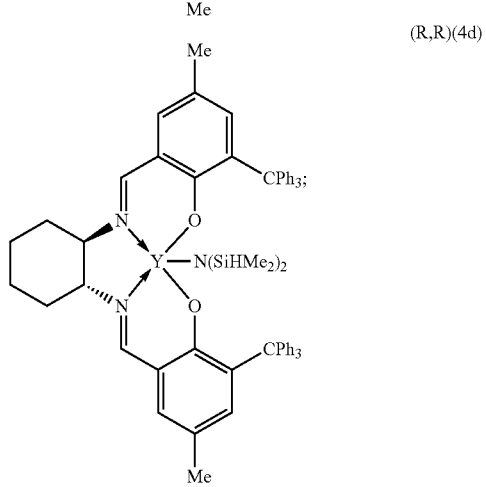

in the presence of an alcohol initiator;
to initiate a ring opening polymerization reaction of the (R,R)-diolides by the metal complex of Formula (S,S)-X to provide (S,S)-diolides having an enantiomeric excess of greater than 99% and a polymer of Formula (R)-I:

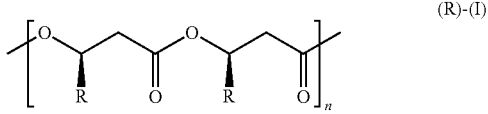
(R)-(I)

wherein n is about 50 to about 10,000, and R is as defined for Formula V; or to initiate a ring opening polymerization reaction of the (S,S)-diolides by the metal complex of Formula (R,R)-X to provide (R,R)-diolides having an enantiomeric excess of greater than 99% and a polymer of Formula (S)-I:

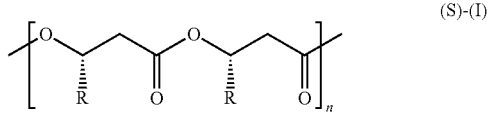
(S)-(I)

wherein n is about 50 to about 10,000, and R is as defined for Formula V.

The highly stereoregular polymers produced as described herein are technologically important biodegradable polymers useful in the biomedical, pharmaceutical, and packaging fields.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
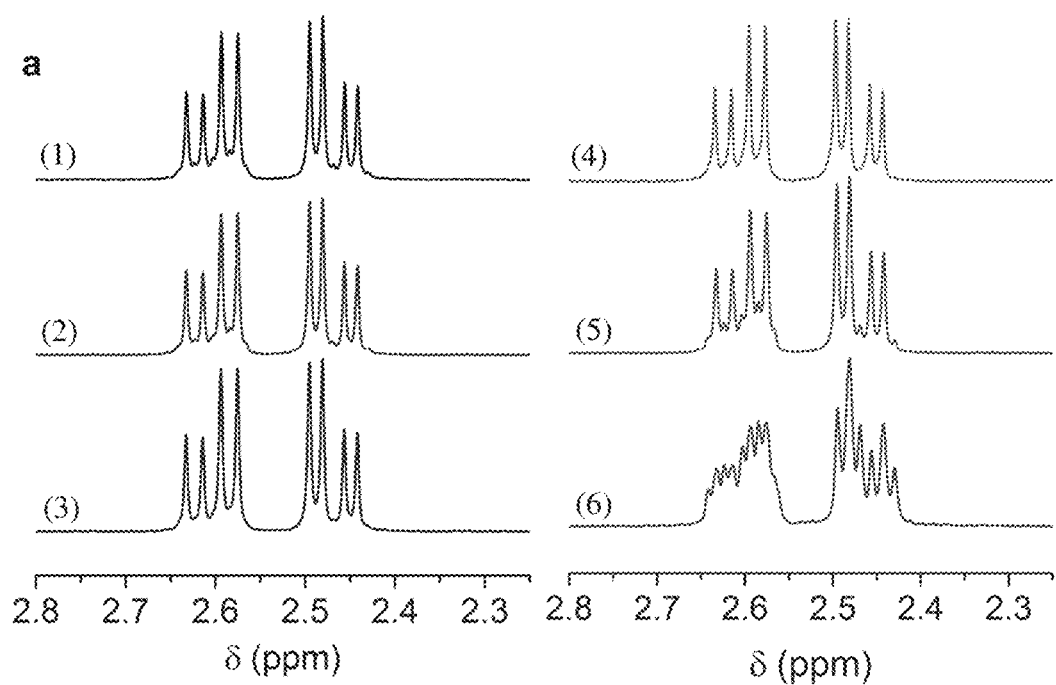
FIG. 1. Stereomicrostructures (tacticities) of P3HB: a) $^1$H-NMR spectra (CDCl$_3$) in the methylene region; b) $^{13}$C-NMR spectra (CDCl$_3$) in the carbonyl, methylene, and methyl regions. P3HB produced by: 1) [rac-DL]/[4a]=200/1; 2) [rac-DL]/[4b]/=200/1; 3) [rac-DL]/[4c]=200/1; 4) [rac-DL]/[4d]=200/1; 5) [rac-DL]/[4e]=200/1; and 6) comparative example of [rac-β-BL]/[4d]=100/1.
Figure 1:
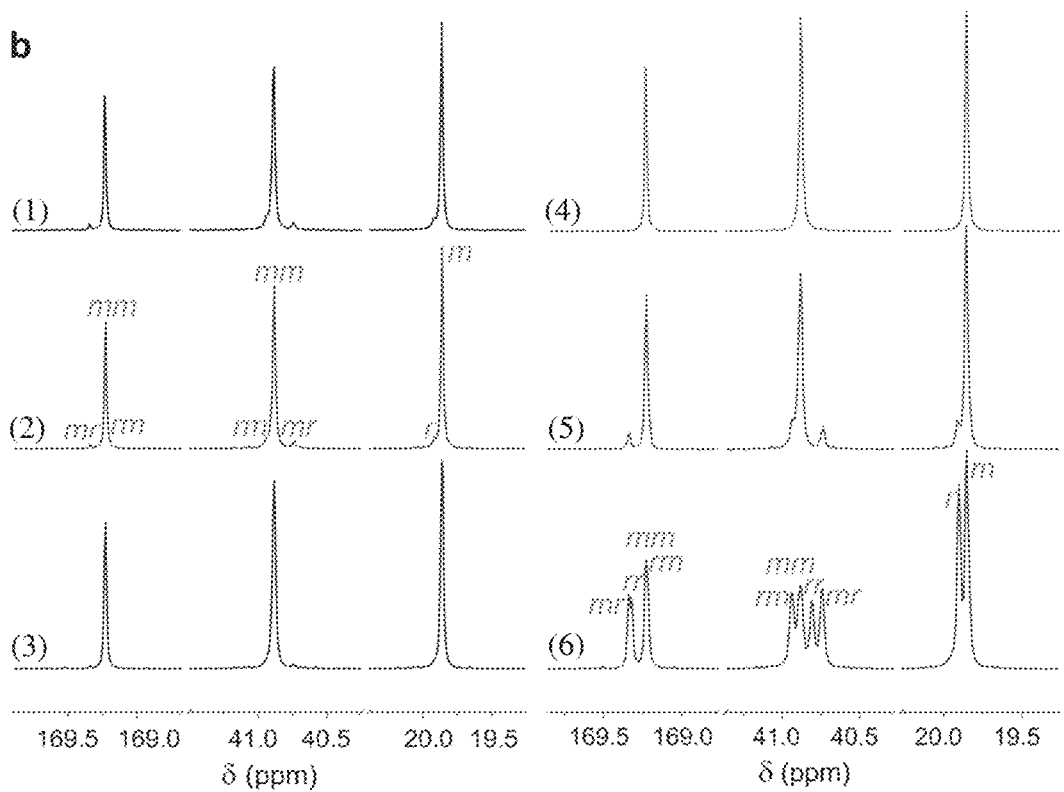

This invention discloses a new chemical synthesis route to technologically important biodegradable poly(3-hydroxybutyrate) (P3HB) with high isotacticity and molecular weight required for a practical use. The new route disclosed herein utilizes racemic eight-membered cyclic diolide (rac-DL) derived from bio-sourced dimethyl succinate and enantiomeric (R,R)-DL and (S,S)-DL, optically resolved by metal-based catalysts, according to some embodiments. With a stereoselective racemic molecular catalyst, the ROP of rac-DL under ambient conditions produces rapidly P3HB with perfect isotacticity ([mm]>99%), high crystallinity and melting temperature (T$_m$=171° C.), as well as high molecular weight and low dispersity ($M_n$=1.54×10$^5$ g/mol, Đ=1.01). With enantiomeric catalysts, kinetic resolution polymerizations of rac-DL automatically stops at 50% conversion and yields enantiopure (R,R)-DL and (S,S)-DL with >99% e.e. and the corresponding poly[(S)-3HB] and poly[(R)-3HB] with high T$_m$=175° C.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit. For example, one or more substituents on a phenyl ring refers to one to five, or one to four, for example if the phenyl ring is disubstituted.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The term "about" can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the term "about" is intended to include values, e.g., weight percentages, proximate to the recited range that are equivalent in terms of the functionality of the individual ingredient, composition, or embodiment. The term about can also modify the end-points of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., of weight percentages, carbon groups, or monomeric units) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. For example, blocks of the formulas of polymers described herein that are about 1 to about 100 can be about 1 to about 110, about 10 to about 110, about 1 to about 90, about 10 to about 90, about 10 to about 80, about 20 to about 80, about 1 to about 50, or about 50 to about 100. Likewise, blocks of the formulas of polymers described herein that are about 10 to about 5,000 can be about 10 to about 4,000, about 10 to about 3,000, about 10 to about 2,000, about 10 to about 1,000, about 10 to about 500, about 10 to about 50, about 100 to about 5,000, about 100 to about 2,500, about 100 to about 1,000, about 100 to about 500, about 50 to about 5,000, or about 50 to about 1,000.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

The term an "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

The term "alkyl" refers to a branched or unbranched hydrocarbon having, for example, from 1-20 carbon atoms, and often 1-12, 1-10, 1-8, 1-6, or 1-4 carbon atoms. Examples include, but are not limited to, methyl, ethyl, 1-propyl, 2-propyl (iso-propyl), 1-butyl, 2-methyl-1-propyl (isobutyl), 2-butyl (sec-butyl), 2-methyl-2-propyl (t-butyl), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl, hexyl, octyl, decyl, dodecyl, and the like. The alkyl can be unsubstituted or substituted, for example, with a substituent described below. The alkyl can also be optionally partially or fully unsaturated. As such, the recitation of an alkyl group can include (when specifically stated) alkenyl or alkynyl groups. The alkyl can be a monovalent hydrocarbon radical, as described and exemplified above, or it can be a divalent hydrocarbon radical (i.e., an alkylene).

The term "aryl" refers to an aromatic hydrocarbon group derived from the removal of at least one hydrogen atom from a single carbon atom of a parent aromatic ring system. The radical attachment site can be at a saturated or unsaturated carbon atom of the parent ring system. The aryl group can have from 6 to 20 carbon atoms, for example, about 6 to about 10 carbon atoms. The aryl group can have a single ring (e.g., phenyl) or multiple condensed (fused) rings, wherein at least one ring is aromatic (e.g., naphthyl, dihydrophenanthrenyl, fluorenyl, or anthryl). Typical aryl groups include, but are not limited to, radicals derived from benzene, naphthalene, anthracene, biphenyl, and the like. The aryl can be unsubstituted or optionally substituted, as described for alkyl groups.

The term "substituted" indicates that one or more hydrogen atoms on the group indicated in the expression using "substituted" or "optionally substituted" is replaced with a "substituent". The number referred to by 'one or more' can be apparent from the moiety on which the substituents reside. For example, one or more can refer to, e.g., 1, 2, 3, 4, 5, or 6; in some embodiments 1, 2, or 3; and in other embodiments 1 or 2, and if the substituent is an oxo group, two hydrogen atoms are replace by the presence of the substituent. The substituent can be one of a selection of indicated groups, or it can be a suitable group recited below or known to those of skill in the art, provided that the substituted atom's normal valency is not exceeded, and that the substitution results in a stable compound. Suitable substituent groups include, e.g., alkyl, alkenyl, alkynyl, alkoxy, halo, haloalkyl, hydroxy, hydroxyalkyl, aryl, aroyl, (aryl)alkyl (e.g., benzyl or phenylethyl), heteroaryl, heterocycle, cycloalkyl, alkanoyl, alkoxycarbonyl, alkylcarbonyloxy, amino, alkylamino, dialkylamino, trifluoromethyl, trifluoromethoxy, trifluoromethylthio, difluoromethyl, acylamino, nitro, carboxy, carboxyalkyl, keto, thioxo, alkylthio, alkylsulfinyl, alkylsulfonyl, arylsulfinyl, arylsulfonyl, heteroarylsulfinyl, heteroarylsulfonyl, heterocyclesulfinyl, heterocyclesulfonyl, phosphate, sulfate, hydroxyl amine, hydroxyl (alkyl)amine, and cyano, as well as the moieties illustrated in the schemes and priority documents of this disclosure, and combinations thereof.

Additionally, suitable substituent groups can be, e.g., —X, —R, —O$^-$, —OR, —SR, —S$^-$, —NR$_2$, —NR$_3$, =NR, —CX$_3$, —CN, —OCN, —SCN, —N=C=O, —NCS, —NO, —NO$_2$, =N$_2$, —N$_3$, —NC(=O)R, —C(=O)R, —C(=O)NRR, —S(=O)$_2$O$^-$, —S(=O)$_2$OH, —S(=O)$_2$R, —OS(=O)$_2$OR, —S(=O)$_2$NR, —S(=O)R, —OP(=O) (OR)$_2$, —P(=O)(OR)$_2$, —OP(=O)(OH)(OR), —P(=O) (OH)(OR), —P(=O)(O$^-$)$_2$, —P(=O)(OH)$_2$, —C(=O)R, —C(=O)X, —C(S)R, —C(O)OR, —C(O)O$^-$, —C(S)OR, —C(O)SR, —C(S)SR, —C(O)NRR, —C(S)NRR, or —C(NR)NRR, where each X is independently a halogen ("halo"): F, Cl, Br, or I; and each R is independently H, alkyl, aryl, (aryl)alkyl (e.g., benzyl), heteroaryl, (heteroaryl) alkyl, heterocycle, heterocycle(alkyl), or a protecting group. As would be readily understood by one skilled in the art, when a substituent is keto (=O) or thioxo (=S), or the like, then two hydrogen atoms on the substituted atom are replaced. In some embodiments, one or more of the substituents above can be excluded from the group of potential values for substituents on the substituted group. The various R groups in the schemes of this disclosure can be one or more of the substituents recited above, thus the listing of certain variables for such R groups (including $R^1$, $R^2$, $R^3$, etc.) are representative and not exhaustive, and can be supplemented with one or more of the substituents above. For example, a substituted alkyl can be an aryl-substituted alkyl, for example, benzyl (—Bn).

The term "alkoxy" refers to the group alkyl-O—, where alkyl is as defined herein. Examples of alkoxy groups include, but are not limited to, methoxy, ethoxy, n-propoxy, iso-propoxy, n-butoxy, tert-butoxy, sec-butoxy, n-pentoxy, n-hexoxy, 1,2-dimethylbutoxy, and the like. The alkoxy can be unsubstituted or substituted.

The term "alcohol" refers to an at least mono-hydroxy-substituted alkane. A typical alcohol comprises a ($C_1$-$C_{12}$) alkyl moiety substituted at a hydrogen atom with one or more hydroxyl group. Alcohols include methanol, ethanol, n-propanol, i-propanol, n-butanol, i-butanol, s-butanol, t-butanol, n-pentanol, i-pentanol, hexanol, cyclohexanol, heptanol, octanol, nonanol, decanol, benzyl alcohol, phenylethanol, and the like. The carbon atom chain in alcohols can be straight, branched, cyclic, or aryl. Alcohols can be mono-hydroxy, di-hydroxy, tri-hydroxy, and the like (e.g. saccharides), as would be readily recognized by one of skill in the art.

The variables and limitations described for one general or specific embodiment for any polymer described herein can also be applied to other embodiments, for example, other variations of a polymer or formula described herein, and variations of the embodiments provided in the Examples.

Polymers described herein can be polymers of only one type of monomer, or polymers of more than one type of monomer. Accordingly, the polymers can be random polymers or block copolymers, depending on their method of synthesis. In various embodiments, the block copolymers can be stereodiblock copolymers, stereotapered copolymers, stereogradient copolymers, stereorandom copolymers, or stereoalternating copolymers, for example, as schematically illustrated below, showing actual or approximate location and/or organization of monomers as a result of synthetic preparation.

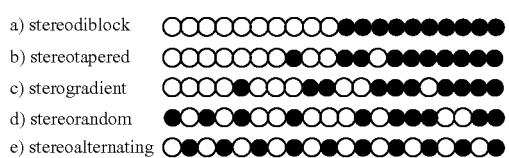

a) stereodiblock
b) stereotapered
c) sterogradient
d) stereorandom
e) stereoalternating The term "stereodiblock" as used herein refers to a polymer and/or polymeric structure comprising an at least two polymeric blocks wherein each block has a stereoregularity unique to the block. This can be understood to mean, by way of example, a polymer of repeating units AAA-BBB where a first (A) block has either a stereoregular R or S configuration such that essentially all of the A block is of such configuration, and a second (B) block having a stereoregular configuration such that essentially all of the B block is the opposite configuration as to the A block.

The term "essentially perfect" as used herein to describe isotacticity refers to an isotactic polymer wherein no stereoirregularities can be identified through standard NMR analysis.

The term "enantiomeric excess" (e.e.) refers to a measurement of the purity of a chiral substance and can be expressed as a percent of a major enantiomer present minus the percent of a minor enantiomer present wherein the enantiomeric excess of a single pure enantiomer such as where a chiral substance is all R or all S possesses an enantiomeric excess of 1.0, understood to be 100%, and would be considered optically pure.

The term "enantiopure" as used herein refers to a compound or sample of polymers wherein the chiral centers within the molecule are all of the same chirality, as determined by NMR analysis or chiral HPLC.

Poly(3-hydroxybutyrate)s from Racemic and Enantiomeric Cyclic Diolides

Poly(hydroxyalkanoate)s (PHAs) naturally produced by bacteria and other living microorganisms from biorenewable resources such as carbohydrates and fats, are an important class of commercially implemented aliphatic polyesters as biodegradable and/or biocompatible materials for biomedical, pharmaceutical, and packaging applications. The most prominent, thus most extensively studied, PHA is poly(3-hydroxybutyrate) (P3HB), in which bacterial poly[(R)-3-hydroxybutyrate], P[(R)-3HB], is a perfectly stereoregular, pure isotactic crystalline thermoplastic material. Thanks to its comparable thermal and mechanical properties to those of high-performance isotactic polypropylene (it-PP), highly isotactic P3HB is being considered as an attractive biodegradable alternative to petroleum-based plastics, especially it-PP. However, high current production costs and limited production volumes of bacterial/microbial PHAs, including P3HB, render them impractical in many applications in areas such as bio-renewable and biodegradable "green" commodity thermoplastics.

The chemical synthesis via ring-opening polymerization (ROP) of cyclic esters (lactones or lactides), a process typically catalyzed by a metal-based or organic catalyst, offers an alternative route to such technologically important biodegradable aliphatic polyesters. Ring opening polymerization of cyclic esters is often advantageous, thanks to its fast kinetics of the polymerization, scalability of the polymer production, and tunability of catalysts and co-monomers. In this context, the ROP of β-butyrolactone (β-BL) has been developed for the chemical synthesis of P3HB (Jedlinski et al. *Macromolecules* 1998). The ROP of γ-butyrolactone (γ-BL) for the chemical synthesis of poly(4-hydroxybutyrate) (P4HB) has also been realized recently (Hong et al. *Nat. Chem.* 2016).

In the case of the ROP of β-BL, the cost-effective chemical synthesis of P3HB calls for the use of the racemic monomer, rac-β-BL, rather than the more expensive enantiopure (R)-β-BL, which requires a stereoselective ROP process to render the formation of isotactic P3HB. However, despite extensive research efforts since 1960s, the chemical synthesis of P3HB with isotacticity $P_m$ (defined as the probability of meso linkages between monomer units)>0.85 from the ROP of rac-β-BL has proven elusive.

The ROP of rac-β-BL by alkyl aluminoxanes produced a mixture of iso-enriched P3HB products as a whole ($P_m$=0.62), which were fractionated into atactic and isotactic fractions with the highest $P_m$ of 0.85 reported for the acetone-insoluble fraction. A chiral initiator system consisting of $ZnEt_2$/(R)(−)-3,3-dimethyl-1,2-butanediol also yielded a mixture of P3HB products that were fractionated in methanol into soluble atactic and insoluble (~25%) isotactic ($P_m$~0.80) fractions, and a chiral Co(salen)/$Et_3Al$ complex afforded P3HB of low crystallinity (no tacticity data). A discrete β-diiminate zinc alkoxide initiator promoted a controlled ROP of rac-β-BL with high polymerization rates, but the resulting P3HB is atactic. Cr(III) salophen complexes converted rac-β-BL into iso-enriched P3HB with $P_m$=0.66, medium number-average molecular weight ($M_n$=4.81×10$^4$ g/mol), high dispersity (Đ=5.2), and modest melting-transition temperature ($T_m$=116, 142° C.). Lanthanide (La, Nd) borohydrides supported on silica polymerized rac-β-BL into P3HB with $P_m$=0.85 and $M_n$=1.15×10$^4$ g/mol.

It is worth noting that syndiotactic P3HB materials from being modestly syndiotactic ($P_r$~0.70) to highly syndiotactic ($P_r$ up to 0.95), have been achieved through the ROP of rac-β-BL using alkyltinoxides and discrete yttrium complexes supported by tetradentate, dianionic alkoxy-aminobis(phenolate) [O−,N,O,O−] ligands, respectively. This Y catalyst system has also been utilized for the ROP of functional β-lactones such 4-allyloxymethylene-β-propiolactone to afford either highly isotactic ($P_m$=0.93, $M_n$=9.20× 10$^3$ g/mol, Đ=1.46) or syndiotactic ($P_r$=0.91) polymer, depending on the substituents on the ligand. In the context of creating a synthetic equivalent of bacterial P3HB, both high isotacticity ($P_m$>0.95) and molecular weight ($M_n$>10$^5$ g/mol) are typically required for practical use.

It is informative to point out that the ingenious utilization of a cyclic dimer of l-lactic acid (l-LA) rendered the commercial production of high-molecular-weight, highly isotactic polylactide (PLA). The efforts, however, in attempting the chemical synthesis of high-molecular-weight, highly isotactic P3HB have so far been strictly limited to the use of the cyclic monomer of 3-hydroxybutyric acid (3HB), namely β-BL. However, β-Lactones are known to be carcinogenic (alkylating DNA), and competing ring-opening mechanisms (O-acyl vs. O-alkyl cleavage) were reported for the ROP of such highly strained monomers (Arcana et al. *Polym. Int.* 2000). As the current approach via the ROP of rac-β-BL has not yet produced P3HB with high molecular weight and high isotacticity (vide supra), we formulated the following three working hypotheses to address this longstanding challenge.

First, by analogy of the PLA production, the chemical synthesis of P3HB could utilize a cyclic dimer of 3HB, namely eight-membered cyclic diolide (DL, Scheme 1), which is benign and can be readily derived from bio-sourced dimethyl succinate (Seebach et al. *Helvetica Chimica Acta* 1995). Worth noting here is that the enantiopure cyclic trimer of (R)-3HB, obtained in ~50% yield from the depolymerization of bacterial P[(R)-3HB], was attempted to polymerize back to P3HB but only low molecular ($M_n$~

5,000 g/mol) oligomers were obtained (Melchiros et al. *Macromolecules* 1996). Second, as DL possesses two stereogenic centers, the ROP of its rac and meso diastereomers could lead to various stereoregular (isotactic, syndiotactic, stereoblock, etc.) P3HB materials, depending on the stereoselectivity of the catalyzed ROP process. Third, considering significantly increased sterics present in DL relative to β-BL, a higher degree of stereochemical control in the catalyzed ROP of DL could be expected, thereby potentially generating highly stereoregular P3HB materials.

Guided by these hypotheses, we have endeavored the first study of this proposed new DL route to P3HB and hereby disclose our discovery that the catalyzed ROP of rac-DL (b in Scheme 1) enabled the highly efficient synthesis of P3HB with perfect or essentially perfect isotacticity, high crystallinity and melting temperature, and high molecular weight.

Monomers

Eight-membered-ring cyclic diolides consist of racemic and meso-diastereomers as shown in Scheme 2 where R is Me (most common), Et, i-Pr and other alkyl groups, as well as alkenyl, alkynyl, aryl, or benzyl groups. Heteroatom-containing groups such as OR and $NR_2$ ($NR_1R_2$) can be used to substitute the R group. Racemic diolides can be optically resolved into pure enantiomer, (R,R)-DL and (S,S)-DL during the kinetic resolution polymerization. The positions of R group can also be at alpha to the carbonyl groups ($DL_\alpha$). Accordingly, each polymer structure shown herein is intended to be modified, in such embodiments, by moving the R group to the alternate methylene position of the diolide when monomers of the "$DL_\alpha$"-type are used in the synthesis of such polymers.

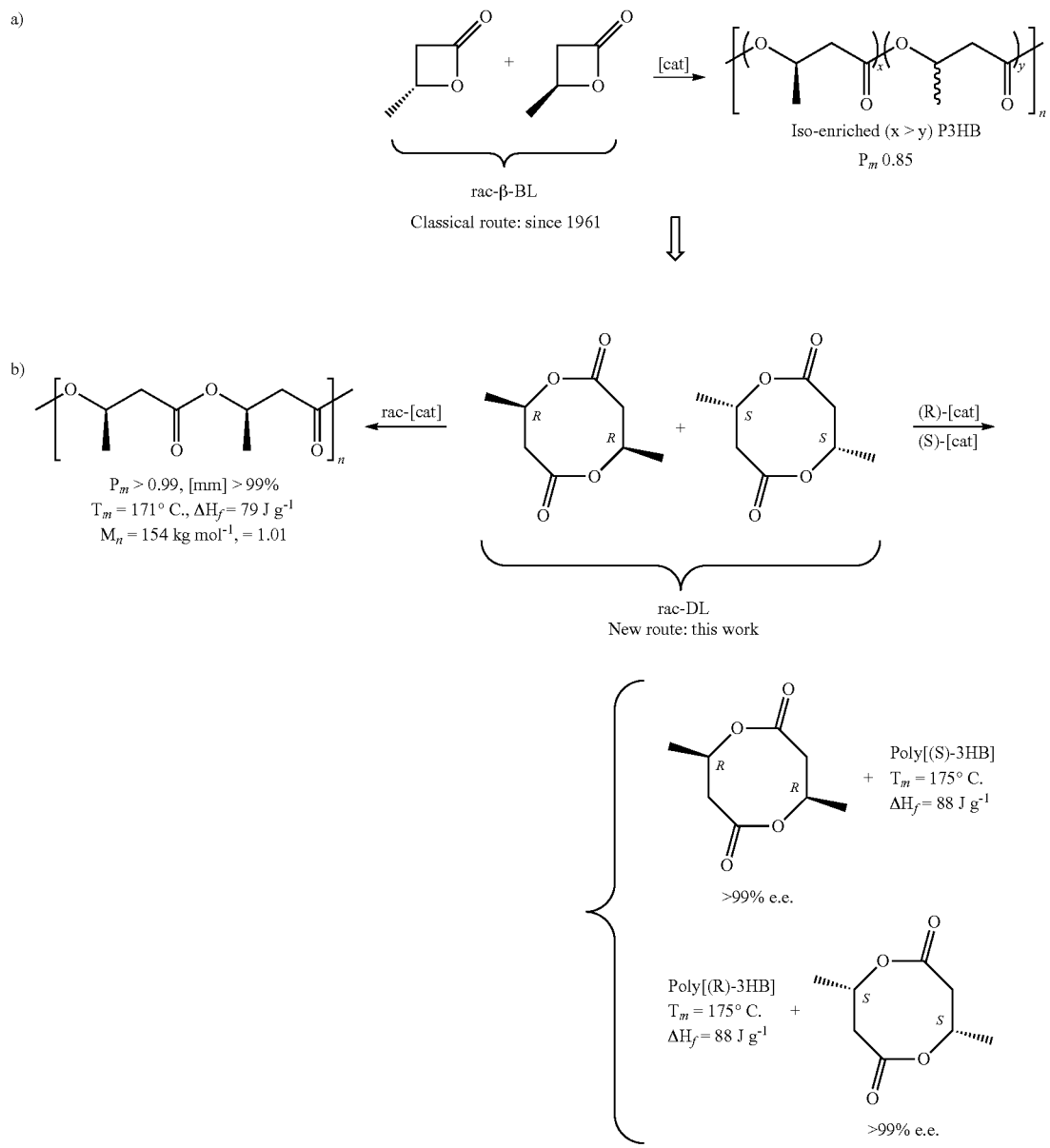

Scheme 1. Ring-Opening Polymerization of Highly Isotactic Polymers.

Scheme 2. Racemic Diolides and Meso-Diastereomers for Ring-Opening Polymerization.

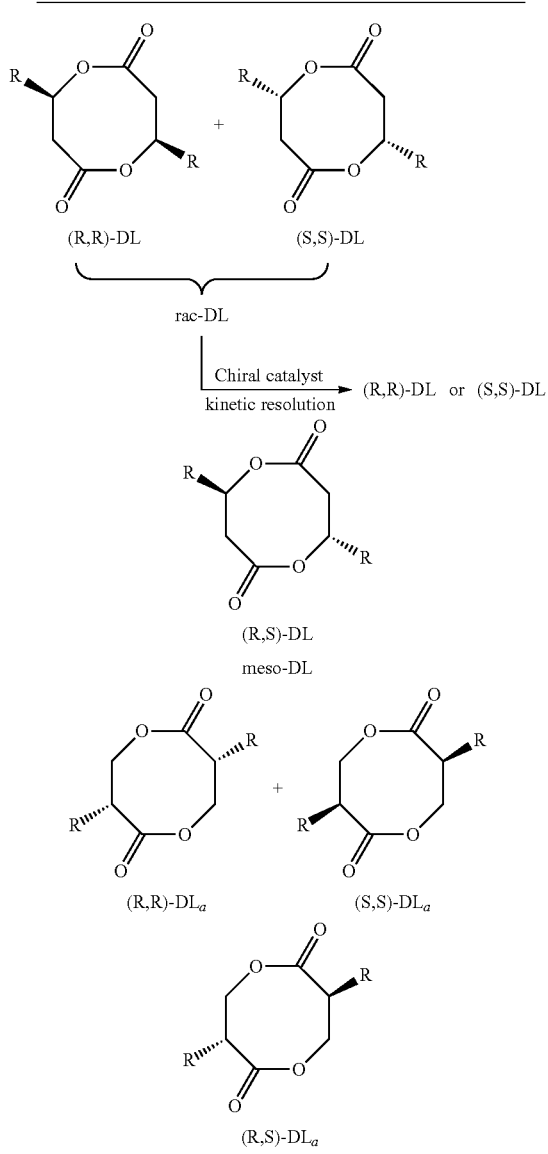

wherein R is H, alkyl, such as methyl or ethyl, alkenyl, alkynyl, aryl, or benzyl, each optionally substituted.

Polymers

Upon ring-opening polymerization of the above cyclic diolide monomers, P3HB materials, and derivatives thereof (e.g., wherein R is different than the natural butyrate moieties), with different stereoregularities or tacticities such as isotactic, syndiotactic, atactic, and stereodiblock or multi-block microstructures can be achieved, depending on whether a racemic, enantiopure, or meso-monomer is used and on the stereoselectivity of the catalyst. Copolymers can also be produced by copolymerizing between two different cyclic diolides (e.g., R=Me and R=H or Et) as well as between cyclic diolides with cyclic esters such as lactones and lactides, for example, γ-butyrolactone, δ-valerolactone, ε-caprolactone, lactide, glycolide, and the like. Scheme 3 illustrates general polymer tacticities for a single stereochemistry monomer; polymers prepared from diolides are represented when each R group is duplicated as a result of diolide monomers.

Scheme 3.

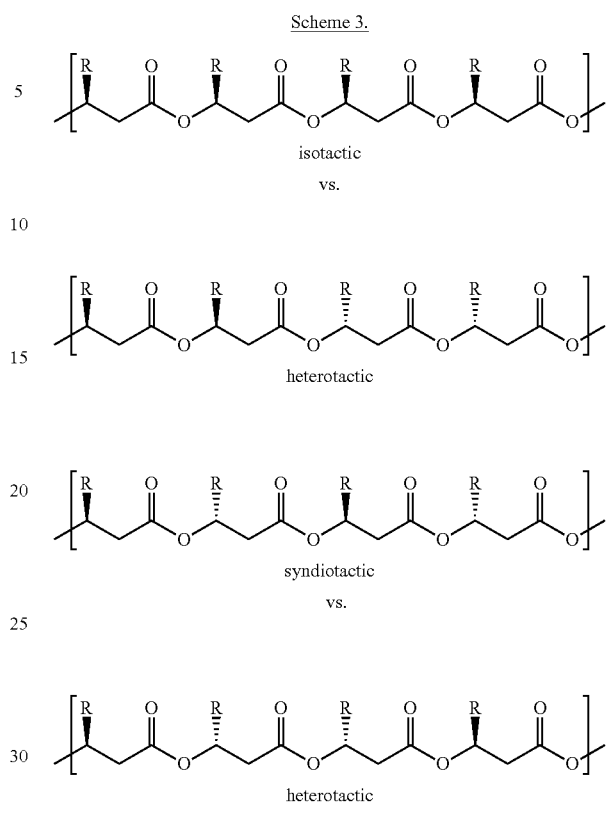

Catalysts

The most effective meta-based catalyst is yttrium complex 4d supported by a bulky salen ligand (Scheme 4). Other similar complexes 4a-4c (Scheme 4) also work well for the stereoselective ROP of rac-DL. The catalyst structure can be substantially modified through the substituents on the aromatic ring (typically bulky groups placed at 3,5-positions), the backbone linker (cyclohexyl, alkyl, chiral group, etc.), the metal center (Y, Sc, La, Sm and other group 3 and f-block lanthanides), and the group on the metal (amide, alkoxide, or alkyl). Group 4 (Ti, Zr, $H_f$) chiral metallocene catalysts can also be used. The catalyst can be in a chiral racemic form, an enantiomerically pure form, or an achiral form. In the case of an enantiomerically pure catalyst, kinetic resolution polymerization of racemic diolide can be performed so that one enantiomer of the racemic monomer pool is selectively polymerized first under 50% monomer conversion while the other enantiomer is optically resolved.

Scheme 4. Ring-Opening Polymerization Catalysts.

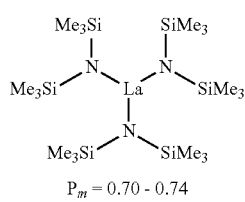

$P_m = 0.70 - 0.74$

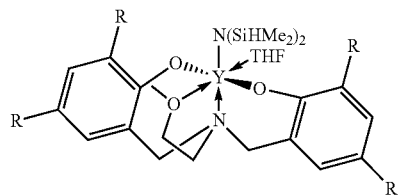

a: R = $^t$Bu; b: R = CMe$_2$Ph

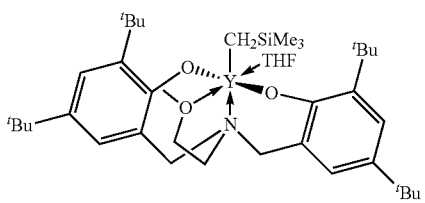

$P_m = 0.76$

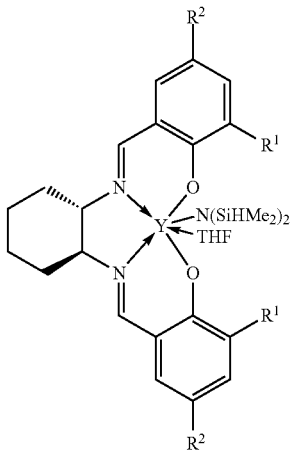

rac-4a-c
$P_m = 0.91$-$0.96$
[mm] = 87%-94% a: R$^1$ = R$^2$ = $^t$Bu
b: R$^1$ = $^t$Bu, R$^2$ = F
c: R$^1$ = R$^2$ = CMe$_2$Ph

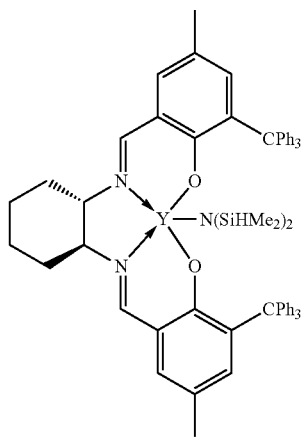

rac-4d
$P_m > 0.99$
[mm] = 99%

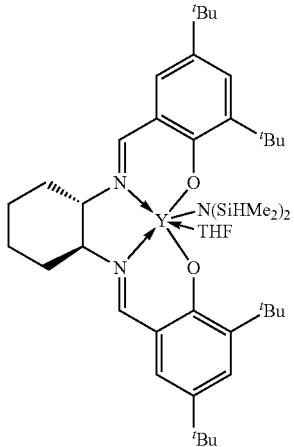

$P_m = 0.88$
[mm] = 79%

Organic catalysts are those strong organic bases or nucleophiles, such as triazabicyclodecene (TBD), that can either directly initiate the polymerization or activate a protic initiator to promote the polymerization. They can be used alone but are often used in combination with a protic initiator. Organic catalysts include strong organic bases, especially polyaminophosphazene superbases such as 1-tert-butyl-4,4,4-tris(dimethylamino)-2,2-bis[tris(dimethylamino)-phosphoranylidenamino]-$\lambda^5$,$4\lambda^5$-catenadi (phosphazene) (tBu-P$_4$); guanidines such as 1,5,7-triazabicyclo[4.4.0]dec-5-ene (TBD), proazaphosphatranes (cyclic azaphosphines), N-heterocyclic carbens, and N-heterocyclic olefins. Anonic versions of organic catalysts/initiators such as urea or thiourea anions can also be used. Chiral organic catalysts can be used to effect kinetic resolution polymerization of rac-DL into chiral polymer and optically resolved monomer.

Polymerization Processes

The ROP is typically carried out under solvent-free conditions (i.e., bulk polymerization), or in solution (e.g., in dichloromethane, toluene, et al.), at room temperature in the presence of a catalyst. The catalyst can be used alone but can also be employed in combination with a protic initiator. Typical initiators include protic compounds such as alcohols (ROH), di-alcohols (HO—R—OH), polyols (compounds containing more than two OH groups, or sugars; amines (RNH$_2$, R$_2$NH); thiols (RSH), where R is alkyl, aryl, substituted alkyl, or substituted aryl, or deprotonated monomers.

Pure rac-DL can be synthesized in a multi-gram scale from bio-sourced dimethyl succinate. At the outset, the ROP of rac-DL was screened with La[N(SiMe$_3$)$_2$]$_3$ 1 (Scheme 4), a lanthanum complex that has been shown to be an effective catalyst for the ring-opening (co)polymerization of γ-BL and α-methylene-γ-butyrolactone (MBL). In combination with an alcohol initiator, the 1/xBnOH (x=2, 3, BnOH=benzyl alcohol) system was effective for the ROP of rac-DL (20 equiv) in dichloromethane (DCM) at room temperature (RT), achieving 100% conversion (x=2) in 4 h or 98% (x=3) conversion in 8 h. However, the resulting P3HB exhibited a low molecular weight ($M_n$=2.43×10$^3$ g/mol and Đ=1.09 for x=3, Table 1). Furthermore, both $^1$H and $^{13}$C-NMR spectra showed the formation of an iso-biased amorphous material ($P_m$=0.74, x=2; $P_m$=0.70, x=3), which was confirmed by observation of only glass-transition temperature ($T_g$) on its differential scanning calorimetry (DSC) curves.

TABLE 1

Results of rac-DL polymerization by La[N(SiMe$_3$)$_2$]$_3$ (1) and bisphenolate yttrium complexes (2a, 2b, and 3) at room temperature [a]

| Run | Catalyst (cat) | Initiator (I) | [rac-DL]/ [cat]/[I] | Time (h) | Conv.[b] (%) | M$_n$[c] (kg/mol) | Đ[c] (M$_w$/M$_n$) | P$_m$[d] | [mm][d] (%) |
|---|---|---|---|---|---|---|---|---|---|
| 1 | 1  | BnOH | 20/1/3 | 8  | 98  | 2.43 | 1.09 | 0.70 | 59 |
| 1 | 1  | BnOH | 20/1/2 | 4  | 100 | n.d. | n.d. | 0.74 | 63 |
| 2 | 2a | BnOH | 20/1/1 | 48 | 17  | n.d. | n.d. | n.d. | n.d. |
| 3 | 2b | BnOH | 20/1/1 | 48 | 44  | n.d. | n.d. | n.d. | n.d. |
| 4 | 3  | BnOH | 20/1/1 | 32 | 76  | 2.70 | 1.08 | 0.76 | 66 |

[a] Conditions: rac-DL = 0.138 g (0.8 mmol), [rac-DL] = 1.0M, DCM as the solvent, V$_{solvent}$ = 0.8 mL, the catalyst and initiator amount varied according to the [rac-DL]/[cat]/[I] ratio.
[b] Monomer conversions measured by $^1$H NMR spectra of the quenched solution in benzoic acid/chloroform.
[c] Number-average molecular weights (M$_n$) and dispersity indices (Đ = M$_w$/M$_n$) determined by GPC carried out at 40° C. and a flow rate of 0.8 mL/min, with chloroform as the eluent on a Viscotek GPCmax VE 2001 instrument equipped with one PLgel 5 μm guard and three PLgel 5 μm mixed-C columns (Polymer Laboratories; linear range of MW = 200-2,000,000). The instrument was calibrated with 10 PMMA standards, and chromatograms were processed with Malvern OmniSEC software (version 4.7).
[d] P$_m$ is the probability of meso linkages between HB units, and mm is isotactic triad made up of two adjacent meso diads, determined by $^{13}$C{$^1$H} NMR spectroscopy.

Next, we turned to a 'privileged class of catalysts' for the ROP of cyclic esters, discrete yttrium amido complexes 2 (Scheme 4) (a, R=$^t$Bu; b, R=CMe$_2$Ph) and alkyl complex 3 (Scheme 4) supported by the tetradentate [O$^-$,N,O,O$^-$] ligand, which were previously shown to be superior catalysts for the ROP of γ-BL and MBL as well as highly active catalysts for the syndiospecific ROP of rac-pi-BL. With a high precatalyst loading of 5 mol % and in combination with 1 equivalent of BnOH initiator that undergoes instantaneous alcoholysis of the yttrium complex to generate the corresponding yttrium alkoxide catalyst, all three yttrium complexes were active for the ROP of rac-DL, with yttrium alkyl 3 (Scheme 4) being the most active but still rather sluggish (76% conversion after 32 h). Moreover, these catalysts incorporating the tripodal alkoxy-amino-bis(phenolate) ligand afforded only low-molecular-weight (M$_n$=2.70×10$^3$ g/mol and Đ=1.08 for catalyst 3; Scheme 4), iso-biased amorphous material (P$_m$=0.76, Table 1). For catalysts 2 (Scheme 4), only low conversions were achieved even after 48 h (44% by 2a; 17% by 2b), and the P3HB products were not isolated but the estimated P$_m$ values by in situ NMR spectra were similar to that by catalyst 3 (Scheme 4).

Considering the steric hindrance of rac-DL monomer with the eight-membered-ring framework and the low activity and isoselectivity of also sterically encumbered catalysts 1-3 screened, we arrived at sterically more open yttrium racemic salen complexes 4a-e (Scheme 4). Yttrium silylamido complexes 4a-d supported by N,N'-bis(salicylidene)cyclohexanediimine (salcy) ligands and complex 4e supported by the analogous salph ligand were readily synthesized in good yields (58-83%) according to the procedures established for the synthesis of known complex 4a and known salen ligands (see Schemes 8-10 below). Complex 4a with the classic salen ligand bearing the 3,5-di-tert-butyl substituents was first examined for its activity and stereoselectivity towards the ROP of rac-DL. Excitingly, this complex, when combined with 1 equivalent of BnOH initiator, rapidly polymerized 20 to 200 equivalents of rac-DL to completion within 20 min at RT.

The molecular weight of the resulting P3HB increased from low M$_n$=4.77×10$^3$ g/mol (Đ=1.17) to medium M$_n$=3.20×10$^4$ g/mol (Đ=1.03) with increasing the [rac-DL]/[4a] ratio from 20/1 to 200/1, and the calculated initiation efficiency ranged from 74% to 108% (runs 1-4, Table 2) indicating a controlled polymerization. More importantly, complex 4a now yielded isotactic P3HB with P$_m$~0.91-0.94 and isotactic [mm] triad ~87-89% based on $^1$H and $^{13}$C-NMR analysis (FIG. 1). Accordingly, the resulting P3HB material became crystalline, exhibiting a T$_m$~128-146° C., depending on the polymer molecular weight (runs 1-4, Table 2).

TABLE 2

Results of rac-DL polymerization by yttrium catalysts 4a-e and BnOH initiator. [a]

| Run | Catalyst | [rac-DL]/[4] | Time (min) | Conv.[b] (%) | M$_n$[c] (kg/mol) | Đ[c] (M$_w$/M$_n$) | I*[d] (%) | P$_m$[e] | [mm][e] (%) | T$_m$[f] (° C.) |
|---|---|---|---|---|---|---|---|---|---|---|
| 1  | 4a | 20/1   | 20 | 100 | 4.77 | 1.17 | 74  | 0.91  | 87  | 128/136 |
| 2  | 4a | 50/1   | 20 | 100 | 10.9 | 1.05 | 80  | 0.93  | 87  | 133/143 |
| 3  | 4a | 100/1  | 20 | 100 | 23.0 | 1.04 | 75  | 0.94  | 89  | 136/145 |
| 4  | 4a | 200/1  | 20 | 100 | 32.0 | 1.03 | 108 | 0.93  | 89  | 146 |
| 5  | 4b | 100/1  | 20 | 100 | 25.1 | 1.03 | 69  | 0.95  | 89  | 147 |
| 6  | 4b | 200/1  | 20 | 100 | 37.3 | 1.01 | 93  | 0.95  | 88  | 147 |
| 7  | 4c | 100/1  | 20 | 100 | 25.7 | 1.11 | 63  | 0.96  | 93  | 153/157 |
| 8  | 4c | 200/1  | 20 | 100 | 52.7 | 1.14 | 66  | 0.96  | 94  | 156 |
| 9  | 4d | 100/1  | 20 | 100 | 20.1 | 1.07 | 88  | 0.99  | 98  | 161 |
| 10 | 4d | 200/1  | 20 | 100 | 37.4 | 1.07 | 92  | >0.99 | >99 | 164 |
| 11 | 4d | 400/1  | 20 | 100 | 64.3 | 1.02 | 107 | >0.99 | >99 | 169 |
| 12 | 4d | 800/1  | 60 | 98  | 119  | 1.03 | 113 | >0.99 | >99 | 170 |
| 13 | 4d | 1200/1 | 30 | 71  | 154  | 1.01 | 95  | >0.99 | >99 | 171 |

TABLE 2-continued

Results of rac-DL polymerization by yttrium catalysts 4a-e and BnOH initiator.[a]

| Run | Catalyst | [rac-DL]/[4] | Time (min) | Conv.[b] (%) | $M_n$[c] (kg/mol) | Đ[c] ($M_w/M_n$) | I*[d] (%) | $P_m$[e] | [mm][e] (%) | $T_m$[f] (° C.) |
|---|---|---|---|---|---|---|---|---|---|---|
| 14 | 4e | 100/1 | 20 | 100 | 23.7 | 1.03 | 69 | 0.88 | 79 | 121 |
| 15 | 4e | 200/1 | 20 | 100 | 43.6 | 1.24 | 78 | 0.89 | 79 | 122 |

[a] Conditions: rac-DL = 0.138 g (0.80 mmol), [rac-DL] = 1.0M; DCM as the solvent, $V_{solvent}$ = 0.8 mL (except for run 13 where $V_{solvent}$ = 0.4 mL); room temperature; yttrium catalyst 4 to BnOH initiator ratio fixed at 1/1, and the amount varied according to the [rac-DL]/[4] ratio.
[b] Conversions of monomers measured by $^1$H NMR spectra of the quenched solution in benzoic acid/chloroform.
[c] Weight-average molecular weights ($M_w$), number-average molecular weights ($M_n$), and dispersity indices (Đ = $M_w/M_n$) determined by GPC coupled with an 18-angle light scattering detector at 40° C. in chloroform.
[d] The initiation efficiency I* = $M_n$(calcd)/$M_n$(exptl), where $M_n$(calcd) = MW(rac-DL) × [rac-DL]/[4] × conv (%) + MW of chain-end groups (BnOH)] = 172.18 × [rac-DL]/[4] × conv (%) + 108.14.
[e] $P_m$ is the probability of meso linkages between HB units, and mm is isotactic triad made up of two adjacent meso diads, determined by $^{13}$C{$^1$H} NMR spectroscopy.
[f] $T_m$ measured by DSC with the cooling and second heating rate of 10° C./min for samples produced by 4c-d, 5° C./min for the samples produced by 4a-b, or 2° C./min for the samples produced by 4e.

Replacing the initiator BnOH with i-PrOH lowered the polymerization activity by threefold, now requiring 60 min to achieve complete monomer (200 equiv) conversion. Furthermore, the molecular weight ($M_n$=6.07×10$^4$ g/mol) of the resulting P3HB was considerably higher than the theoretical value, thus giving rise to a low initiation efficiency of only 57%, although the P3HB tacticity remained the same. Other alcohols such as Ph$_2$CHCH$_2$OH were also found less effective than BnOH. Therefore, all the subsequent polymerization studies with other yttrium complexes (4b-e) employed exclusively BnOH as the more effective initiator.

The above exciting results brought about by yttrium salen complex 4a prompted us to investigate possible effects of the salen ligand framework's electronics, sterics, and geometry of the backbone diimine linker on the rac-DL polymerization activity and stereoselectivity.

In the context of electronic effects, electron withdrawing substituents (e.g., F) introduced to the 5-positions of the salicylidene framework were found to generate a more redox stable and active (salcy)Co(III) catalyst for the copolymerization of epoxide and anhydride monomer pairs.

In the present polymerization of rac-DL by (salcy)yttrium catalyst 4b with the F groups substituted at the 5-positions of the salcy ligand, only the isotacticity of the resulting P3HB was improved slightly to now $P_m$=0.95 and $T_m$=147° C. (runs 5 and 6, Table 2), as compared with the parent tert-butyl substituted catalyst 4a.

Turning to the steric perturbation of the catalyst, the more bulky cumyl-substituted complex 4c produced isotactic P3HB with a noticeably higher isotactic [mm] triad of 94% (FIG. 1) and $T_m$ of 156° C. (run 8, Table 2), relative to the [mm] of 89% and $T_m$ of 146° C. for the P3HB produced by catalyst 4a under identical conditions (run 4 vs. 8, Table 2). These results showed much more pronounced effects of the ligand sterics than electronics on the polymerization stereoselectivity. Therefore, the even more bulky trityl (Ph$_3$C) groups were substituted at the 3-positions of the salcy ligand framework to generate catalyst racemic 4d. Remarkably, catalyst 4d produced essentially stereo-perfect, pure isotactic P3HB with $P_m$>0.99 and [mm]>99% (run 10, Table 2), while maintaining high polymerization activity (100% monomer conversion in 20 min). Consistent with this NMR-derived stereo-microstructure (FIG. 1), the resulting crystalline isotactic P3HB exhibited a high $T_m$ of 164° C.

Figure 6:
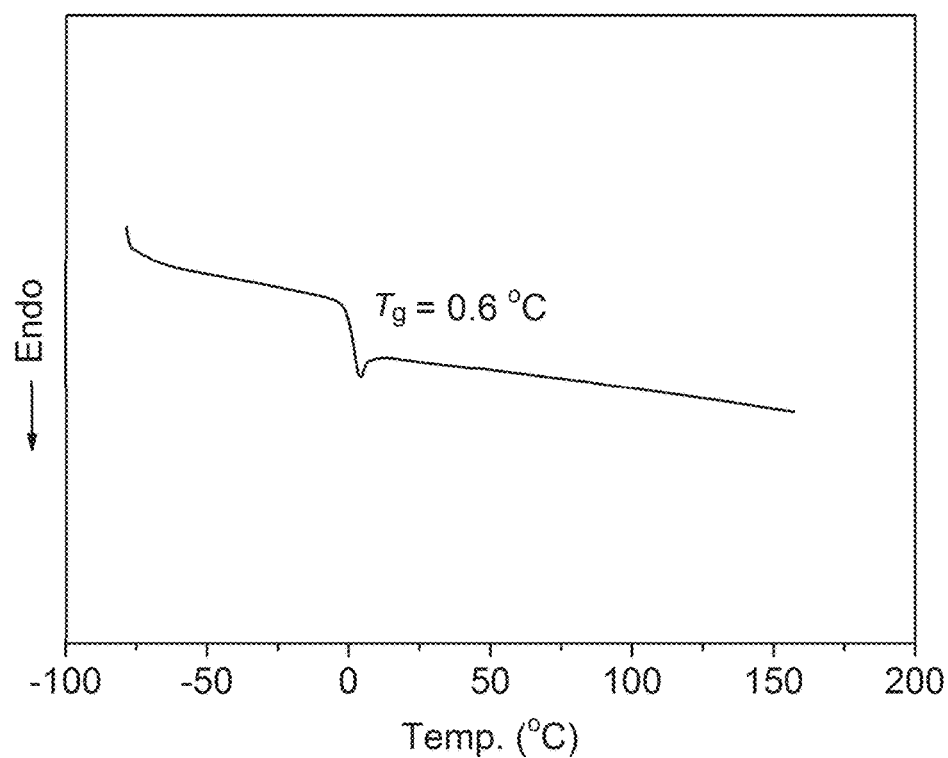
FIG. 6. DSC curves of amorphous, atactic P3HB produced via ROP of β-BL by 4d (top) and perfectly isotactic, highly crystalline P3HB produced by 4d with [rac-DL]/[4d]=800/1 (ΔH$_f$=78.1 J/g) (bottom). The cooling and second heating rate was 10° C./min.
Figure 6:
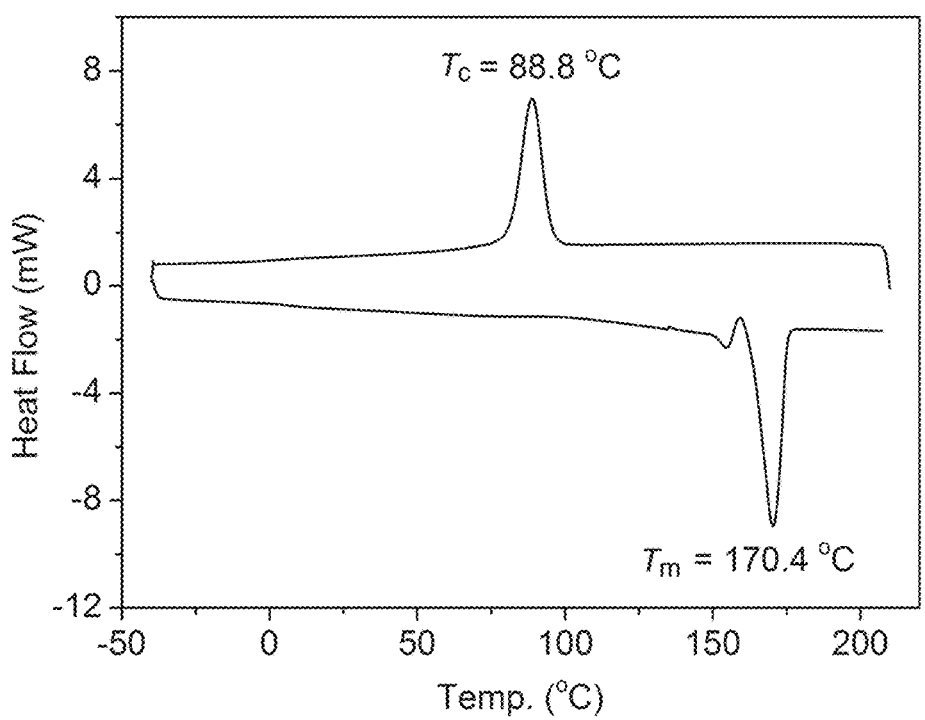

Lastly, to probe the possible effects of the geometry of the backbone diimine linker, we examined the performance of the salph-based complex 4e for the rac-DL polymerization and found that this catalyst afforded P3HB with a considerably lower isotacticity ($P_m$~0.88-0.89, [mm]=79%, runs 14 and 15), as compared with the salcy-based analogue complex 4a under identical conditions ($P_m$~0.93-0.94, [mm]=89%, runs 3 and 4). It is worth noting here that the high stereoselectivity of catalysts 4 observed for the ROP of rac-DL does not apply to the ROP of rac-β-BL. For example, the ROP of rac-β-BL by the best catalyst of the series, 4d, was not only sluggish (even with a high catalyst loading of 10 mol % the reaction required 8 h to achieve 96% monomer conversion) but also non-stereoselective, producing atactic P3HB (FIG. 1, FIG. 6). These results further highlight the importance of the steric interplay and matching between the catalyst and monomer structures to achieve a highly stereoselective ROP of such racemic lactone and diolide monomers.

Figure 2:
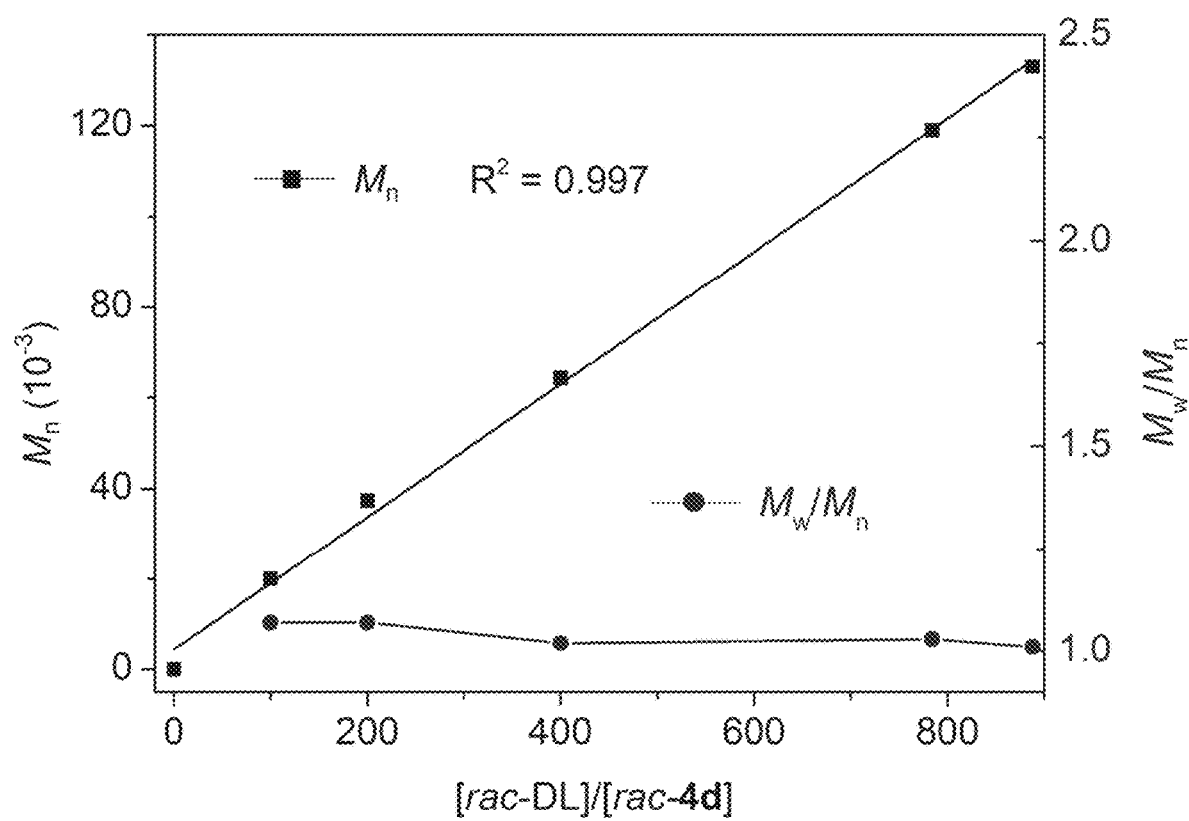
FIG. 2. Degree of control over the molecular weight and dispersity in the ROP of rac-DL. Plots of $M_n$ and Đ values of isotactic P3HB produced by catalyst 4d at varied [rac-DL]/[4d] ratios. The runs at 800/1 and 1200/1 ratios under the same conditions (0.8 mL DCM, 60 min) did not achieve quantitative conversions; thus, the ratios used for the plot were adjusted by their conversions (98% and 74%, respectively).

Having identified catalyst 4d being the best catalyst of this series, we further examined the ability of this catalyst to control the molecular weight so that practically useful high-molecular-weight isotactic P3HB with $M_n$>10$^5$ g/mol could be synthesized. To this end, we varied the [rac-DL]/[4d] feed ratio from 100/1 to 1200/1 and found the molecular weight of the resulting P3HB increased linearly (R$^2$=0.997, FIG. 2) from medium $M_n$=2.01×10$^4$ g/mol (Đ=1.07) to high $M_n$=1.54×10$^5$ g/mol (Đ=1.01), while all the Đ values remained low in a narrow range from 1.01 to 1.07 (runs 9-13, Table 2). These observations, coupled with the calculated high initiation efficiencies of >88% for all the polymerization runs by catalyst 4d, pointed to a well-controlled ROP of rac-DL.

Figure 3:
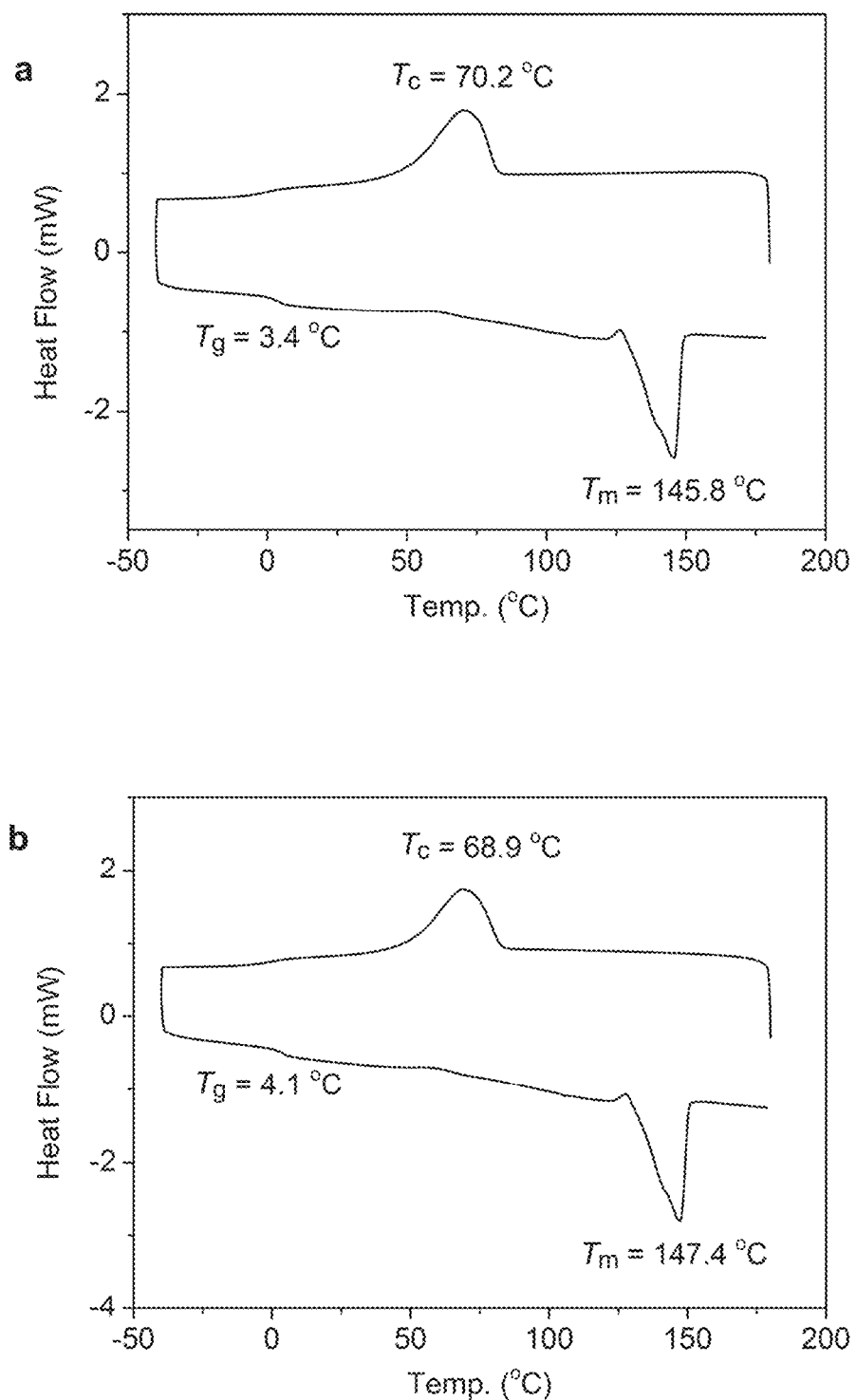
FIG. 3. Thermal properties of P3HB derived from the ROP of rac-DL: a) [rac-DL]/[4a]=200/1 (ΔH$_f$=40.9 J/g); b) [rac-DL]/[4b]=200/1 (ΔH$_f$=47.0 J/g); c) [rac-DL]/[4c]=200/1 (ΔH$_f$=56.5 J/g); d) [rac-DL]/[4d]=200/1 (ΔH$_f$=79.3 J/g); e) [rac-DL]/[4d]=400/1 (ΔH$_f$=80.4 J/g); f) (6) [rac-DL]/[4d]=1200/1 (ΔH$_f$=78.6 J/g). Crystallization temperature (T$_c$) and melting-transition temperature (T$_m$) taken from the cooling and second heating scans, respectively.
Figure 3:
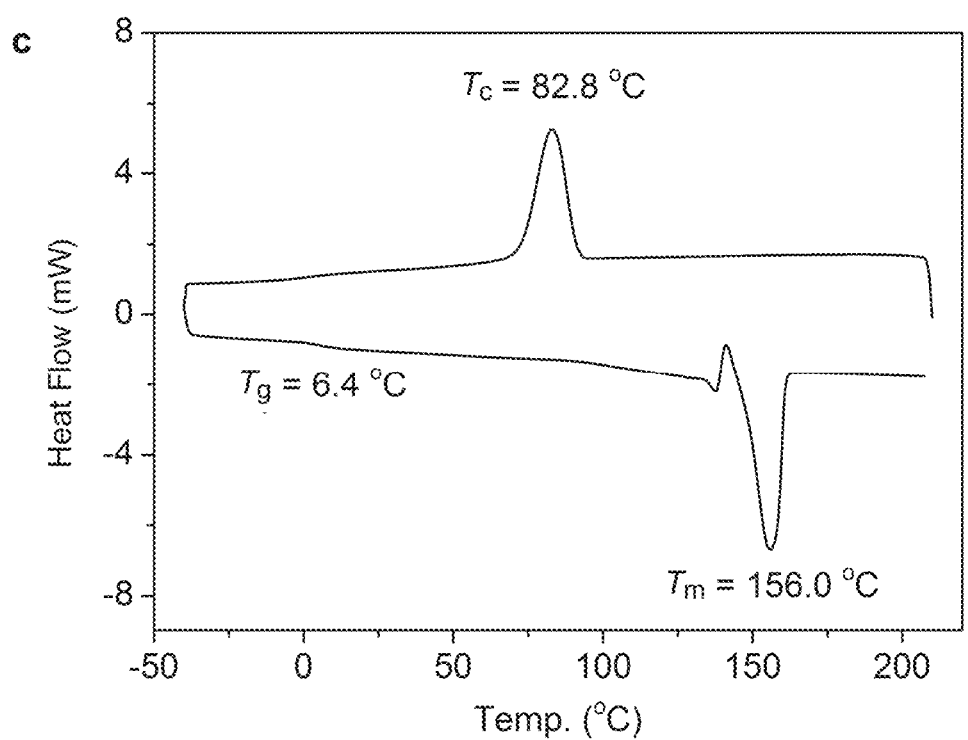
Figure 3:
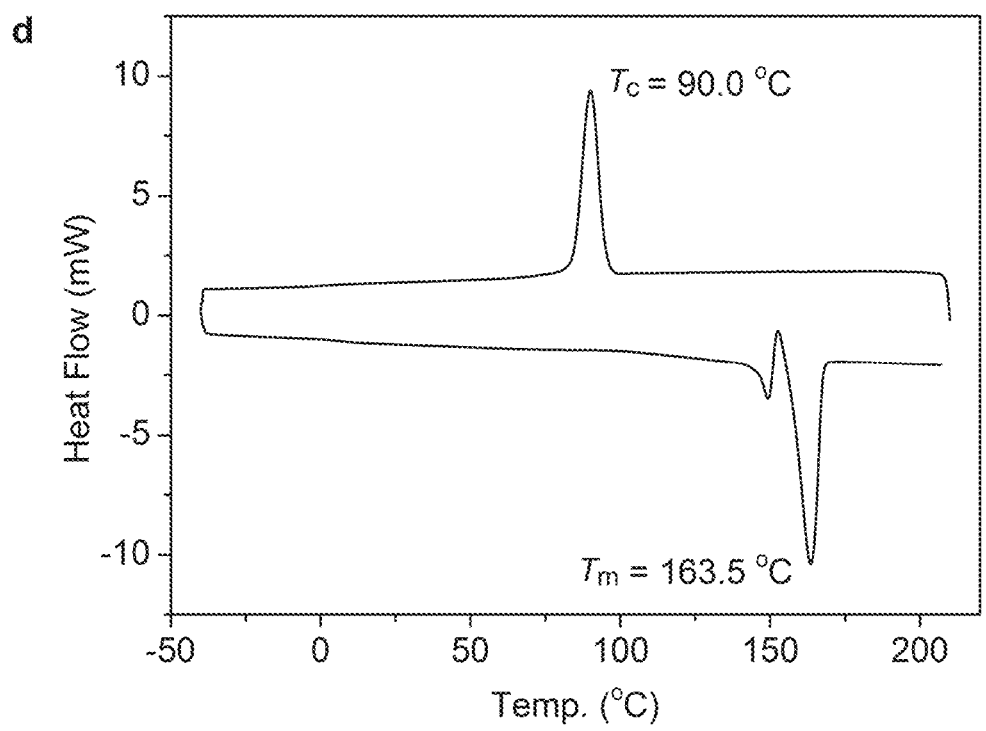
Figure 3:
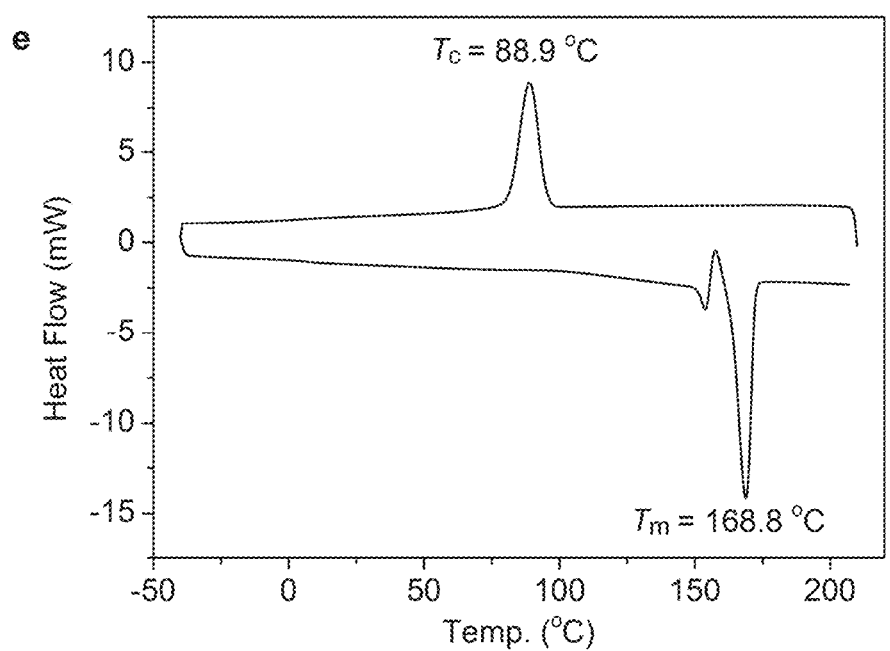
Figure 3:
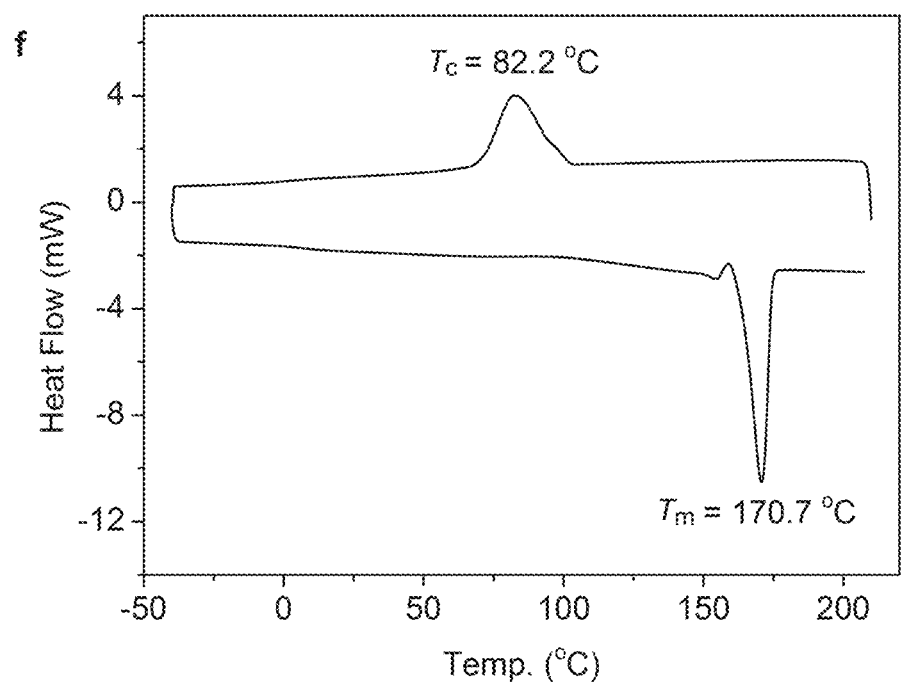

DSC curves of the isotactic P3HB materials produced by the ROP of rac-DL with catalysts 4a-4d under identical conditions ([rac-DL]/[4]=200/1, DCM, RT, 20 min, 100% conversion) were compared in FIG. 3. Consistent with the gradual increase of the isotacticity of P3HB on going from 4a to 4d, the $T_m$ value was observed to increase from 146° C. (4a) to 147° C. (4b), 156° C. (4c), and 164° C. (4d). Noteworthy also is the steadily enhanced heat of fusion (ΔH$_f$) from 4a to 4d: 40.9, 47.0, 56.5; and 79.3 J/g, which corresponds to an increase in the P3HB crystallinity from 28% to 32%, 39%, and 54%, relative to the estimated ΔH$_f^o$ value (146 J/g) for an infinite crystal of 100% crystalline P3HB. Furthermore, the $T_m$ value of the perfectly isotactic P3HB produced by catalyst 4d depends somewhat on the polymer $M_n$. When $M_n$ was enhanced from $2.01 \times 10^4$ to $3.74 \times 10^4$, $6.43 \times 10^4$, $1.19 \times 10^5$, and $1.54 \times 10^5$ g/mol (runs 9-13, Table 2), $T_m$ increased accordingly from 161 to 164, 169, 170, and 171° C. These are essentially perfectly isotactic, highly crystalline materials, with high $\Delta H_f$ values of ~80 J/g (FIG. 3, FIG. 6).

Figure 4:
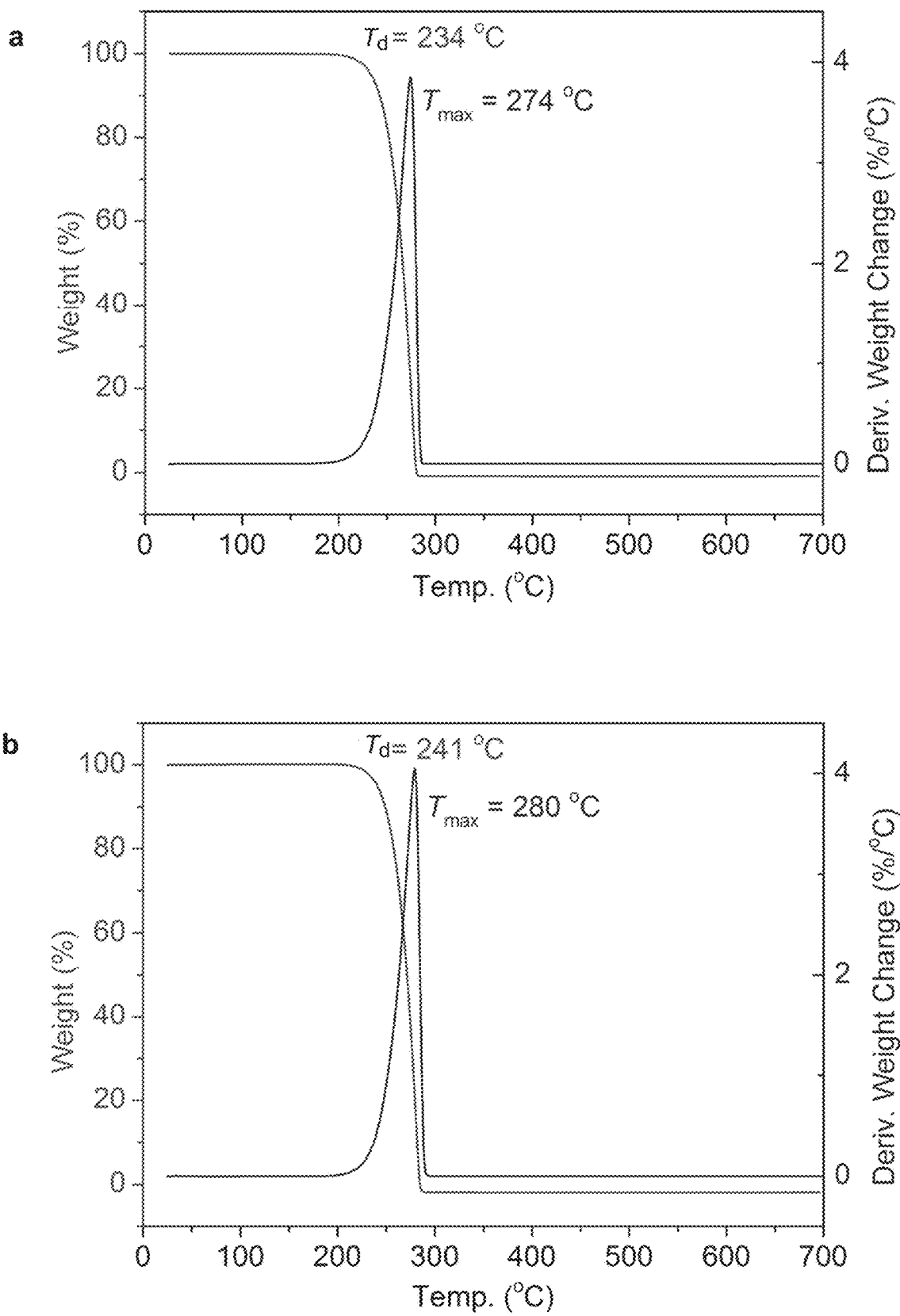
FIG. 4. Thermal stability of P3HB derived from the ROP of rac-DL: a) TGA and DTG of P3HB produced by catalyst 4a, $M_n$=3.20×10$^4$ g/mol, Đ=1.03, [mm]=89%; and b) TGA and DTG of P3HB produced by catalyst 4d, $M_n$=1.19×10$^5$ g/mol, Đ=1.03, [mm]>99%.
Figure 7:
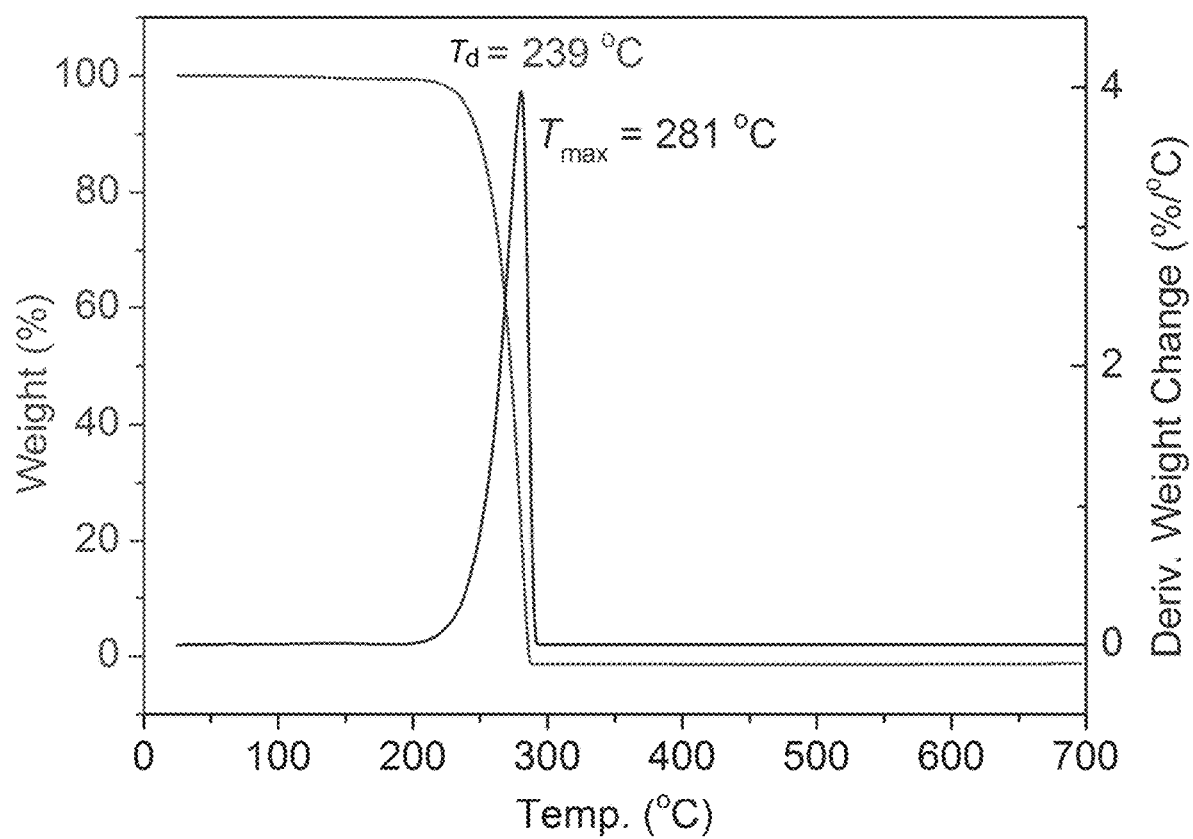
FIG. 7. TGA and DTG curves of P3HB produced by [rac-DL]/[4d]=200/1 ($M_n$=3.74×10$^4$ g/mol, Đ=1.07, [mm]>99%).

Thermal degradation profiles of the selected isotactic P3HB samples derived from the ROP of rac-DL by catalysts 4a and racemic 4d were examined by thermal gravimetric analysis (TGA). As can be seen from the TGA and derivative thermogravimetry (DTG) curves (FIG. 4), the P3HB produced by 4a ($M_n = 3.20 \times 10^4$ g/mol, Đ=1.03, [mm]=89%) exhibited a decomposition temperature ($T_d$) (defined by the temperature of 5% weight loss in the TGA curve) of 234° C. and a maximum rate decomposition temperature ($T_{max}$) of 274° C. This results in the $T_d$~90° C. above its $T_m$, proving a window for melt processing. A P3HB sample produced by 4d with a similar $M_n$ ($3.74 \times 10^4$ g/mol) but a much higher isotacticity of [mm]>99% exhibited a somewhat higher $T_d$ of 239° C. and $T_{max}$ of 281° C. (FIG. 7). Keeping the tacticity the same ([mm]>99%) while increasing the molecular weight to $M_n = 1.19 \times 10^5$ g/mol enhanced the $T_d$ only slightly to 241° C. (FIG. 4).

The above results demonstrated that the polymerization of rac-DL by rac-4d produced P3HB with essentially perfect isotacticity. However, these exciting results also brought about three important fundamental questions: (1) Can enantiomeric catalysts (R,R)-4d and (S,S)-4d kinetically resolve racemic monomer rac-DL; (2) What is the stereocontrol mechanism—enantiomorphic-site control or chain-end control; and (3) What is the isotactic polymer stereomicrostructure—1:1 mixture of poly[(R,R)-DL] and poly[(S,S)-DL]), stereoblock of poly(rac-DL), or tapered block copolymer poly[(R,R)-DL]-co-[(S,S)-DL].

To address these questions, the corresponding enantiomeric catalysts (R,R)-4d and (S,S)-4d have been successfully synthesized and subsequently employed to perform kinetic resolution polymerization of rac-DL with both enantiomeric catalysts, the results of which were summarized in Table 3. In sharp contrast to the polymerization by rac-4d with a [rac-DL]/[rac-4d] ratio of 400 or 800 that achieved a quantitative monomer conversion after 20 min, the same polymerization by (R,R)-4d or (S,S)-4d achieved a conversion of ~50% (runs 1-2 and 4-5, Table 3), after which no further monomer conversion can be achieved, even after extended times (6 h). This is indicative of exclusive catalyst site selectivity for the ROP of one particular enantiomer of the monomer.

Characterizations of the ~50% unreacted, pure monomer exhibited identical NMR spectra to that of rac-DL. The specific rotation of the unreacted monomer produced by (R,R)-4d was measured to be from −94.8° to −94.5° (runs 1-2, Table 3), which agrees well with the reported value of (R,R)-DL. The specific rotation of the unreacted monomer by (S,S)-4d was from +93.7 to +94.6 (runs 4-5, Table 3), which is assigned to be (S,S)-DL accordingly. The enantiomeric excess (e.e.) of the unreacted monomer was determined by chiral HPLC coupled with a Chiralcel OD-H column and was determined to be >99% e.e. for all the runs with conversion at ~50% (runs 1-2 and 4-5, Table 3). It is noted here that the [rac-DL]/[4d]=1600 runs achieved 43-44% conversion after 60 min (runs 3 and 6); accordingly, the e.e.'s of the unreacted monomer was only 80-85%, respectively. Overall, these results indicate that (R,R)-4d exhibits exclusive selectivity for the ROP of (S,S)-DL, while (S,S)-4d polymerizes (R,R)-DL exclusively. Based on the quantitative e.e.'s (>99%) for the optically resolved, unreacted monomer, the stereoselectivity factor s for both enantiomeric catalysts was calculated to be >$10^3$. These profound results also indicated an enantiomorphic-site control mechanism for the stereoselective ROP process.

Figure 5:
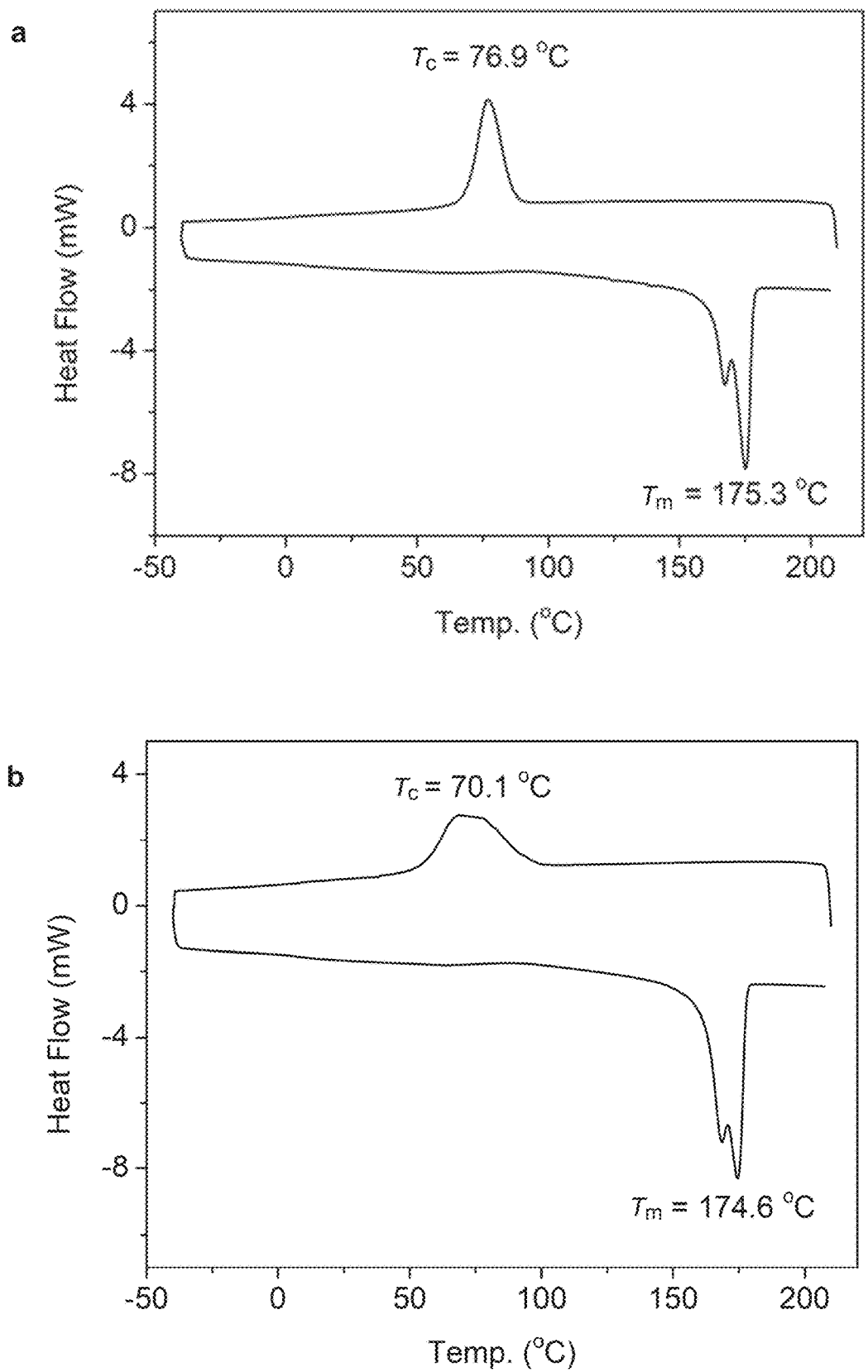
FIG. 5. DSC curves of poly[(R)-3HB] materials: a) Produced via chemical ROP of rac-DL by (S,S)-[4d]; and b) Commercial natural poly[(R)-3-hydroxybutyric acid] purchased from Sigma-Aldrich. T$_c$ and T$_m$ values taken from the cooling and second heating scans, respectively.
Figure 8:
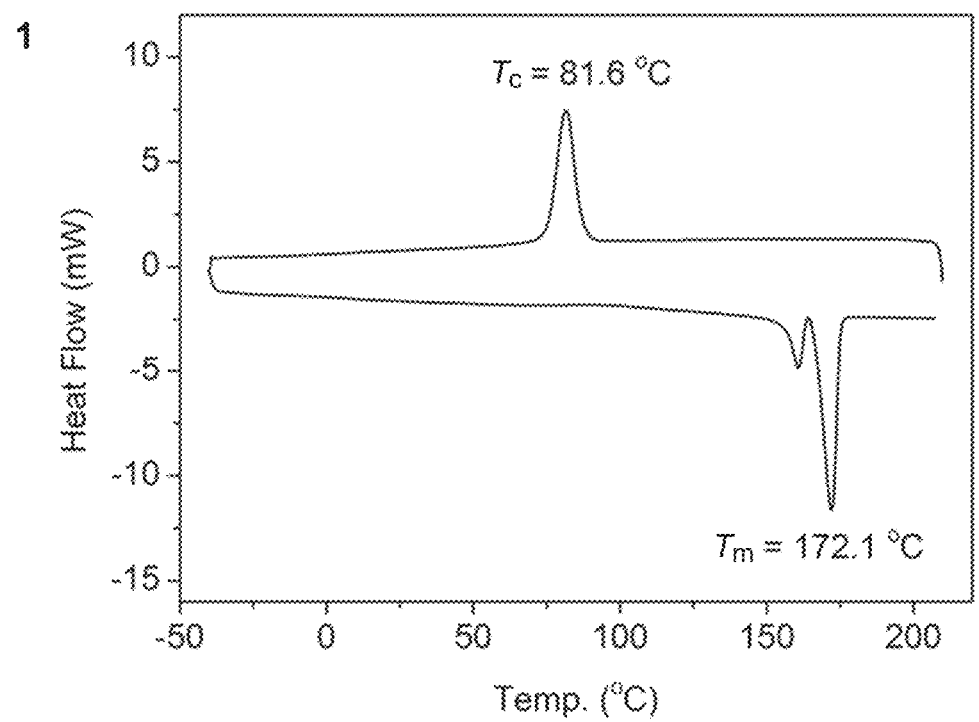
FIG. 8. DSC curves of enantiomeric P3HB by (R,R)-4d and (S,S)-4d: 1) [rac-DL]/[(R,R)-4d]=400/1 (ΔH$_f$=84.8 J/g); 2) [rac-DL]/[(S,S)-4d]=400/1 (ΔH$_f$=78.9 J/g); 3) [rac-DL]/[(R,R)-4d]=800/1 (ΔH$_f$=87.7 J/g); 4) [rac-DL]/[(S,S)-4d]=800/1 (ΔH$_f$=87.4 J/g); 5) [rac-DL]/[(R,R)-4d]=1600/1 (ΔH$_f$=88.2 J/g); 6) [rac-DL]/[(S,S)-4d]=1600/1 (ΔH$_f$=82.5 J/g). Crystallization temperature (T$_c$) and melting-transition temperature (T$_m$) taken from the cooling and second heating scans, respectively.
Figure 8:
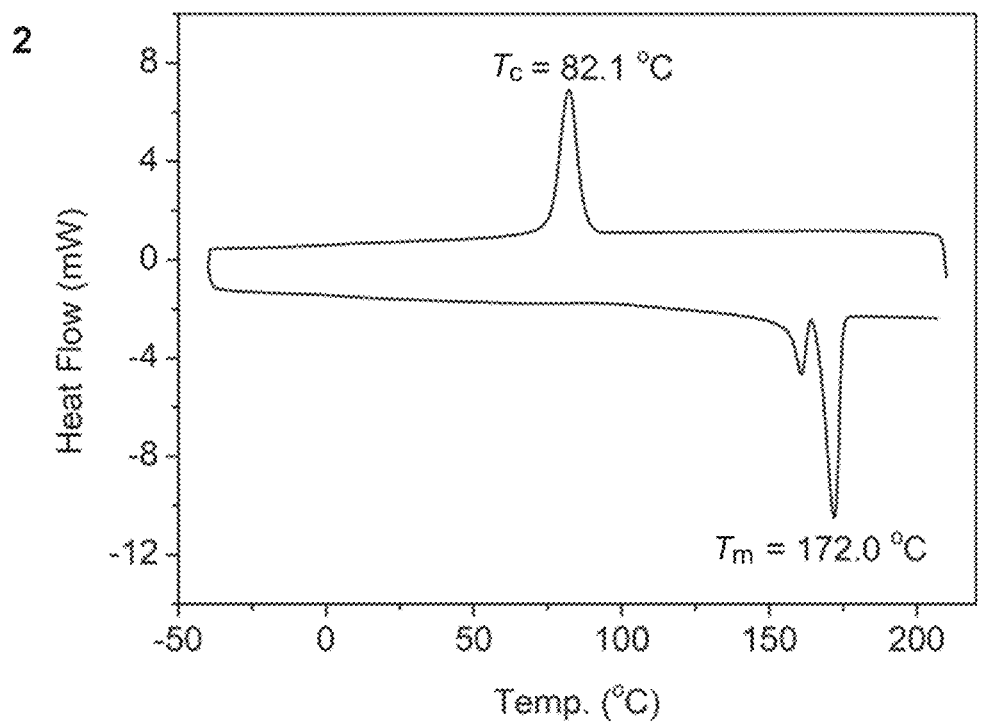
Figure 8:
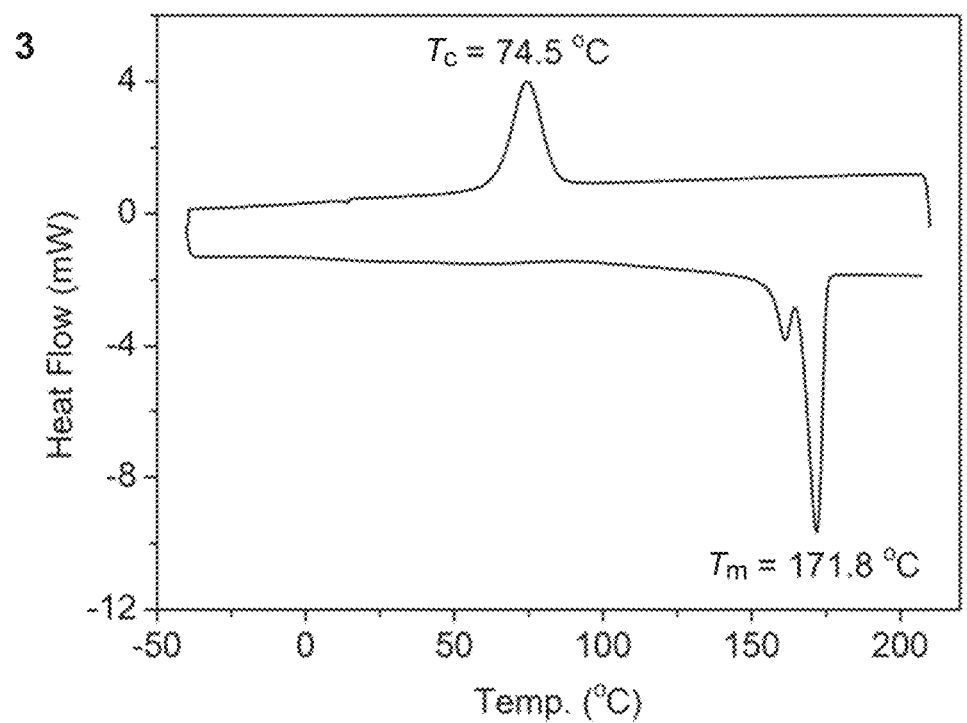
Figure 8:
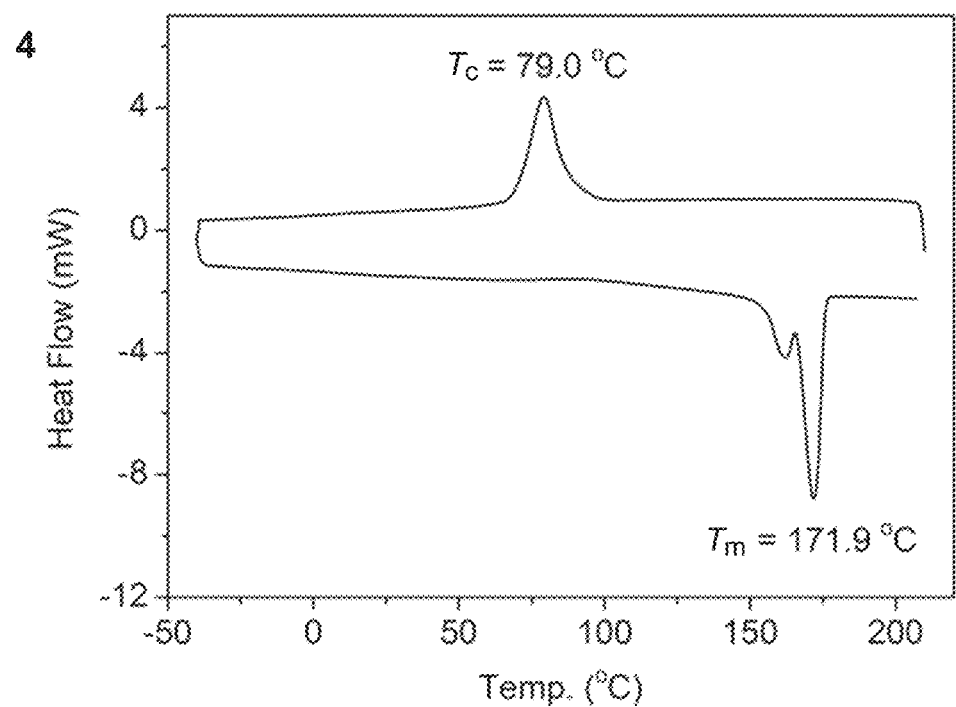
Figure 8:
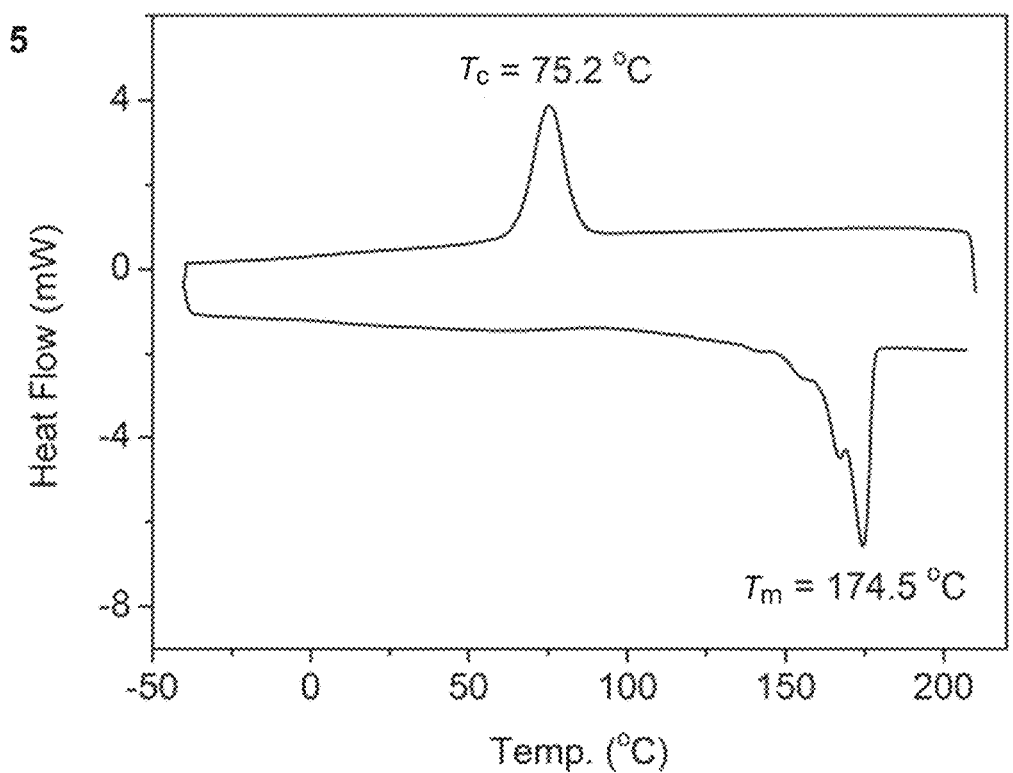
Figure 8:
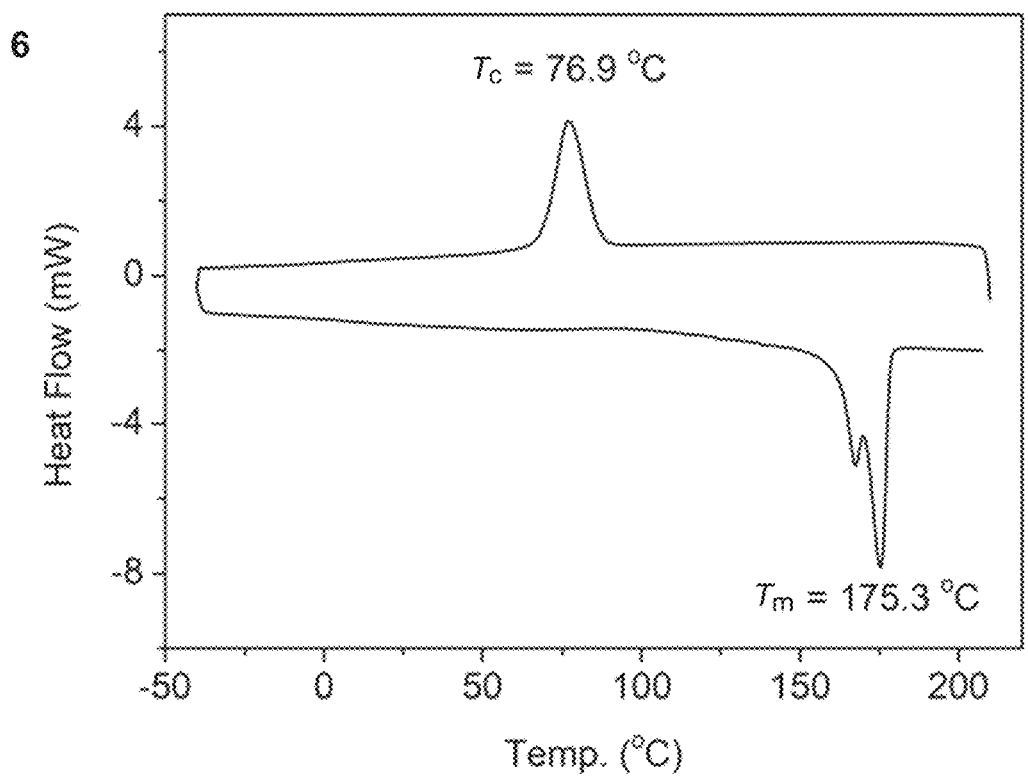

This essentially perfect stereoselectivity enabled the synthesis of enantiomeric poly[(R,R)-DL] and poly[(S,S)-DL] using (S,S)-4d and (R,R)-4d, respectively. The $T_m$ values (Table 3, FIG. 8) of these enantiopure polymers are somewhat higher (by 3-5° C.) than those of isotactic poly(rac-DL) with similar molecular weights, prepared by rac-4d, and also higher (by 5-7° C.) than that of 1:1 mixture of poly[(R,R)-DL] and poly[(S,S)-DL]), indicating no stereocomplexation between two enantiomeric P3HB chains. These enantiopure polymers also exhibit high $\Delta H_f$ values in the range of 79~88 J/g, comparable to that of natural poly[(R)-3HB]. The highest $T_m$ of 175° C. was achieved by the enantiomeric polymers with $M_n$=113-118 kg/mol (runs 3 and 6, Table 3), which, along with the heat of fusion value, is essentially identical to that of the commercial natural poly[(R)-3HB] (FIG. 5).

To gain further insight into the stereomicrostructure of the highly isotactic P3HB produced by rac-4d, the polymers produced at different times and [rac-DL]/[rac-4d] ratios were analyzed by matrix-assisted laser desorption/ionization time-of-flight mass spectroscopy (MALDI-TOF MS). When

TABLE 3

Results of kinetic resolution polymerization of rac-DL by enantiomeric yttrium catalysts (R,R)- and (S,S)-4d and BnOH initiator [a]

| Run | Catalyst | [rac-DL]/ [4d] | Time (min) | Conv. (%) | $M_n$ (kg/mol) | Đ ($M_w/M_n$) | [mm] (%) | $T_m$ [b] (° C.) | $([\alpha]_D^{23})$ (°) [c] | e.e. [d] (%) |
|---|---|---|---|---|---|---|---|---|---|---|
| 1 | (R, R)-4d | 400/1 | 20 | ~50 | 43.0 | 1.07 | >99 | 172 | −94.8 | >99 |
| 2 | (R, R)-4d | 800/1 | 20 | ~50 | 74.8 | 1.05 | >99 | 172 | −94.5 | >99 |
| 3 | (R, R)-4d | 1600/1 | 60 | 43 | 118 | 1.09 | >99 | 175 | −73.6 | 80 |
| 4 | (S, S)-4d | 400/1 | 20 | ~50 | 42.9 | 1.08 | >99 | 172 | +93.7 | >99 |
| 5 | (S, S)-4d | 800/1 | 20 | ~50 | 72.1 | 1.04 | >99 | 172 | +94.6 | >99 |
| 6 | (S, S)-4d | 1600/1 | 60 | 44 | 113 | 1.07 | >99 | 175 | +76.1 | 86 |

[a] Conditions: rac-DL = 0.241 g (1.40 mmol), [rac-DL] = 1.0M in DCM (1.4 mL); room temperature. See footnotes in Table 2 for other explanations.
[b] $T_m$ measured by DSC with the cooling and second heating rate of 10° C./min.
[c] Specific rotation ($[\alpha]_D^{23}$) of the unreacted monomer (DL) in chloroform.
[d] Enantiomeric excess (e.e.) determined by chiral HPLC.

a low ratio of 20/1 was used with a longer reaction time (20 min), the mass spectra showed a pronounced transesterification side reaction. This side reaction was evidenced by the appearances of molecular ion peaks with the spacing between the neighboring peaks being that of the half molar mass of the repeat unit, DL (m/z=172.07). This low ratio also resulted in a higher dispersity (Đ=1.20) and lower isotacticity ($P_m$=0.96). Under these conditions, the microstructure of the resultant isotactic P3HB is a stereoblock polymer, poly[(R)-3HB]-b-poly[(S)-3HB], resulting from transesterification after the reaction reached full conversion (Scheme 5).

Scheme 5. A potential transesterification side reaction occurring after the full monomer conversion has been achieved and the corresponding stereoblock P3CH structures.

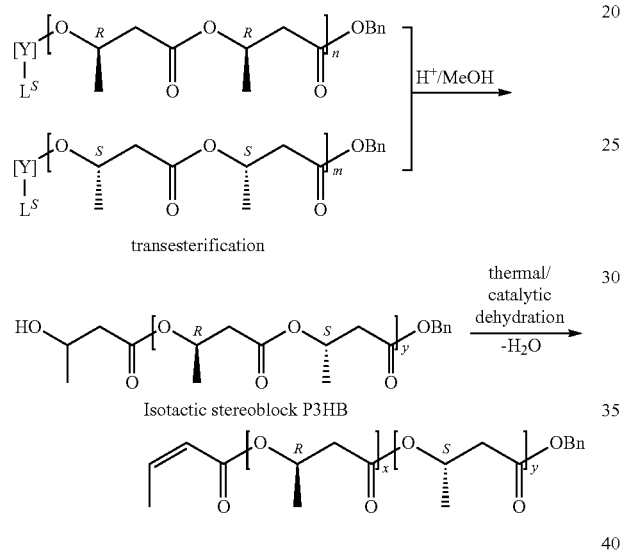

Figure 9:
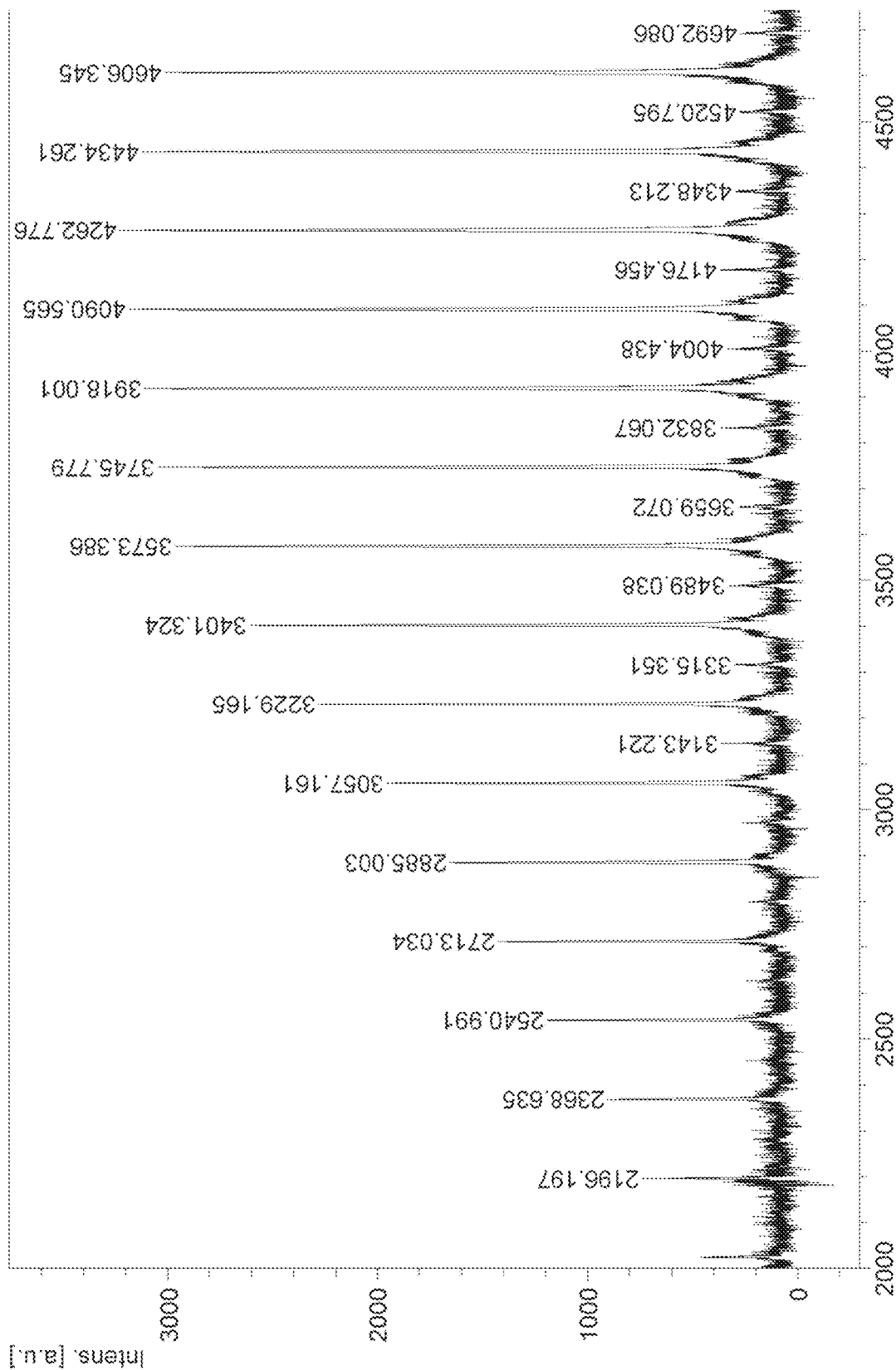
FIG. 9. MALDI-TOF spectrum of P3HB produced with rac-DL/rac-4d/BnOH (20/1/1, 30 s) and plots of m/z values (y) vs the number of rac-DL repeat units (x).
Figure 9:
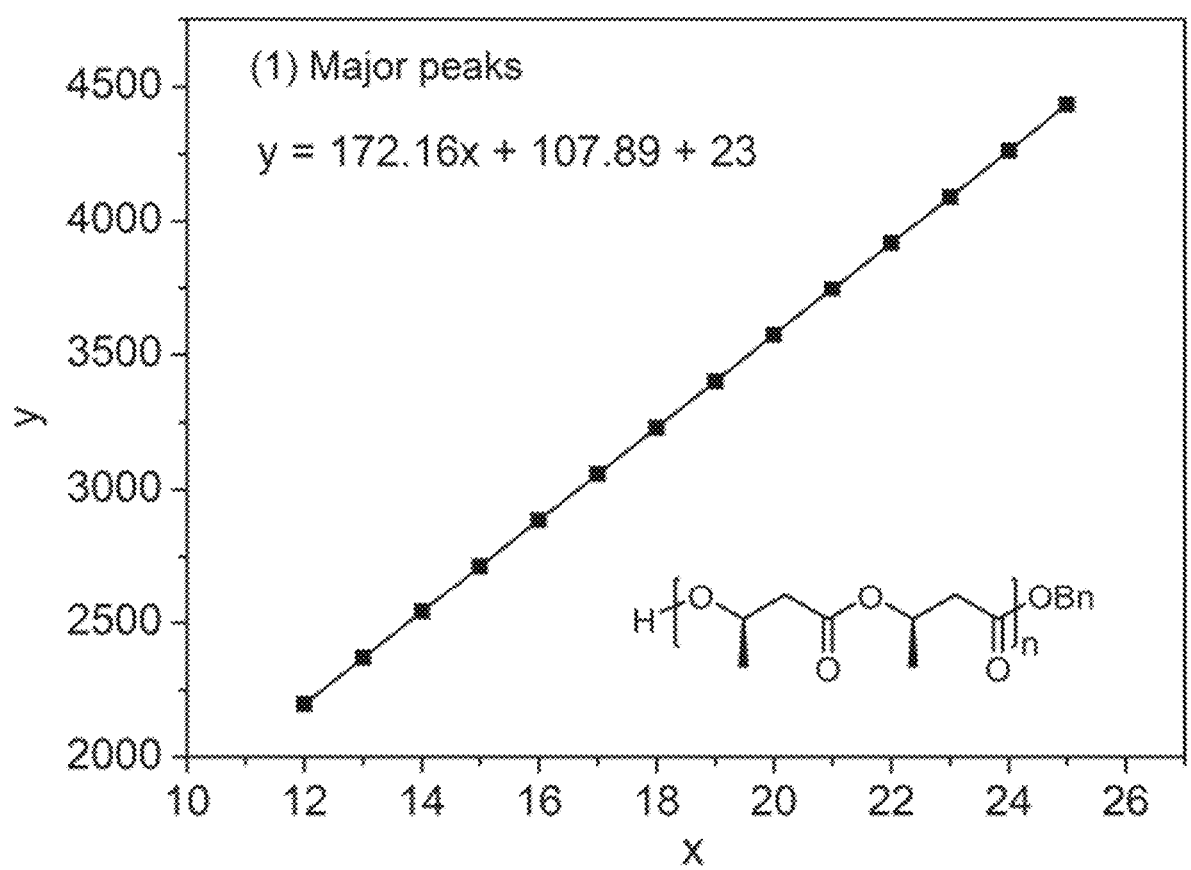

Consistent with this reasoning, when the polymerization was quenched after 30 s (at which time the full conversion was also achieved), the dispersity of the resulting polymer decreased to Đ=1.09. In addition, its mass spectrum displayed nearly exclusive molecular ion peaks with the spacing between the neighboring peaks being that of rac-DL. Here minor peaks were observed with extremely low intensity for the odd 3-HB units (FIG. 9). These results indicate that the transesterification side reaction occurred when the reaction reached full conversion and thus can be essentially shut down by reducing the polymerization time.

In this case, the resulting polymer is predominately a mixture of poly[(R)-3HB] and poly[(S)-3HB], with only a trace amount of stereoblock polymer, poly[(R)-3HB]-b-poly[(S)-3HB]. Obviously, the transesterification side reaction can be also shut down by reducing the catalyst amount in feed with the same reaction time, giving the polymers with very low dispersity indices (Đ=1.01-1.03) at higher [rac-DL]/[rac-4d] feeding ratios. Furthermore, this transesterification side reaction can be shut down by the use of enantiomeric pure catalysts.

Overall, the polymerization of rac-DL by rac-4d, when stopped at full conversion (i.e., no transesterification side reactions), produces a mixture of poly[(R)-3HB] and poly[(S)-3HB], due to its exclusive (R,R)-4d/(S,S)-DL and (S,S)-4d/(R,R)-DL catalyst/monomer selectivity as demonstrated by the kinetic resolution results.

Scheme 6. Proposed catalyst-site controlled coordination-insertion mechanism for the ROP of rac-DL by rac-4d.

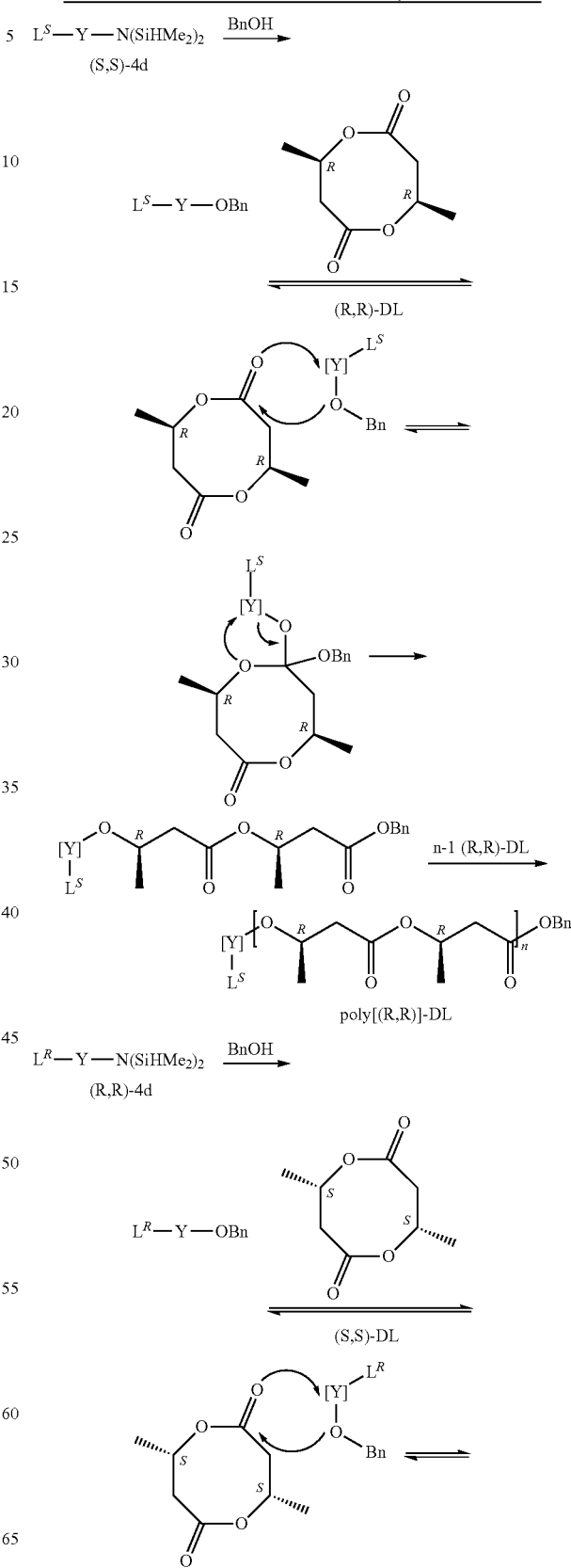

-continued

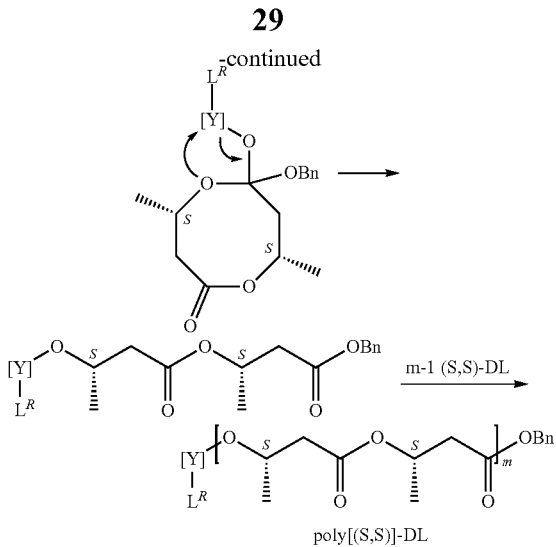

poly[(S,S)]-DL

In summary, the new approach via the ROP of the bio-sourced rac-DL has successfully addressed the 50+-year challenge in the chemical synthesis of bacterial P3HB. This success was enabled by the specifically designed stereoselective molecular catalyst and its steric interplay with the monomer structure, thereby producing the desired P3HB material with perfect isotacticity ([mm]>99%), high crystallinity and melting temperature ($T_m$=171° C.), as well as high molecular weight and low dispersity ($M_n$=154 kg/mol, Đ=1.01). This novel ROP of rac-DL also exhibits a high polymerization rate and efficiency. The resulting highly isotactic P3HB by rac-4d is showed to be the mixture of poly[(R)-3HB] and poly[(S)-3HB] when the polymerization is stopped at full conversion. Thanks to the exclusive (R,R)-4d/(S,S)-DL and (S,S)-4d/(R,R)-DL catalyst/monomer selectivity, kinetic resolution polymerization of rac-DL with enantiomeric catalysts automatically ceases at 50% conversion and yields enantiopure (R,R)-DL and (S,S)-DL with >99% e.e. and the corresponding poly[(S)-3HB] and poly[(R)-3HB] with high $T_m$=175° C. and crystallinity, which is essentially identical to that of the commercial natural poly[(R)-3HB].

The tunability of the catalyst structure allows a rapid entry to P3HB materials with various tacticities (thus tunable thermal and mechanical properties) and predicted molecular weights with low dispersity indices (vs. a typical Đ value of ~2.0 for bacterial P3HB). In addition, the molecular catalysts should allow copolymerization of rac-DL with other monomers to produce 3HB-based copolymers. Altogether, this new ROP of DL represents a paradigm shift in the chemical synthesis of P3HB and opens up a plethora of opportunities for discovering new catalysts, materials, and processes in the ROP of rac-DL and other diastereomers of 3HB cyclic dimers or trimers, and so on.

Embodiments of the Invention

In various embodiments, the invention provides a highly isotactic polymer comprising Formula I:

wherein:
n is about 10 to about 10,000;
R is ($C_1$-$C_{18}$)alkyl, ($C_1$-$C_8$)alkenyl, ($C_1$-$C_8$)alkynyl, benzyl, or aryl; and
Formula I comprises at least 95% isotactic triads with respect to the stereocenters of substituents R on the polymer chain, wherein the at least 95% isotactic triads (mm) have consecutive (R) stereochemical configurations or consecutive (S) stereochemical configurations.

In one embodiment, the polymer comprises at least 99% isotactic triads with respect to the stereocenters of substituents R on polymer chain. In various embodiments, the probability of meso linkages between monomers, $P_m$, for the polymer of Formula I is greater than 0.99.

In one embodiment, the molecular weight $M_n$ is at least about 20 kDa. In additional embodiments, the molecular weight $M_n$ is at least about 35 kDa, at least about 50 kDa, at least about 100 kDa, at least about 150 kDa, at least about 200 kDa, or at least about 250 kDa. In certain embodiments, the molecular weight is about $1\times10^3$ daltons to about $1\times10^6$ daltons, about $1\times10^4$ daltons to about $5\times10^5$ daltons, or about $2\times10^4$ daltons to about $2\times10^5$ daltons.

In various embodiments, the polymer has a melting temperature, $T_m$, of at least 160° C. The polymers typically have a melting temperature, $T_m$, of at least 165° C., at least 169° C., at least 170° C., at least 171° C., at least 172° C., at least 173° C., or at least 174° C.

In some embodiments, the polymer has a crystallinity of at least about 20%, at least about 30%, at least about 40%, or at least about 50%. In certain embodiments, the polymer has a crystallinity of about 20% to about 60%, or about 30% to about 55%. In one specific embodiment, the polymer has a crystallinity of at least about 50% and a heat of fusion $\Delta H_f$ of at least about 72 J/g.

The invention also provides a composition comprising polymers described herein, such as those of Formula I above, wherein the composition comprises approximately equal amounts of polymers having isotactic triads of (R) stereochemical configurations and polymers having isotactic triads of (S) stereochemical configurations. In certain embodiments, the polymers comprise at about 90% to about 99% isotactic pentads with respect to the carbons having substituent R of the polymer chains.

In one specific embodiment, the polymer of Formula I has a molecular weight $M_n$ of at least 40 kDa or at least about 100 kDa, a dispersity index of less than 1.2, and a melting temperature, $T_m$, of at least 171° C.

The dispersity index $M_w/M_n$ of the polymers described herein can be less than about 1.2. In certain embodiments, the dispersity index $M_w/M_n$ of the polymers is less than 1.2, less than 1.1, less than 1.09, less than 1.08, less than 1.07, less than 1.06, or less than 1.05. In some embodiments, the polymer dispersity is about 1.01 to about 1.1, about 1.01 to about 1.09, about 1.01 to about 1.08.

Copolymers described herein can include a polymer described herein in combination with a polyester of lactone monomers.

The invention further provides a copolymer comprising Formula II:

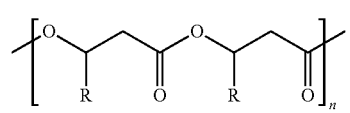
(I)

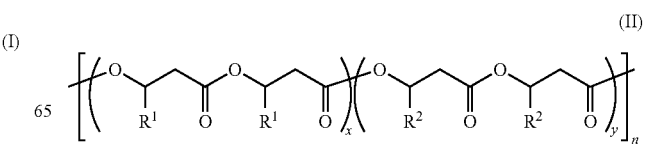
(II)

wherein:
x is about 1 to about 100;
y is about 1 to about 100;
n is about 10 to about 5,000;
each $R^1$ is $(C_1-C_{18})$alkyl, $(C_1-C_8)$alkenyl, $(C_1-C_8)$alkynyl, benzyl, or aryl; and
each $R^2$ is $(C_1-C_{18})$alkyl, $(C_1-C_8)$alkenyl, $(C_1-C_8)$alkynyl, benzyl, or aryl.

The x block of Formula II comprises at least 95% isotactic triads with respect to the stereocenters of substituents $R^1$ on the polymer chain, wherein the at least 95% isotactic triads (mm) have consecutive (R) stereochemical configurations or consecutive (S) stereochemical configurations.

The y block of Formula II comprises at least 95% isotactic triads with respect to the stereocenters of substituents $R^2$ on the polymer chain, wherein the at least 95% isotactic triads (mm) have consecutive (R) stereochemical configurations or consecutive (S) stereochemical configurations. Additionally and/or alternatively, the y block of Formula II comprises consecutive $R^2$ groups having (R) and (S) configurations, consecutive $R^2$ groups having (S) and (R) configurations, or consecutive $R^2$ groups having stereochemical configurations the opposite of the main stereochemical configuration of the x block.

The polymer of Formula II can comprise isotactic random copolymer portions and/or syndiotactic random copolymer portions.

The invention yet further provides a copolymer comprising Formula III:

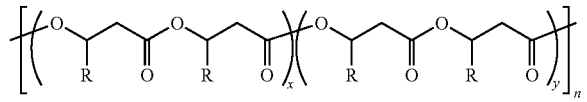

wherein:
x is about 10 to about 5,000;
y is about 10 to about 5,000;
n is 1-50;
each R is $(C_1-C_{18})$alkyl, $(C_1-C_8)$alkenyl, $(C_1-C_8)$alkynyl, benzyl, or aryl;
the x block of Formula III comprises at least 95% isotactic triads with respect to the stereocenters of substituents R on the polymer chain, wherein the at least 95% isotactic triads (mm) have consecutive (R) stereochemical configurations or consecutive (S) stereochemical configurations; and the y block of Formula III comprises consecutive R groups having (R) and (S) configurations, consecutive R groups having (S) and (R) configurations, or consecutive R groups having stereochemical configurations the opposite of the main stereochemical configuration of the x block;

wherein the polymer of Formula III is an isotactic-b-syndiotactic stereodiblock or stereotapered copolymer. Also provided are methods of making the polymers of Formula III by selection of the corresponding diolides and appropriate catalyst. For example, a copolymer comprising Formula III, such as an isotactic-b-syndiotactic block polymer, can be prepared as shown in Scheme A:

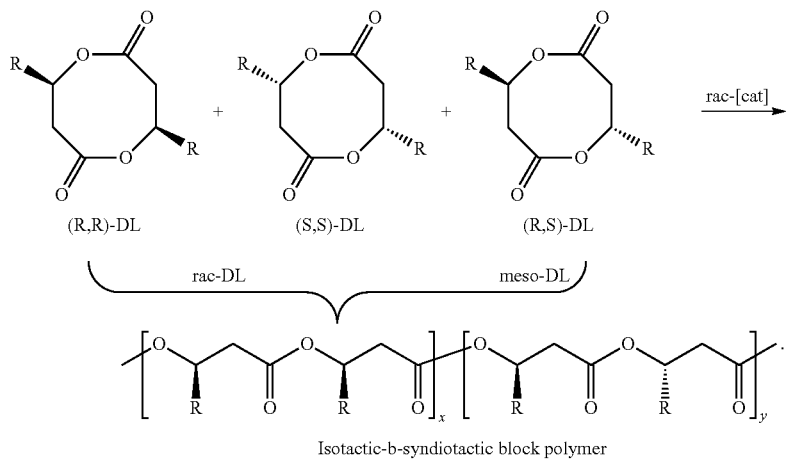

The invention additionally provides a copolymer comprising Formula IV:

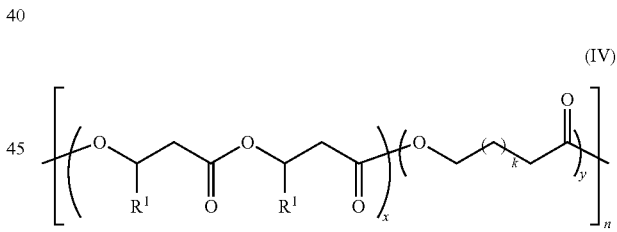

wherein:
x is about 1 to about 100;
y is about 1 to about 100;
k is about 1 to 16;
n is 10 to about 5,000;
R is $(C_1-C_{18})$alkyl, $(C_1-C_8)$alkenyl, $(C_1-C_8)$alkynyl, benzyl, or aryl; and
the x block of Formula IV comprises at least 95% isotactic triads with respect to the stereocenters of substituents R on the polymer chain, wherein the at least 95% isotactic triads (mm) have consecutive (R) stereochemical configurations or consecutive (S) stereochemical configurations.

Polymers comprising Formula IV can be made as described herein. For example, an isotactic PHA-polylactone random copolymer can be prepared as shown in Scheme B:

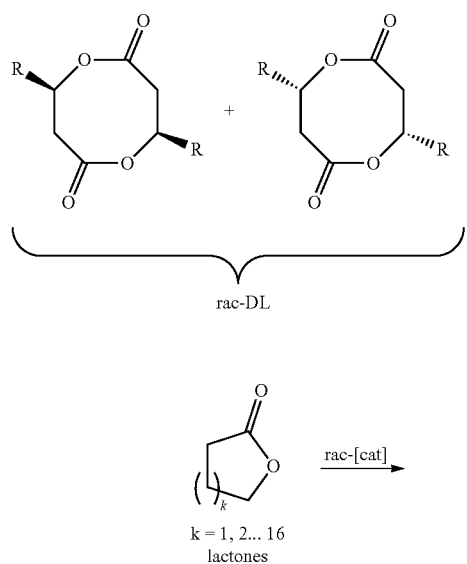

rac-DL

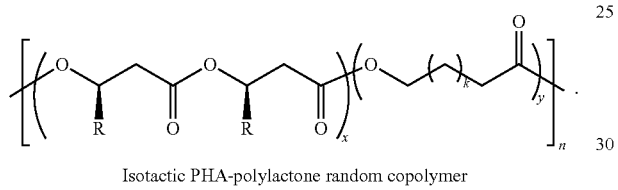

k = 1, 2 ... 16
lactones

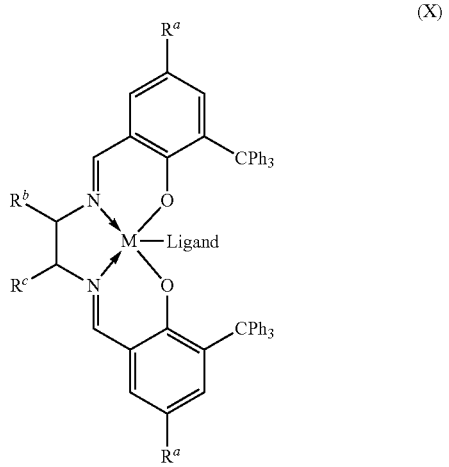

Isotactic PHA-polylactone random copolymer

The invention also provides a metal complex of Formula X:

(X)

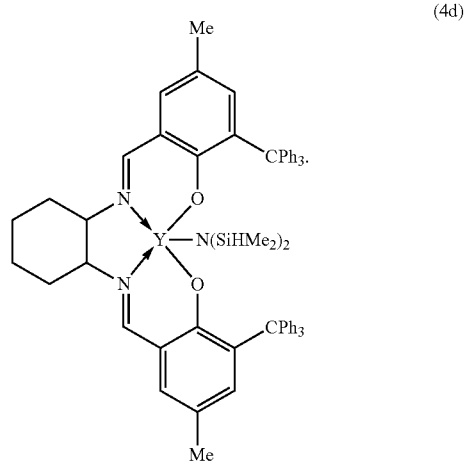

wherein:
M is Sc, Y, or a lanthanide(III) metal;
Ligand is —$OR^x$, —$NR^x_2$, or —$N(SiR^y_3)_2$, wherein $R^x$ is alkyl, and each $R^y$ is H or alkyl, wherein at least two $R^y$ groups are alkyl;
$R^a$ is H, alkyl, or phenyl; and
$R^b$ and $R^c$ are H, alkyl, or phenyl; or
$R^b$ and $R^c$ together with the carbon atoms to which they are attached form a 5, 6, 7, or 8 membered cycloalkyl group.

In one embodiment, the metal complex is the complex 4d:

(4d)

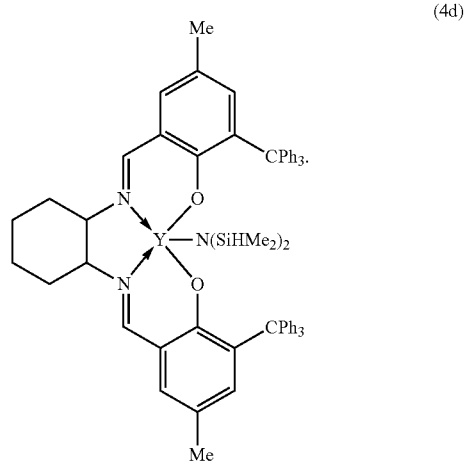

The invention also provides a method for preparing an isotactic or syndiotactic polymer of Formula I:

(I)

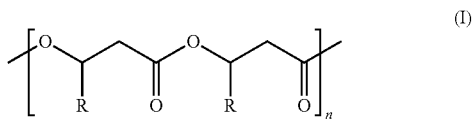

wherein:
n is about 10 to about 10,000; and
R is ($C_1$-$C_{18}$)alkyl, ($C_1$-$C_8$)alkenyl, ($C_1$-$C_8$)alkynyl, benzyl, or aryl;
the method comprising contacting one or more monomers, an effective amount of a metal complex, and an alcohol initiator to initiate a ring opening polymerization reaction;
wherein:
the monomer is a monomer of Formula V:

(V)

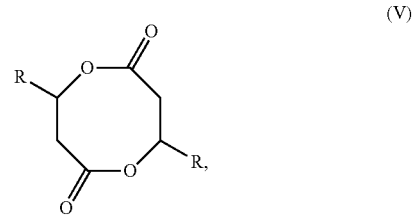

wherein R is as defined for Formula I; and
the metal complex is a metal complex of Formula X, for example, the metal complex 4d; to thereby form the isotactic or syndiotactic polymer of Formula I.

In one embodiment, Formula I comprises at least 95% isotactic triads with respect to the stereocenters of substituents R on the polymer chain, wherein the at least 95% isotactic triads (mm) have consecutive (R) stereochemical configurations or consecutive (S) stereochemical configurations.

In another embodiment, the monomer of Formula V is a racemic mixture, the metal complex of Formula X is a racemic mixture, and the polymers of Formula I formed are a mixture of highly isotactic (R) polymers and highly isotactic (S) polymers.

In further embodiments, the polymer of Formula I has a molecular weight $M_n$ of at least 40 kDa, a dispersity index of less than 1.2, and a melting temperature, $T_m$, of at least 171° C.

In additional embodiments, the monomer of Formula V is a meso diastereomer, and the polymers of Formula I formed are highly syndiotactic polymers wherein probability of racemic linkages between monomers, $P_r$, is greater than 0.94 and the melting temperature, $T_m$, of the polymers formed is greater than 174° C. In further embodiments, method can employ a pair of meso diastereomers to provide a polymer of Formula I.

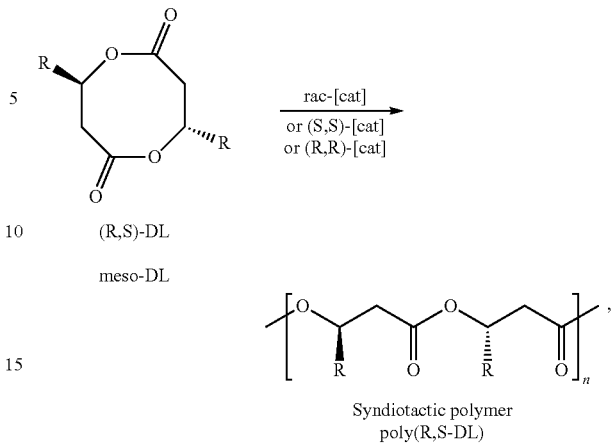

(R,S)-DL
meso-DL

Syndiotactic polymer
poly(R,S-DL)

to provide a syndiotactic polymer.

The invention also provides a method for preparing a polymer of Formula II:

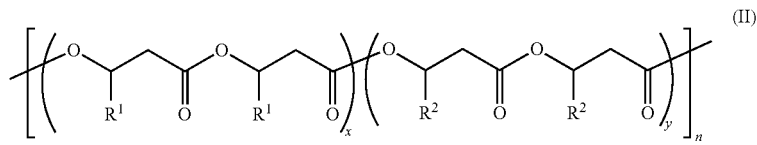

(II)

wherein:
x is about 1 to about 100;
y is about 1 to about 100;
n is about 10 to about 5,000;
each $R^1$ is $(C_1-C_{18})$alkyl, $(C_1-C_8)$alkenyl, $(C_1-C_8)$alkynyl, benzyl, or aryl;
each $R^2$ is $(C_1-C_{18})$alkyl, $(C_1-C_8)$alkenyl, $(C_1-C_8)$alkynyl, benzyl, or aryl;
the method comprising contacting two or more monomers, an effective amount of a metal complex, and an alcohol initiator to initiate a ring opening polymerization reaction;
wherein:
the two or more monomers are monomers of Formula V-A and V-B:

In one embodiment, a polymer comprising Formula I can be prepared as shown in Scheme C:

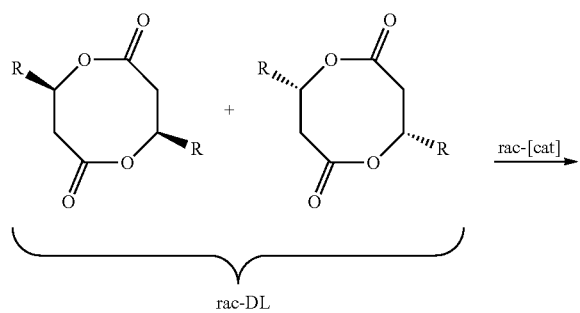

rac-DL

Isotactic polymer to provide a mixture of poly(R)-DL and poly(S)-DL polymers of Formula I.

In another embodiment, a polymer comprising Formula I can be prepared as shown in Scheme D:

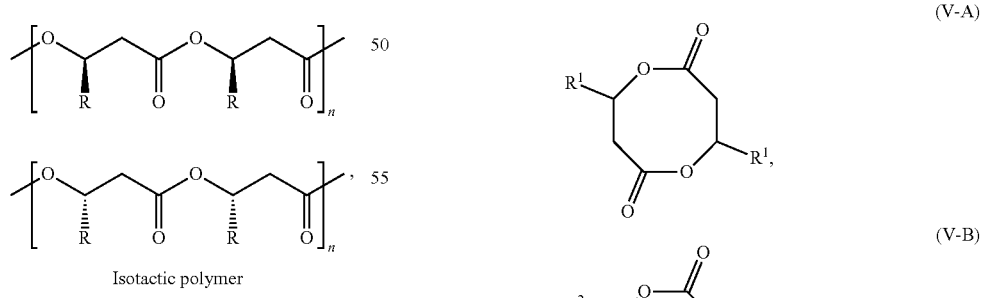

(V-A)

(V-B)

wherein $R^1$ and $R^2$ are as defined for Formula II; and the metal complex is a metal complex of Formula X, for example, the metal complex 4d; to thereby form a isotactic, syndiotactic, or isotactic-b-syndiotactic stereodiblock or stereotapered polymers polymer of Formula II.

In one embodiment, the monomers of Formulas V-A and V-B comprise a mixture of meso and racemic diastereomers and the polymers formed are isotactic-b-syndiotactic stereodiblock or stereotapered polymers.

In another embodiment, the monomers of Formulas V-A and V-B comprise a mixture of racemic monomers wherein $R^1$ of Formula V-A is different than $R^2$ of Formula V-B, and the polymers formed are isotactic random copolymers.

In further embodiments, the monomers of Formulas V-A and V-B comprise a mixture of meso and racemic diastereomers, and wherein $R^1$ of Formula V-A is different than $R^2$ of Formula V-B, and the polymers formed are isotactic-b-syndiotactic diblock copolymers or stereotapered copolymers.

The invention yet further provides a method of kinetically resolving a racemic mixture of diolides comprising (R,R)-diolides and (S,S)-diolides of Formula V:

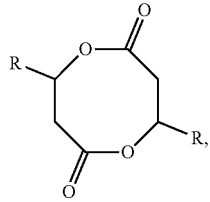

(V)

wherein R is $(C_1-C_6)$alkyl, $(C_1-C_6)$alkenyl, $(C_1-C_6)$alkynyl, benzyl, or aryl;

the method comprising contacting the racemic mixture of diolides of Formula V with an effective amount of a metal complex of Formula (S,S)-X or (R,R)-X, such as a yttrium complex of (S,S)-4d or (R,R)-4d:

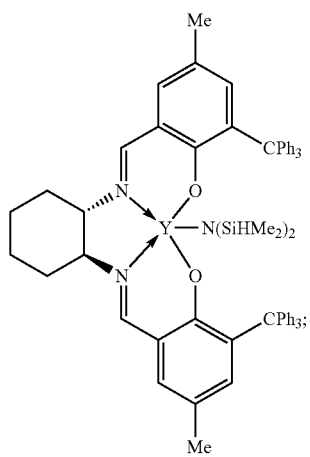

(S,S)-(4d)

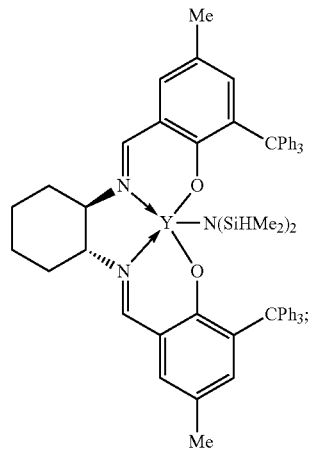

(R,R)-(4d)

in the presence of an alcohol initiator;

to initiate a ring opening polymerization reaction of the (R,R)-diolides by the metal complex of Formula (S,S)-X to provide (S,S)-diolides having an enantiomeric excess of greater than 99% and a polymer of Formula (R)-I:

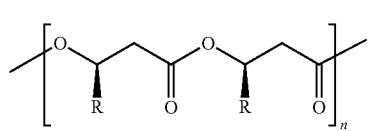

(R)-(I)

wherein n is about 50 to about 10,000, and R is as defined for Formula V; or to initiate a ring opening polymerization reaction of the (S,S)-diolides by the metal complex of Formula (R,R)-X to provide (R,R)-diolides having an enantiomeric excess of greater than 99% and a polymer of Formula (S)-I:

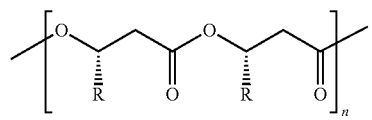

(S)-(I)

wherein n is about 50 to about 10,000, and R is as defined for Formula V. In one embodiment, the polymer of Formula (R)-I or the polymer of Formula (S)-I has a molecular weight $M_n$ of at least 40 kDa, a dispersity index $M_w/M_n$ of less than 1.09, and a melting temperature $T_m$ of at least 171° C.

The ring-opening polymerizations can be carried out at any suitable and effective temperature. However, the polymerizations typically proceed rapidly at less than 25° C., or at about room temperature (21-23° C.). Furthermore, the polymerizations can be carried out in any suitable and effective solvent, such as dichloromethane, THF, dioxolane, or the like. Alternatively, the polymerizations can be carried out without solvent.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

General Materials and Methods.

All syntheses and manipulations of air- and moisture-sensitive chemicals and materials were carried out in flamed Schlenk-type glassware on a dual-manifold Schlenk line, on a high-vacuum line, or in an inert gas (Ar or $N_2$)-filled glovebox. NMR-scale reactions were conducted in Teflon-valve-sealed J. Young-type NMR tubes. HPLC-grade organic solvents were first sparged extensively with nitrogen during filling 20 L solvent reservoirs and then dried by passage through activated alumina (for dichloromethane, DCM) followed by passage through Q-5 supported copper catalyst (for toluene and hexanes) stainless steel columns. Benzene-$d_6$ was dried over sodium/potassium alloy and filtered, whereas $CD_2Cl_2$ and $CDCl_3$ were dried over $CaH_2$, vacuum-distilled and stored activated Davison 4 Å molecular sieves. HPLC chromatograms were obtained on an Agilent 1100 series system using a Chiralcel OD-H column with hexanes/isopropanol (80/20) as the eluent at a flow rate of 1.0 mL/min. Optical rotations were measured with an Autopol-III automatic polarimeter. NMR spectra were recorded on a Varian Inova or Bruker AV-III 400 MHz spectrometer (400 MHz, $^1H$; 100 MHz, $^{13}C$). Chemical shifts for $^1H$ and $^{13}C$ spectra were referenced to internal solvent resonances and are reported as parts per million relative to $SiMe_4$. Elemental analyses were performed by Robertson Microlit Laboratories, Madison, N.J.

Tri[N,N-bis(trimethylsilyl)amide] lanthanum(III) La[N(SiMe$_3$)$_2$]$_3$, yttrium chloride YCl$_3$, and (trimethylsilyl)methyllithium (SiMe$_3$)$_2$CH$_2$Li solution in pentane were purchased from Sigma-Aldrich Chemical Co. and used as received. 2,2-Diphenylethanol was purchased from Aldrich Chemical Co., which were purified by sublimation twice. Isopropanol and benzyl alcohol were purchased from Fisher Scientific Co. and Alfa Aesar Chemical Co., respectively, which were purified by distillation over $CaH_2$ and stored over activated Davison 4 Å molecular sieves. Dimethyl succinate, sodium methoxide and 3-chloroperoxybenzoic acid (mCPBA, 70-75%) were purchased from Fisher Scientific Co. and used as received. Iodomethane was purchased from Alfa Aesar Chemical Co. and used as received. The following compounds, ligands, and complexes were prepared according to their respective literature procedures: Y[N(SiHMe$_2$)$_2$]$_3$(THF)$_2$, as described by Anwander et al. (*J. Chem. Soc. Dalton Trans.* 1998, 847-858), and Eppinger et al. (*Polyhedron* 1998, 17, 1195-1201); and yttrium complexes 2 and 3 supported by the tetradentate, dianionic alkoxy-amino-bis(phenolate) [O$^-$,N,O,O$^-$] ligands, as described by Amgoune et al. (*Chem. Eur. J.* 2006, 12, 169-179). The monomer, racemic eight-membered cyclic diolide (rac-DL) was prepared according to the literature route described by Seebach et al. (*Helvetica Chimica Acta* 1995, 78, 1525-1540), and White (*J. Org. Chem.* 1990, 55, 5938-5940), however the procedures were significantly modified and thus described in detail below; the monomer was purified by sublimation twice prior to polymerization runs.

Polymer Characterizations.

Measurements of polymer absolute weight-average molecular weight ($M_w$), number-average molecular weight ($M_n$), and molecular weight distributions or dispersity indices (Đ=$M_w$/$M_n$) were performed via gel-permeation chromatography (GPC). The GPC instrument consisted of an Agilent HPLC system equipped with one guard column and two PLgel 5 m mixed-C gel permeation columns and coupled with a Wyatt DAWN HELEOS II multi (18)-angle light scattering detector and a Wyatt Optilab TrEX dRI detector. The analysis was performed at 40° C. using chloroform as the eluent at a flow rate of 1.0 mL/min, using Wyatt ASTRA 7.1.2 molecular weight characterization software. The refractive index increment (dn/dc) of P3HB was determined to be 0.0254±0.0004 mL/g, obtained by batch experiments using Wyatt Optilab TrEX dRI detector and calculated using ASTRA software. Polymer solutions were prepared in chloroform and injected into dRI detector by Harvard Apparatus pump 11 at a flow rate of 0.25 mL/min. A series of known concentrations were injected and the change in refractive index was measured to obtain a plot of change in refractive index versus change in concentration ranging from 0.4 to 4.0 mg/mL. The slope from a linear fitting of the data was the dn/dc of the polymer.

The isolated low molecular weight samples were analyzed by matrix-assisted laser desorption/ionization time-of-flight mass spectroscopy (MALDI-TOF MS). The experiment was performed on Microflex-LRF mass spectrometer (Bruker Daltonics, Billerica, Mass.) operated in positive ion, reflector mode using a Nd:YAG laser at 355 nm and 25 kV accelerating voltage. A thin layer of a 1% NaI solution was first deposited on the target plate, followed by 0.6 μL of both sample and matrix (dithranol in chloroform). External calibration was done using a peptide calibration mixture (4 to 6 peptides) on a spot adjacent to the sample. The raw data was processed in the FlexAnalysis software (version 3.4.7, Bruker Daltonics).

Melting transition ($T_m$) and glass transition ($T_g$) temperatures were measured by differential scanning calorimetry (DSC) on an Auto Q20, TA Instrument. All $T_m$ and $T_g$ values were obtained from a second scan after the thermal history was removed from the first scan. The second heating rate was 10° C./min and cooling rate was 10° C./min unless indicated otherwise in the polymerization tables. Decomposition temperatures ($T_d$, defined by the temperature of 5% weight loss) and maximum rate decomposition temperatures ($T_{max}$) of the polymers were measured by thermal gravimetric analysis (TGA) on a Q50 TGA Analyzer, TA Instrument. Polymer samples were heated from ambient temperatures to 700° C. at a heating rate of 10° C./min. Values of $T_{max}$ were obtained from derivative (wt %/° C.) vs. temperature (° C.) plots, while $T_d$ and $T_{onset}$ values (initial and end temperatures) were obtained from wt % vs. temperature (° C.) plots.

The crystallinity of the resulting P3HB was calculated using the equation $X_c$ (%) ($\Delta H_f / \Delta H_f^\circ$)×100, where $\Delta H_f$ and $\Delta H_f^\circ$ is the heat of fusion (J/g) of the synthesized P3HB and the 100% crystalline P3HB (146 J/g), respectively. Assignments of P3HB tacticities or stereo-microstructures were made through analysis of polymer samples by $^1H$ and $^{13}C$-NMR analysis, following the established literature assignments and procedures.

Example 1. Synthesis of Racemic Eight-Membered Cyclic Diolide (Rac-DL)

The following illustrates a process for preparing a racemic eight membered cyclic diolide, rac-DL.

Scheme 7.

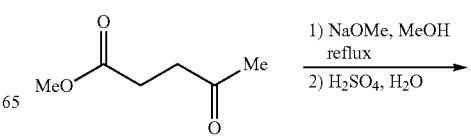

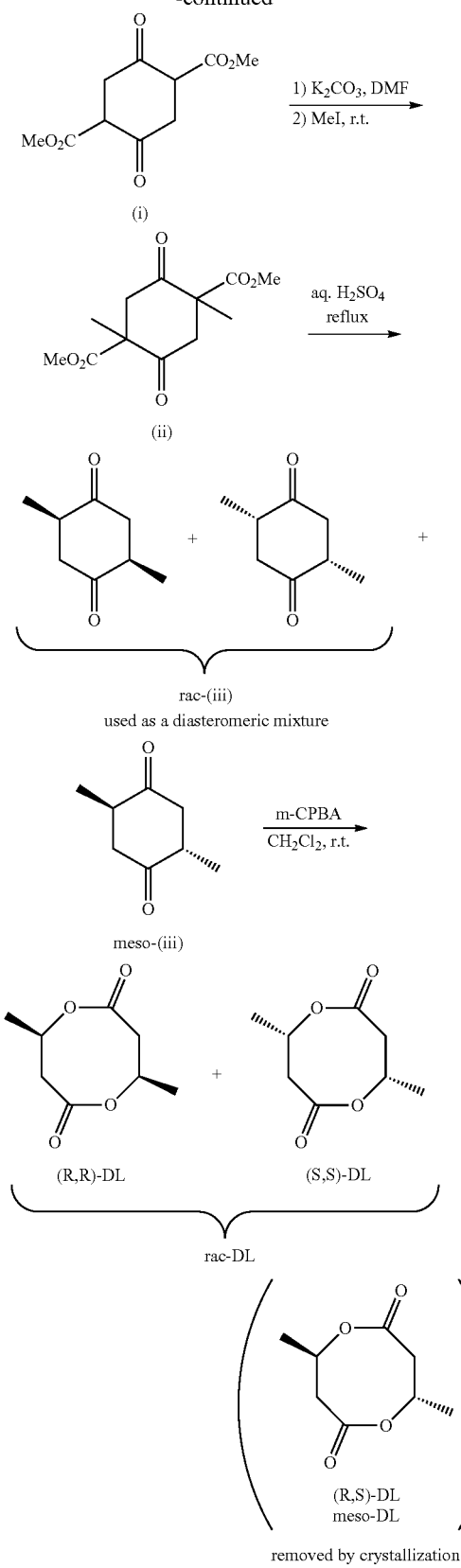

Pure racDL can be synthesizes in a multi-gram scale from bio-sources dimethyl succinate as described below.

Typical diolides where prepared by adding a methyl group to structure (i) in Scheme 7 by deprotonation and addition of methyl iodide. As would be readily recognized by one of skill in the art, other diolides where R of Formula V, V-A, and V-B are $(C_1-C_{18})$alkyl, $(C_1-C_8)$alkenyl, $(C_1-C_8)$alkynyl, benzyl, or aryl can be likewise prepared by addition of the appropriate iodide (or other halide) to deprotonated structure (i). Furthermore, diolides of the "$DL_\alpha$"-type can be obtained commercially or by the preparations known in the art.

Dimethyl 2,5-dioxocyclohexane-1,4-dicarboxylate (i). A solution of sodium methoxide (185 mL, 5.4 M, 1.0 mol) was added to dimethyl succinate (73.1 g, 0.5 mol) in one portion, and the mixture was heated under reflux for 24 h. A thick pink-colored precipitate was then formed and remained throughout the reaction. The methanol was removed using evaporator, a 2N sulfuric acid solution (500 mL) was added to the residue, and the mixture was stirred vigorously for 4 h.

The solid was collected by filtration and washed several times with water. The air-dried product was a pale-buff powder, which was recrystallized from 300 mL ethyl acetate. The filtrate was chilled to yield cream to pink-cream colored crystals of dimethyl 2,5-dioxocyclohexane-1,4-dicarboxylate (i), 24.5 g (43%); $^1$H NMR (400 MHz, CDCl$_3$): δ 12.12 (s, 1H, —CH—), 3.79 (s, 3H, —CO$_2$CH$_3$), 3.18 (s, 2H, —CH$_2$—).

Dimethyl 1,4-dimethyl-2,5-dioxocyclohexane-1,4-dicarboxylate (ii). To a stirred suspension of K$_2$CO$_3$ (41.5 g, 0.3 mol) in 400 mL DMF under N$_2$ was added i (22.8 g, 0.1 mmol). After 15 min stirring at room temperature, MeI (56.8 g, 0.4 mmol) was added dropwise. After 15 h, the mixture was concentrated in vacuo, dissolved in 300 mL of H$_2$O, and extracted with CH$_2$Cl$_2$ (120 mL×5). The combined organic layers were washed with 10% Na$_2$S$_2$O$_3$ solution, dried with anhydrous Na$_2$SO$_4$, and evaporated. The residue was purified by column chromatography to yield dimethyl 1,4-dimethyl-2,5-dioxocyclohexane-1,4-dicarboxylate give (ii), 20.8 g (81%) as a 2:1 mixture of diastereoisomers. $^1$H NMR (400 MHz, CDCl$_3$), main diastereoisomer: δ 3.72 (s, 6H, MeO); $v_A$=3.15, $v_B$=2.81 (AB, J$_{AB}$=15.2, 4H, CH$_2$); 1.44 (s, 6H, Me); minor diastereoisomer: δ 3.74 (s, 6H, MeO); $v_A$=3.44, $v_B$=2.61 (AB, J$_{AB}$=15.7, 4H, CH$_2$); 1.41 (s, 6H, Me).

Synthesis of 2,5-dimethylcyclohexane-1,4-dione (iii). To a stirred suspension of ii (20.5 g, 80 mmol) in 40 mL of conc. H$_2$SO$_4$ were added 3 mL of methanol and 45 g of crushed ice. After 15 min, the mixture was heated to 100° C. for an additional 2 h. The acidic solution was cooled to room temperature, neutralized with aq. NaOH (pH 6-7), and extracted with CH$_2$Cl$_2$ (150 mL×3). The combined organic layers were dried with anhydrous Na$_2$SO$_4$, and evaporated. The residue was purified by column chromatography to yield racemic 2,5-dimethylcyclohexane-1,4-dione (iii), 10.2 g (91%) at a racemic to meso ratio of about 70:30.

4,8-Dimethyldioxocane-2,6-dione (rac-DL). To a solution of iii (10.0 g, 71 mmol) in 300 mL of CH$_2$Cl$_2$ was added m-CPBA (52.7 g, 70%, 213 mmol) in one portion. The pale-yellow solution was stirred at room temperature in the dark for 48 h. The obtained white suspension was diluted with 200 mL of CH$_2$Cl$_2$, washed saturated NaHCO$_3$ solution (200 mL×3), which contained 5% Na$_2$S$_2$O$_3$, dried with anhydrous Na$_2$SO$_4$, and evaporated. Recrystallization of the residue (10.5 g) from hexanes/ethyl acetate (5/1) for approximately 3 to 6 times, yielded pure racemic 4,8-Dimethyldioxocane-2,6-dione (rac-DL) 5.1 g. $^1$H NMR (400 MHz, CDCl$_3$): δ 5.35-5.23 (m, 2H, MeCHO—C═O), $v_A$=2.65, $v_B$=2.53, (AB of ABX, J$_{AB}$=11.4, J$_{AX}$=9.7, J$_{BX}$=3.6, 4H, CH$_2$), 1.44 (d, J=6.4 Hz, 6H, Me).

Example 2. Synthesis of Yttrium Complexes 4a-c, and e

The following illustrates a process for preparing a racemic yttrium complexes 4a-c.

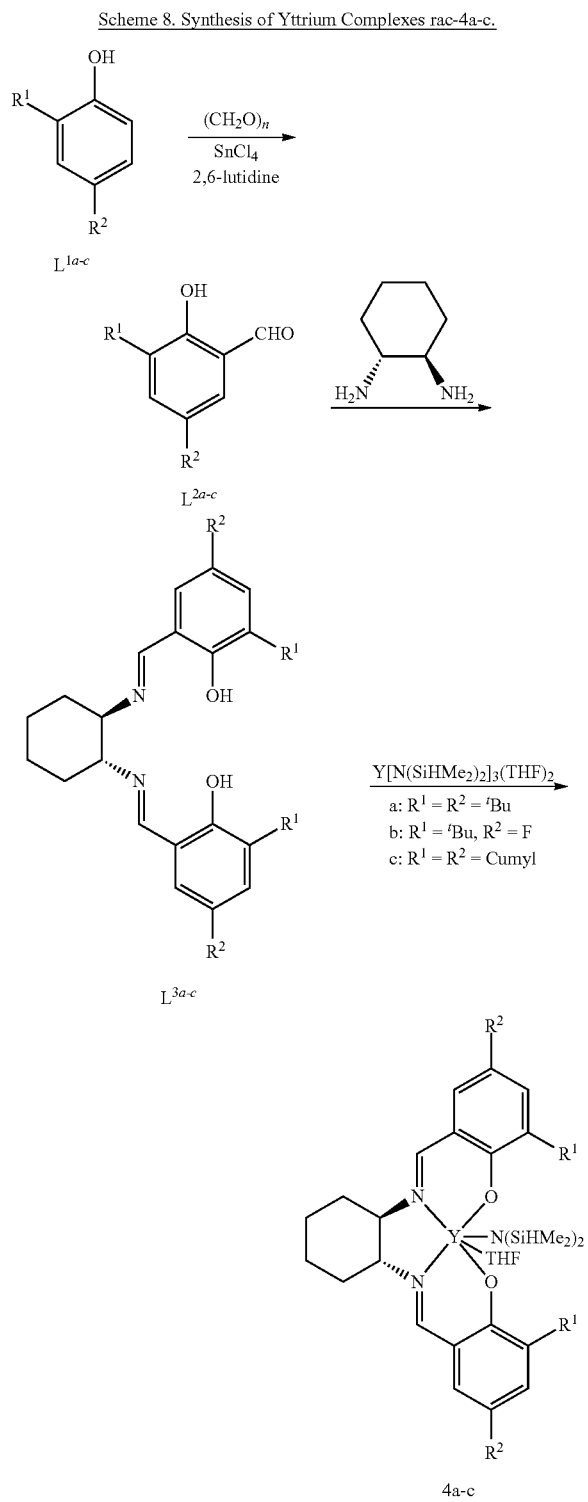

Scheme 8. Synthesis of Yttrium Complexes rac-4a-c.

Synthesis of Salicylaldehydes $L^{2a-c}$ 3,5-Bis(tert-butyl)salicylaldehyde $L^{2a}$. 2,4-Di-tert-butylphenol (30.45 g, 0.147 mol), 2,6-lutidine (6.9 mL, 0.059 mmol) and 100 mL anhydrous toluene were measured into a side-arm round-bottom flask under nitrogen. Tin(IV) chloride (1.72 mL, 14.7 mmol) was added slowly to the reaction flask. The mixture was stirred at room temperature for 30 min, and then paraformaldehyde (9.74 g, 0.325 mol) was added. The resulting yellowish solution was heated at 100° C. for 8 h, after which time TLC analysis indicated >99% consumption of the phenol. The mixture was allowed to cool to room temperature, and 600 mL water was added to the flask. The aqueous layer was acidified to approximately pH=2 with 2 N HCl. The aqueous layer was extracted with diethyl ether, and the combined ether extracts were dried over anhydrous $Na_2SO_4$. The concentrated product was purified using column chromatography. Yield: 18.6 g (54%). $^1$H-NMR (400 MHz, $CDCl_3$): δ 11.64 (s, 1H, OH), 9.87 (s, 1H, CHO), 7.59 (d, J=2.4 Hz, 1H, Ar—H), 7.35 (d, J=2.4 Hz, 1H, Ar—H), 1.43 (s, 9H, t-Bu), 1.33 (s, 9H, t-Bu).

3-tert-Butyl-5-fluorosalicylaldehyde $L^{2b}$. 2-tert-Butyl-4-fluorophenol $L^{1b}$ was first prepared according to the literature procedure described by DiCiccio et al. *J. Am. Chem. Soc.* 2016. Next, $L^{2b}$ was synthesized following the general procedure detailed for $L^{2a}$, expect that $L^{1b}$ was used instead of $L^{1a}$. Yield: 43%. $^1$H-NMR (400 MHz, $CDCl_3$): δ 11.59 (s, 1H, OH), 9.82 (s, 1H, —CHO), 7.28 (dd, J=10.3, 2.9 Hz, 1H, Ar—H), 7.07 (dd, J=7.0, 3.1 Hz, 1H, Ar—H), 1.41 (s, 9H, t-Bu).

3,5-Dicumylsalicylaldehyde $L^{2c}$. 3,5-Dicumylsalicylaldehyde 2c was synthesized according to the general procedure detailed for $L^{2a}$, except that 2,4-dicumylphenol $L^{1c}$ was used instead of 2,4-di-tert-butylphenol $L^{1a}$. Yield: 57%. $^1$H-NMR (400 MHz, $CDCl_3$): δ 11.25 (s, 1H, OH), 9.77 (s, 1H, CHO), 7.51 (d, J=2.3 Hz, 1H, Ar—H), 7.38-7.09 (m, 11H, Ar—H), 1.73 (s, 6H, Me), 1.64 (s, 6H, Me).

Synthesis of Salen Ligands $L^{3a-c\ and\ e}$

Salcy ligand $L^{3a}$. A mixture of 3,5-bis(tert-butyl)salicylaldehyde $L^{2a}$ (7.03 g, 30 mmol) and racemic trans-1,2-diaminocyclohexane (1.71 g, 15.0 mmol) was dissolved in methanol (80 mL), and about 0.2 mL formic acid was added to the solution. The reaction was then heated to reflux for 6 h. Upon cooling, the yellow precipitate was collected by filtration and dried under vacuum. Yield: 6.4 g (78%). $^1$H-NMR (400 MHz, $CDCl_3$): δ 13.71 (s, 2H, OH), 8.30 (s, 2H, N=CH), 7.28 (d, J=2.8 Hz, 2H, Ar—H), 6.98 (d, J=2.2 Hz, 2H, Ar—H), 3.32 (m, 2H, NCH), 1.94 (m, 2H, Cy-H), 1.86 (m, 2H, Cy-H), 1.75 (m, 2H, Cy-H), 1.47 (m, 2H, Cy-H), 1.41 (s, 9H, t-Bu), 1.23 (s, 9H, t-Bu).

Salcy ligand $L^{3b}$. $L^{3b}$ was synthesized according to the general procedure detailed for $L^{3a}$ expect that 3-tert-butyl-5-fluorosalicylaldehyde $L^{2b}$ was used instead of 3,5-bis(tert-butyl)salicylaldehyde $L^{2a}$. Yield: 75%. $^1$H-NMR (400 MHz, $CDCl_3$): δ 13.57 (s, 2H, OH), 8.20 (s, 2H, N=CH), 6.99 (dd, J=10.7, 2.9 Hz, 2H, Ar—H), 6.67 (dd, J=7.8, 3.0 Hz, 2H, Ar—H), 3.39-3.24 (m, 2H, NCH), 1.99 (m, 2H, Cy-H), 1.90 (m, 2H, Cy-H), 1.75 (m, 2H, Cy-H), 1.48 (m, 2H, Cy-H), 1.39 (s, 18H, t-Bu).

Salcy ligand $L^{3c}$. $L^{3c}$ was synthesized according to the general procedure detailed for $L^{3a}$ expect that 3,5-dicumylsalicylaldehyde $L^{2c}$ was used instead of 3,5-bis(tert-butyl)salicylaldehyde $L^{2a}$. Yield: 95%. $^1$H-NMR (400 MHz, $CDCl_3$): δ 13.26 (s, 2H, OH), 8.10 (s, 2H, N=CH), 7.32-7.08 (m, 22H, Ar—H), 6.93 (s, 2H, Ar—H), 3.15 (m, 2H, NCH), 1.75 (m, 4H, Cy-H), 1.67 (d, J=2.6 Hz, 12H, -Me), 1.65 (s, 6H, Me), 1.58 (s, 6H, Me), 1.57-1.48 (m, 2H, Cy-H), 1.38-1.25 (m, 2H, Cy-H).

Salph ligand $L^{3e}$. $L^{3e}$ was synthesized according to the general procedure detailed for $L^{3a}$ expect that 1,2-diaminobenzene was used instead of racemic trans-1,2-diaminocyclohexane. Yield: 85%. $^1$H-NMR (400 MHz, $CDCl_3$): δ 13.54 (s, 2H, OH), 8.66 (s, 2H, N=CH), 7.44 (d, J=2.4 Hz, 2H, Ar—H), 7.34-7.29 (m, 2H, Ar—H), 7.25-7.20 (m, 4H, Ar—H), 1.43 (s, 18H), 1.32 (s, 18H).

Synthesis of Yttrium Complexes rac-4a-c, and e

Yttrium complex 4a. Synthesis of yttrium complex 4a followed the literature procedure described by Liu et al. *Dalton Trans.* 2008 with minor modifications detailed below. A solution of salcy ligand $L^{3a}$ (0.547 g, 1.00 mmol) in hexanes (20 mL) was added to a solution of Y[N(SiHMe$_2$)$_2$]$_3$(THF)$_2$ (0.630 g, 1.00 mmol) in hexanes (20 mL) and stirred for 24 h at room temperature. The volatiles were removed in vacuo, and the residue was washed with cold hexanes. The product was obtained as pale yellow solid. Yield: 0.60 g (72%). $^1$H-NMR (400 MHz, C$_6$D$_6$): δ 8.03 (s, 1H, Ar—H, N=CH), 7.90 (s, 1H, N=CH), 7.73 (dd, J=8.9, 2.6 Hz, 2H, Ar—H), 7.32 (d, J=2.6 Hz, 1H, Ar—H), 7.10 (d, J=2.5 Hz, 1H, Ar—H), 5.07 (dt, J=5.9, 2.8 Hz, 2H, SiH—), 4.79 (m, 1H, NCH), 3.99 (m, 4H, THF), 2.29 (m, 1H, NCH), 1.76 (s, 9H, t-Bu), 1.61 (s, 9H, t-Bu), 1.65-1.32 (m, 6H, Cy-H), 1.46 (m, 4H, THF), 1.40 (s, 9H, t-Bu), 1.37 (s, 9H, t-Bu), 1.04-0.82 (m, 2H, Cy-H), 0.33 (dd, J=4.2, 3.2 Hz, 12H, SiMe). $^{13}$C-NMR (100 MHz, C$_6$D$_6$): δ 171.0, 164.8, 164.0, 162.8, 139.5, 139.1, 136.8, 136.7, 130.3, 129.8, 129.7, 129.6, 122.9, 122.6, 72.6, 70.3, 65.6, 35.9, 35.8, 34.2, 33.3, 31.9, 31.8, 30.5, 30.2, 27.5, 25.7, 25.4, 25.1, 3.4, 3.1.

Yttrium complex 4b. Yttrium complex 4b was synthesized according to the general procedure detailed for 4a expect that salcy ligand $L^{3b}$ was used instead of $L^{3a}$. The product was obtained as pale yellow solid. Yield: 73%. $^1$H-NMR (400 MHz, C$_6$D$_6$): δ 7.66 (s, 1H, N=CH), 7.50 (s, 1H, N=CH), 7.35 (ddd, J=10.5, 3.3, 1.8 Hz, 2H, Ar—H), 6.81 (dd, J=8.2, 3.3 Hz, 1H, Ar—H), 6.64 (dd, J=8.4, 3.3 Hz, 1H, Ar—H), 5.01 (dt, J=6.0, 3.0 Hz, 2H, SiH—), 4.47 (m, 1H, NCH), 3.90 (m, 4H, THF), 2.18-2.02 (m, 1H, NCH), 1.68-1.39 (m, 4H, Cy-H), 1.56 (s, 9H, t-Bu), 1.48 (s, 9H, t-Bu), 1.44 (m, 4H, THF), 1.31-1.14 (m, 2H, Cy-H), 0.91-0.80 (m, 2H, Cy-H), 0.29 (dd, J=3.0, 1.0 Hz, 12H, SiMe). $^{13}$C-NMR (100 MHz, C$_6$D$_6$): δ 169.6, 162.8, 162.0, 161.8, 154.7, 152.4, 142.0, 141.7, 122.2, 120.6, 120.4, 120.2, 117.3 (d, J=21.6 Hz), 116.9 (d, J=21.5 Hz), 71.9, 70.5, 65.8, 35.7, 35.6, 33.1, 29.8, 29.6, 27.4, 25.5, 25.3, 24.9, 3.3, 3.0.

Yttrium complex 4c. Yttrium complex 4c was synthesized according to the general procedure detailed for 4a expect that salcy ligand $L^{3c}$ was used instead of $L^{3a}$. The product was obtained as pale yellow solid. Yield: 83%. $^1$H-NMR (400 MHz, C$_6$D$_6$): δ 7.82 (s, 1H, N=CH), 7.70 (s, 1H, N=CH), 7.66 (m, 2H, Ar—H), 7.50-7.40 (m, 4H, Ar—H), 7.40-7.34 (m, 4H, Ar—H), 7.28-7.18 (m, 9H, Ar—H), 7.15-7.02 (m, 5H, Ar—H), 4.61 (m, 2H, SiH—), 4.38 (m, 1H, NCH), 3.36 (s, 4H, THF), 2.12 (m, 1H, NCH), 2.10 (s, 3H, Me), 1.95 (s, 3H, Me), 1.80 (s, 3H, Me), 1.72 (d, J=2.4 Hz, 6H, Me), 1.70 (s, 6H, Me), 1.66 (s, 3H, Me), 1.59-1.19 (m, 10H, Cy-H, THF), 0.84-0.57 (m, 2H, Cy-H), 0.10 (m, 12H, SiMe). $^{13}$C-NMR (100 MHz, C$_6$D$_6$): δ 170.5, 164.6, 164.0, 162.6, 152.1, 151.6, 151.5, 151.4, 138.5, 138.0, 136.6, 136.4, 133.0, 132.9, 132.7, 132.2, 128.4, 128.3, 128.2, 127.2, 126.7, 126.6, 126.0, 125.5, 125.3, 123.2, 122.8, 72.1, 69.4, 65.4, 43.4, 43.4, 42.6, 33.6, 33.2, 33.0, 31.4, 31.3, 28.6, 27.7, 27.3, 25.9, 25.6, 24.9, 3.2, 2.9.

Yttrium complex 4e. Yttrium complex 4e was synthesized according to the general procedure detailed for 4a expect that salph ligand $L^{3e}$ was used instead of $L^{3a}$ (Scheme 9). The product was obtained as yellow solid. Yield: 58%. $^1$H-NMR (400 MHz, C$_6$D$_6$): δ 8.25 (s, 2H, N=CH), 7.77 (d, J=2.5 Hz, 2H, Ar—H), 7.21 (d, J=2.5 Hz, 2H, Ar—H), 7.08-6.96 (m, 4H, Ar—H), 4.81 (dt, J=5.7, 2.8 Hz, 2H, SiH—), 4.17 (m, 4H, THF), 1.69 (s, 18H, t-Bu), 1.55-1.45 (m, 4H, THF), 1.39 (s, 18H, t-Bu), 0.07 (d, J=3.0 Hz, 12H, SiMe$_3$). $^{13}$C-NMR (100 MHz, C$_6$D$_6$): δ 166.5, 165.8, 146.2, 139.8, 137.3, 130.8, 130.6, 127.5, 122.7, 118.8, 70.8, 35.9, 34.2, 31.8, 30.4, 25.4, 3.1.

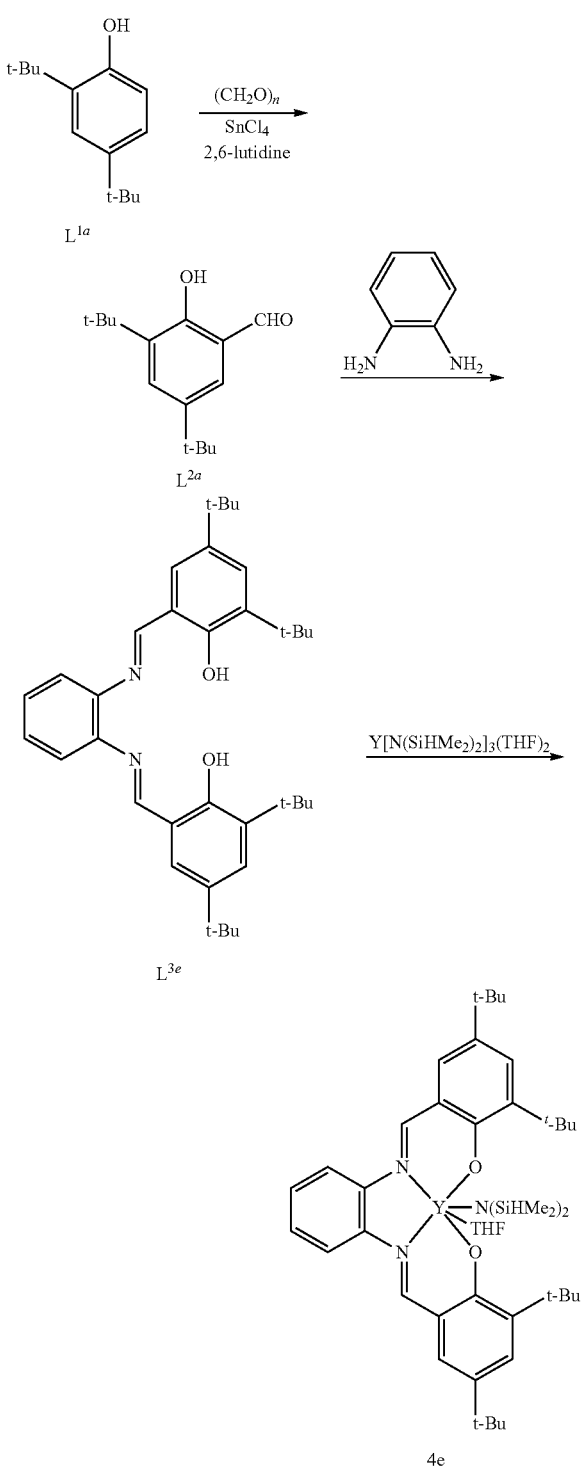

Scheme 9. Synthesis of Yttrium Complexes rac-4e.

Example 3. Synthesis of Yttrium Complex 4d

The following illustrates a process for preparing a racemic yttrium complex 4d.

Scheme 10. Synthesis of Yttrium Complexes rac-4d.

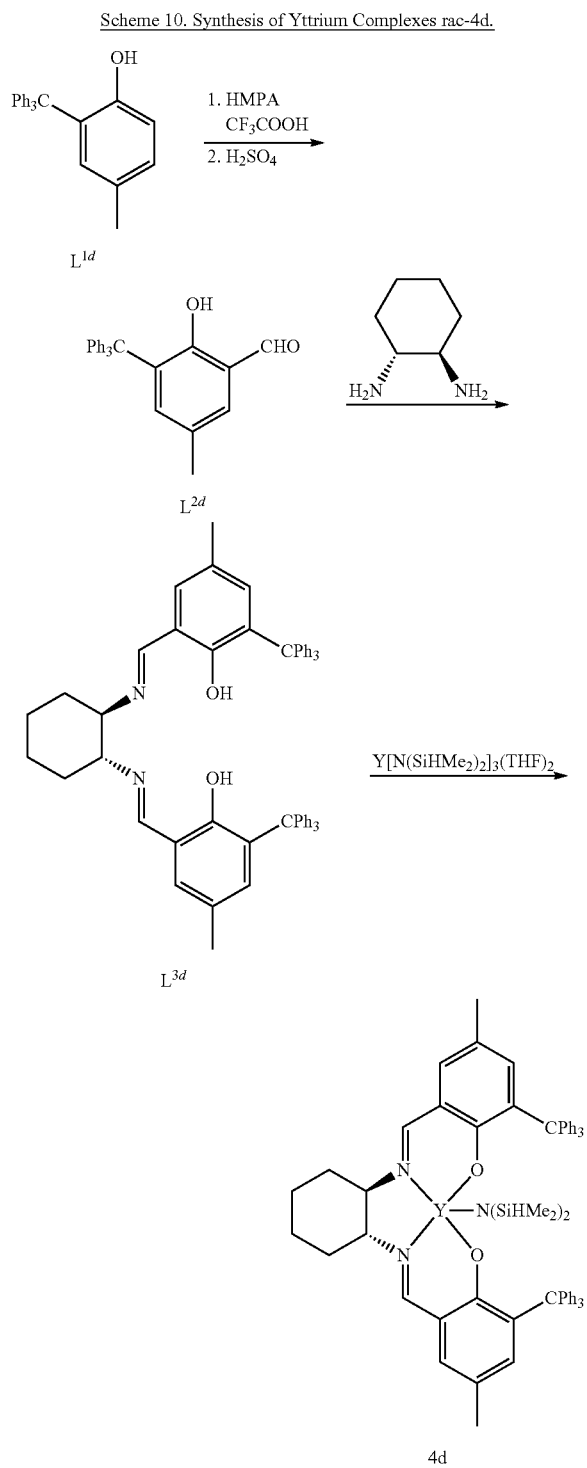

3-Trityl-5-methylsalicylaldehyde $L^{2d}$. 2-Trityl-4-methylphenol $L^{1d}$ was prepared first according to the literature procedure described by Kochnev et al. *Russ. Chem. Bull. Int. Ed.* 2008. Next, a mixture of $L^{1d}$ (5.26 g, 15 mmol), hexamethylenetetraine (4.2 g, 30 mmol), and $CF_3COOH$ (15 mL) was heated for 4 h at 115-125° C., and then cooled down to 75-80° C. $H_2SO_4$ (33% aq., 23 mL) was added to the reaction, and the resulting mixture was heated for 1-2 h at 125-130° C. After cooling down to room temperature, ethyl acetate (40 mL) and water (50 mL) were added. The organic layer was separated and water was extracted with ethyl acetate (3×20 mL). The combined extracts were washed with water (70 mL) and brine (50 mL), separated, and dried over anhydrous $Na_2SO_4$. The product was purified by column chromatography. Yield: 4.50 g (79%).

Salcy ligand $L^{3d}$. According to the literature procedure described by Char et al. *C. R. Chimie.* 2016, a mixture of racemic trans-1,2-diaminocyclohexane (0.34 g, 3 mmol) and 3-trityl-5-methylsalicylaldehyde $L^{2d}$ (2.28 g, 6 mmol) in 30 mL of dichloromethane was stirred under reflux overnight. All volatiles were removed via rotary evaporator. The product ($L^{3d}$) was then was purified by recrystallization from ethanol. Yield: 2.38 g (95%). $^1$H-NMR (400 MHz, $CDCl_3$): δ 13.20 (s, 2H, OH), 7.96 (s, 2H, N=CH), 7.21-7.12 (m, 30H, Ar—H), 7.04 (s, 2H, Ar—H), 6.95 (m, 2H, Ar—H), 3.10 (m, 2H, NCH), 2.24 (s, 6H, Me), 1.73 (m, 4H, Cy-H), 1.55 (m, 2H, Cy-H), 1.27 (m, 2H, Cy-H).

Yttrium complex 4d. A solution of salen ligand $L^{3d}$ (0.585 g, 0.70 mmol) in toluene (15 mL) was added to a solution of $Y[N(SiHMe_2)_2]_3(THF)_2$ (0.441 g, 0.70 mmol) in toluene (15 mL) and stirred for 24 h at room temperature. The volatiles were removed in vacuo, and the residue was washed with cold hexanes. The product was obtained as yellow solid. Yield: 0.602 g (82%). Anal. Calc. for $C_{64}H_{66}N_3O_2Si_2Y$: C, 72.9; H, 6.3; N, 4.0. Found: C, 72.9; H, 6.6; N, 3.7%.

$^1$H-NMR (400 MHz, $C_6D_6$): δ 7.83 (s, 1H, N=CH), 7.68 (s, 1H, N=CH), 7.58 (dd, J=5.2, 2.2 Hz, 2H, Ar—H), 7.50 (m, 6H, Ar—H), 7.42 (m, 6H, Ar—H), 7.13-6.96 (m, 19H, Ar—H), 6.82 (d, J=1.9 Hz, 1H, Ar—H), 4.39 (dt, J=5.9, 2.9 Hz, 2H, SiH—), 3.97 (m, 1H, NCH), 2.14-2.10 (m, 1H, NCH), 2.10 (s, 3H, Me), 2.06 (s, 3H, Me), 1.90-1.71 (m, 2H, Cy-H), 1.61-1.42 (m, 2H, Cy-H), 1.23-0.99 (m, 2H, Cy-H), 0.91-0.67 (m, 2H, Cy-H), 0.15 (d, J=3.0 Hz, 6H, SiMe), 0.01 (d, J=2.9 Hz, 6H, SiMe). $^{13}$C-NMR (100 MHz, $C_6D_6$): δ 168.7, 164.0, 163.3, 163.1, 147.2, 139.5, 138.1, 136.7, 135.3, 131.9, 131.8, 127.6, 127.6, 126.0, 125.7, 124.4, 124.2, 123.5, 123.4, 69.4, 64.9, 64.5, 64.4, 31.6, 28.2, 25.2, 24.6, 20.7, 3.4, 3.0.

Example 4. Synthesis of Enantiomeric Yttrium Complexes (R,R)-4d and (S,S)-4d

Scheme 11. Synthesis of Enantiomeric Yttrium Complexes (R,R)-4d and (S,S)-4d.

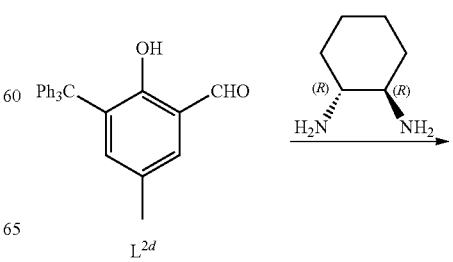

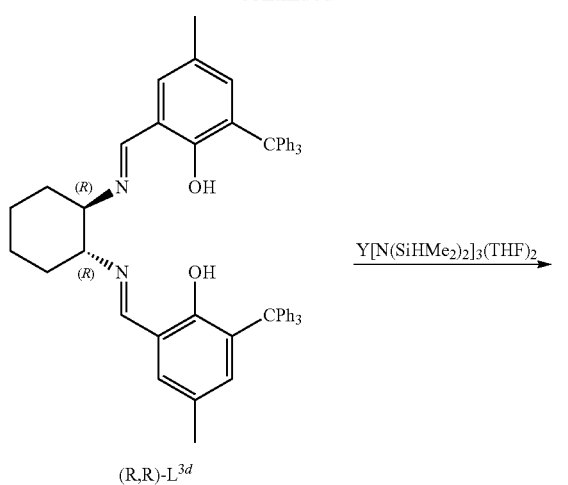

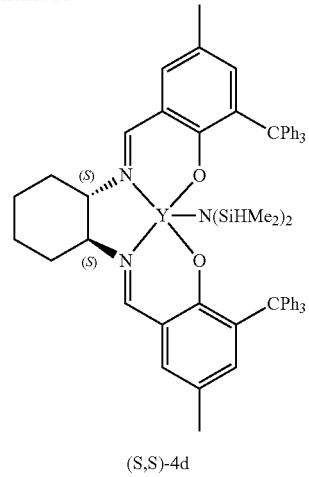

Synthesis of enantiopure salcy ligand $L^{3d}$

Salcy ligand (R,R)-$L^{3d}$. A mixture of (1R,2R)-(−)-1,2-diaminocyclohexane (0.34 g, 3 mmol) and 3-trityl-5-methylsalicylaldehyde $L^{2d}$ (2.28 g, 6 mmol) in 30 mL of dichloromethane was stirred under reflux overnight. All volatiles were removed via rotary evaporator. The product [(R,R)-$L^{3d}$] was then purified by recrystallization from ethanol; yield: 2.33 g (93%). $^1$H-NMR (400 MHz, CDCl$_3$): δ 13.14 (s, 2H, OH), 7.88 (s, 2H, N=CH), 7.22-7.08 (m, 30H, Ar—H), 7.03 (d, J=2.0 Hz, 2H, Ar—H), 6.81 (d, J=1.7 Hz, 2H, Ar—H), 3.08-2.89 (m 2H, NCH), 2.24 (s, 6H, Me), 1.80-1.66 (m, 4H, Cy-H), 1.57-1.41 (m, 2H, Cy-H), 1.35-1.17 (m, 2H, Cy-H). $[\alpha]_D^{23}$ −334.4° (c=0.519 g/100 mL, chloroform).

Salcy ligand (S,S)-$L^{3d}$. A mixture of (1S,2S)-(+)-1,2-diaminocyclohexane (0.34 g, 3 mmol) and 3-trityl-5-methylsalicylaldehyde $L^{2d}$ (2.28 g, 6 mmol) in 30 mL of dichloromethane was stirred under reflux overnight. All volatiles were removed via rotary evaporator. The product [(S,S)-$L^{3d}$] was then purified by recrystallization from ethanol; yield: 2.31 g (92%). $^1$H-NMR (400 MHz, CDCl$_3$): δ 13.14 (s, 2H, OH), 7.88 (s, 2H, N=CH), 7.21-7.09 (m, 30H, Ar—H), 7.03 (d, J=1.9 Hz, 2H, Ar—H), 6.81 (d, J=1.7 Hz, 2H, Ar—H), 3.07-2.91 (m 2H, NCH), 2.24 (s, 6H, Me), 1.81-1.66 (m, 4H, Cy-H), 1.59-1.40 (m, 2H, Cy-H), 1.37-1.19 (m, 2H, Cy-H). $[\alpha]_D^{23}$ +336.8 (c=0.366 g/100 mL, chloroform).

Synthesis of Enantiomeric Yttrium Complexes (R,R)-4d and (S,S)-4d

Yttrium complex (R,R)-4d. A solution of salcy ligand (R,R)-$L^{3d}$ (0.668 g, 0.80 mmol) in toluene (15 mL) was added to a solution of Y[N(SiHMe$_2$)$_2$]$_3$(THF)$_2$ (0.504 g, 0.80 mmol) in toluene (15 mL) and stirred for 3 days at room temperature. The volatiles were removed in vacuo, and the residue was washed with cold hexanes. The product was obtained as yellow solid; yield: 0.680 g (81%). $^1$H-NMR (400 MHz, C$_6$D$_6$): δ 7.83 (s, 1H, N=CH), 7.68 (s, 1H, N=CH), 7.58 (dd, J=5.3, 2.3 Hz, 2H, Ar—H), 7.53-7.46 (m, 6H, Ar—H), 7.45-7.37 (m, 6H, Ar—H), 7.13-6.95 (m, 19H, Ar—H), 6.82 (d, J=2.1 Hz, 1H, Ar—H), 4.39 (dt, J=5.9, 2.9 Hz, 2H, SiH—), 3.97 (m, 1H, NCH), 2.10 (s, 3H, Me), 2.06 (s, 3H, Me), 1.92-1.69 (m, 3H, Cy-H), 1.62-1.41 (m, 2H, Cy-H), 1.23-0.99 (m, 2H, Cy-H), 0.91-0.68 (m, 2H, Cy-H), 0.15 (d, J=3.0 Hz, 6H, SiMe$_2$), 0.01 (d, J=3.0 Hz, 6H, SiMe$_2$). $^{13}$C-NMR (101 MHz, C$_6$D$_6$): δ 168.7, 164.0 163.3, 163.1, 147.2, 139.5, 138.1, 136.7, 135.3, 131.9, 131.8, 127.7, 127.6, 126.0, 125.7, 124.4, 124.2, 123.5, 123.4, 69.4, 64.9, 64.5, 64.4, 31.6, 28.2, 25.2, 24.6, 20.7, 3.4, 3.0. $[\alpha]_D^{23}$ −376.4° (c=0.426 g/100 mL, toluene).

Yttrium complex (S,S)-4d. A solution of salcy ligand (S,S)-$L^{3d}$ (0.668 g, 0.80 mmol) in toluene (15 mL) was added to a solution of Y[N(SiHMe$_2$)$_2$]$_3$(THF)$_2$ (0.504 g, 0.80 mmol) in toluene (15 mL) and stirred for 3 days at room temperature. The volatiles were removed in vacuo, and the residue was washed with cold hexanes. The product was obtained as yellow solid; yield: 0.710 g (84%). $^1$H-NMR (400 MHz, C$_6$D$_6$): δ 7.83 (s, 1H, N=CH), 7.68 (s, 1H, N=CH), 7.58 (dd, J=5.3, 2.2 Hz, 2H, Ar—H), 7.53-7.45 (m, 6H, Ar—H), 7.45-7.38 (m, 6H, Ar—H), 7.14-6.95 (m, 19H, Ar—H), 6.82 (d, J=1.9 Hz, 1H, Ar—H), 4.39 (dt, J=5.8, 2.8 Hz, 2H, SiH—), 3.97 (t, J=10.7 Hz, 1H, NCH), 2.10 (s, 3H, Me), 2.06 (s, 3H, Me), 1.93-1.71 (m, 3H, Cy-H), 1.63-1.42 (m, 2H, Cy-H), 1.29-1.01 (m, 2H, Cy-H), 0.93-0.71 (m, 2H, Cy-H), 0.15 (d, J=3.0 Hz, 6H, SiMe$_2$), 0.01 (d, J=2.9 Hz, 6H, SiMe$_2$). $^{13}$C-NMR (101 MHz, c$_6$d$_6$) δ 168.7, 164.0, 163.3, 163.1, 147.2, 139.5, 138.1, 136.7, 135.3, 131.9, 131.8, 127.7, 127.6, 126.0, 125.7, 124.4, 124.2, 123.6, 123.4, 69.4, 64.9, 64.5, 64.4, 31.6, 28.2, 25.2, 24.6, 20.7, 3.4, 3.0. [α]$_D^{23}$=+384.8 (c=0.442 g/100 mL, toluene).

Example 5. Procedures for Kinetic Resolution of rac-DL by Enantiomeric Y Complexes (R,R)-4d and (S,S)-4d

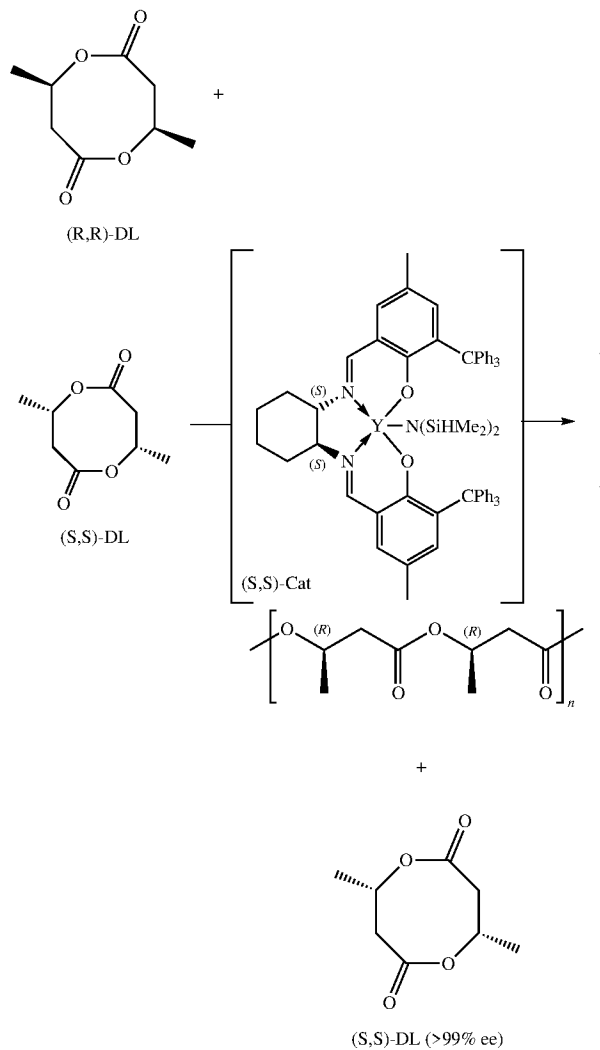

Scheme 12. Kinetic Resolution of rac-DL.

Polymerizations were performed in 5.5 mL glass reactors inside the inert glovebox at room temperature. The reactor was charged with a predetermined amount of catalyst and/or initiator and solvent (as specified in the polymerization tables) in a glovebox. The mixture was stirred at room temperature for 10 min, and the polymerization was initiated by rapid addition of rac-DL solution. After a desired time period, the polymerization was immediately quenched by addition of 0.5 mL of benzoic acid/chloroform (10 mg/mL) and a 0.02 mL of aliquot was taken from the reaction mixture and prepared for $^1$H-NMR analysis to obtain the percent monomer conversion data. The quenched mixture was then precipitated into 50 mL of cold methanol while stirring, filtered, washed with cold methanol to remove any unreacted monomer, and dried in a vacuum oven at room temperature overnight to a constant weight.

rac-DL was polymerized by (R,R)-4d or (S,S)-4d according to the above general procedure. The conversion of monomer was ~50% with the [rac-DL]/[(R,R)-4d] molar ration of 400 or 800 after 20 min, under which condition the conversion was 100% with rac-4d as the catalyst. The polymerization was then quenched with benzoic acid/DCM (caution: avoid using nucleophiles such as methanol or acidified methanol as they react with the unreacted monomer, see Scheme 13). The solvent was evaporated, and the solid residue was sublimated at 40~50° C. under vacuum to recover the pure unreacted monomer. The residue in the sublimator was dissolved in about 2 mL DCM, precipitated into 60 mL MeOH, filtrated, washed, and dried in vacuum to recover the polymer. The recovered unreacted monomer was analyzed by a chiral HPLC system to measure e.e. values, and the stereosectivity factor s was calculated from eq. 1:

$$s = \frac{\ln[(1-c)(1-ee_m)]}{\ln[(1-c)(1+ee_m)]}, \quad \text{(eq. S1)}$$

$$\text{Where } c = 1 - \frac{[S]+[R]}{[S]_0+[R]_0}, \quad ee_m = \frac{[S]-[R]}{[S]+[R]}. \quad \text{(eq. 1)}$$

Scheme 13. Acidified Methanol can React with Unreacted Monomer.

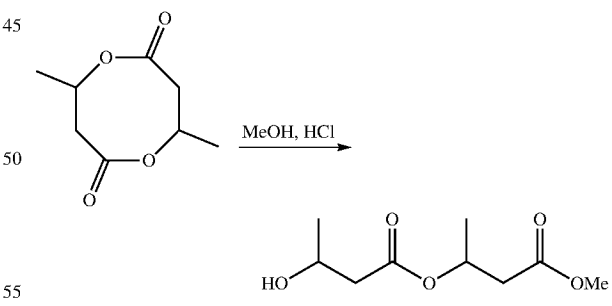

Example 6. Preparation of a Highly Isotactic Polymer

Polymerizations were performed in 5.5 mL glass reactors inside the inert glovebox at room temperature. The reactor was charged with a predetermined amount of catalyst and/or initiator and solvent (as specified in the polymerization tables) in a glovebox. The mixture was stirred at room temperature for 10 min, and the polymerization was initiated by rapid addition of rac-DL solution. After a desired time period, the polymerization was immediately quenched by addition of 0.5 mL of benzoic acid/chloroform (10 mg/mL) and a 0.02 mL of aliquot was taken from the reaction mixture and prepared for $^1$H NMR analysis to obtain the percent monomer conversion data. The quenched mixture was then precipitated into 50 mL of cold methanol while stirring, filtered, washed with cold methanol to remove any unreacted monomer, and dried in a vacuum oven at room temperature overnight to a constant weight.

by addition of 0.5 mL of benzoic acid/chloroform (10 mg/mL) and a 0.05 mL of aliquot was taken from the reaction mixture and prepared for $^1$H-NMR analysis to obtain the percent monomer conversion data (100%). The quenched mixture was then precipitated into 50 mL of cold methanol while stirring, filtered, washed with cold methanol, and dried in a vacuum oven at room temperature overnight to a constant weight (145 mg). The resulting polymer, poly(3-hydroxyvalerate) or P3HV ($M_n$=48.7 kg/mol, Đ=1.23) showed a $P_m$ of 0.96 and isotactic [mm]

Scheme 14. Preparation of a highly isotactic polymer.

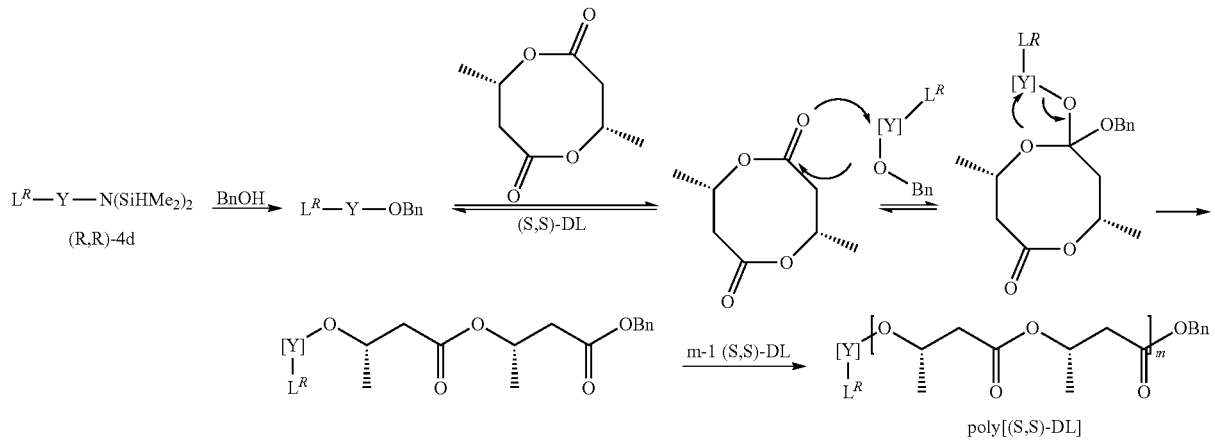

Example 7. ROP of rac-DL$_{Et}$

The ethyl derivative, rac-eight-membered cyclic diolide (rac-DL$_{Et}$), was prepared according to the procedures already described for the methyl derivative, rac-eight-membered cyclic diolide (rac-DL), except that ethyl iodide was used to replace methyl iodide.

Scheme 15. The ring-opening polymerization of rac-DL$_{ET}$ by catalyst rac-4c.

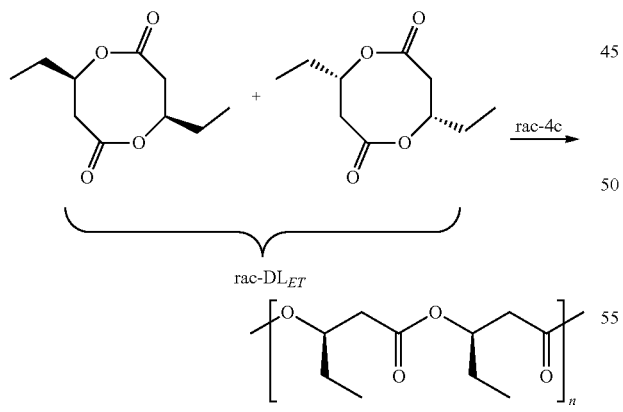

The ring-opening polymerization of rac-DL$_{Et}$ was performed in 5.5 mL glass reactors inside the inert glovebox at room temperature. The reactor was charged with rac-DL$_{Et}$ (160 mg, 0.8 mmol) and dichloromethane (DCM, 0.5 mL) in a glovebox, and the polymerization was started by rapid addition of the mixture of catalyst 4c (4.35 mg, 4 μmol) and BnOH (0.43 mg, 4 μmol) as an initiator in DCM (0.3 mL). After 60 min, the polymerization was immediately quenched triad of 95%. The $T_g$=−17.4° C., $T_c$=62.6° C., and $T_m$=108° C. were observed on the DSC curve with the heating and cooling rate of 2° C./min, while it exhibited a decomposition temperature ($T_d$) (defined by the temperature of 5% weight loss in the TGA curve) of 258° C. and a maximum rate decomposition temperature ($T_{max}$) of 285° C.

$^1$H-NMR (400 MHz, CDCl$_3$): δ 5.13-5.03 (m, 2H, EtCHO-C=O), $v_A$=2.68, $v_B$=2.51, (AB of ABX, $J_{AB}$=11.3, $J_{AX}$=10.2, $J_{BX}$=3.5, 4H, C(=O)CH$_2$), 1.86-1.63 (m, 4H, CH$_2$CH$_3$), 1.01 (t, J=7.4 Hz, 6H, Me).

Example 8. Copolymerization of rac-DL and rac-DL$_{Et}$

Copolymerization of rac-DL and rac-DL$_{Et}$ with an appropriate catalyst provides the corresponding poly(3-hydroxybutyrate-co-3-hydroxyvalerate), as shown in Scheme 16, which is an example of a copolymer of Formula II.

Scheme 16. The ring-opening copolymerization of rac-DL and rac-DL$_{Et}$ by catalyst rac 4c.

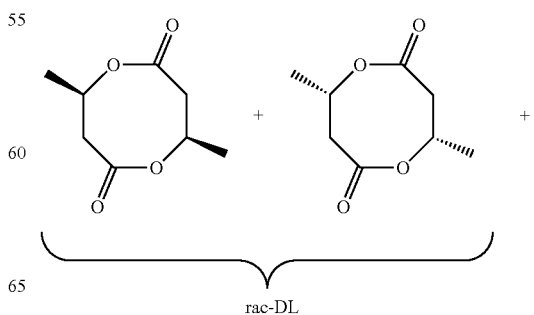

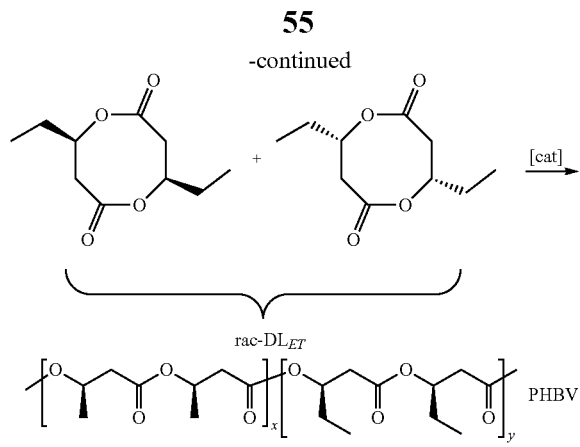

The copolymerization of rac-DL and rac-DL$_{Et}$ was performed in 5.5 mL glass reactors inside the inert glovebox at room temperature. The reactor was charged with rac-DL (103.3 mg, 0.6 mmol), rac-DL$_{Et}$ (40.0 mg, 0.2 mmol) and DCM (0.5 mL) in a glovebox, and the polymerization was started by rapid addition of the mixture of catalyst 4c (2.17 mg, 2 μmol) and BnOH (0.22 mg, 2 μmol) as an initiator in DCM (0.3 mL). After 30 min, the polymerization was immediately quenched by addition of 0.5 mL of benzoic acid/chloroform (10 mg/mL) and a 0.05 mL of aliquot was taken from the reaction mixture and prepared for $^1$H-NMR analysis to obtain the percent monomer conversion data (rac-DL: 95%; rac-DL$_{Et}$: 53%). The quenched mixture was then precipitated into 50 mL of cold methanol while stirring, filtered, washed with cold methanol, and dried in a vacuum oven at room temperature overnight to a constant weight (103 mg). The resulting copolymer PHBV (M$_n$=76.6 kg/mol, Đ=1.18, P3HV %=15.7%) showed a T$_g$=0.4° C., T$_c$=82.2° C., and T$_m$=138° C. on the DSC curve with the heating and cooling rate of 5° C./min, while it exhibited a T$_d$ of 258° C. and a T$_{max}$ of 286° C.

Example 9. ROP of meso-DL

The following illustrates a process for preparing a highly syndiotactic polymer from the ring opening polymerization of meso-DL to provide a polymer of Formula I.

Scheme 17. The ring-opening polymerization of meso-DL by catalyst (R,R)-4d.

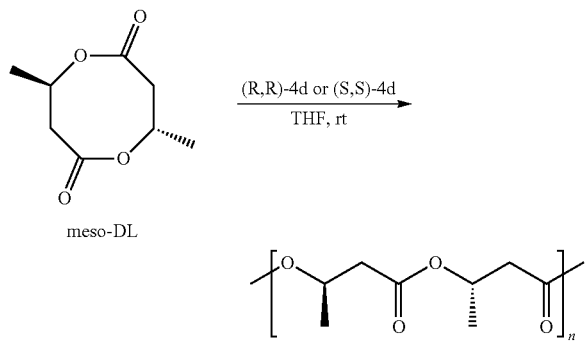

The ring-opening polymerization of meso-DL was performed in 5.5 mL glass reactors inside the inert glovebox at room temperature. The reactor was charged with meso-DL (138 mg, 0.8 mmol) and THF (0.5 mL) in a glovebox, and the polymerization was started by rapid addition of the mixture of catalyst (R,R)-4d (8.43 mg, 8 μmol) and BnOH (0.86 mg, 8 μmol) as an initiator in THF (0.3 mL). After 10 h, the polymerization was immediately quenched by addition of 0.5 mL of benzoic acid/chloroform (10 mg/mL) and a 0.05 mL of aliquot was taken from the reaction mixture and prepared for $^1$H-NMR analysis to obtain the percent monomer conversion datum (97%). The quenched mixture was then precipitated into 50 mL of cold methanol while stirring, filtered, washed with cold methanol, and dried in a vacuum oven at room temperature overnight to a constant weight (125 mg). The resulting syndiotactic P3HB (M$_n$=31.6 kg/mol, Đ=1.16) showed a P$_r$ of ~0.95. The T$_c$=145.4° C., and T$_m$=175.8° C. were observed on DSC curve with the heating and cooling rate of 10° C./min, while it exhibited a T$_d$ 247° C. and a T$_{max}$ of 275° C.

Example 10. Copolymerization of rac-DL and meso-DL

The following illustrates a process for preparing a copolymer of rac-DL and meso-DL to provide a polymer of Formula II.

Scheme 18. The rin-opening polymerization of rac-DL and meso-DL by catalyst rac-4d.

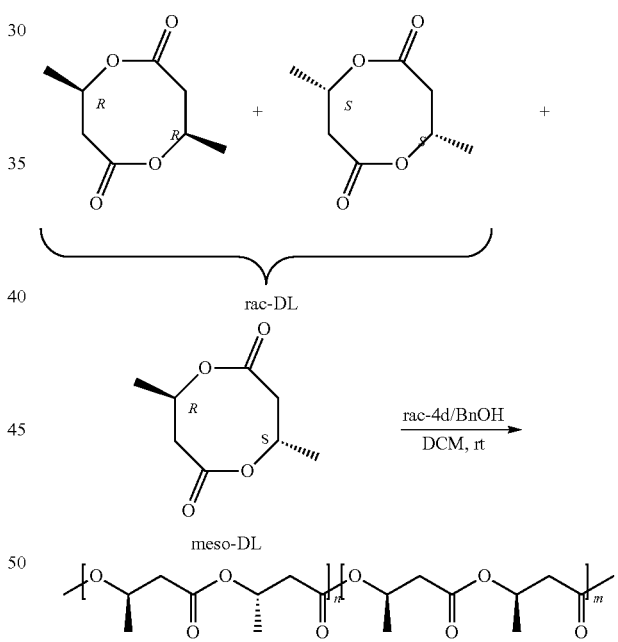

The copolymerization of rac-DL and meso-DL was performed in 5.5 mL glass reactors inside the inert glovebox at room temperature. The reactor was charged with rac-DL (69 mg, 0.4 mmol), meso-DL (69 mg, 0.4 mmol) and DCM (0.5 mL) in a glovebox, and the polymerization was started by rapid addition of the mixture of catalyst rac-4d (8.43 mg, 8 μmol) and BnOH (0.86 mg, 8 μmol) as an initiator in DCM (0.3 mL). After 35 min, the polymerization was immediately quenched by addition of 0.5 mL of benzoic acid/chloroform (10 mg/mL) and a 0.05 mL of aliquot was taken from the reaction mixture and prepared for $^1$H-NMR analysis to obtain the percent monomer conversion data (rac-DL: 100%; meso-DL: 100%). The quenched mixture was then precipitated into 50 mL of cold methanol while stirring, filtered, washed with cold methanol, and dried in a vacuum oven at room temperature overnight to a constant weight (129 mg). The resulting tapered isotactic-b-syndiotactic block P3HB ($M_n$=22.2 kg/mol, Đ=1.01) showed a $T_g$=1.3° C., and two $T_c$'s (68.7 and 86.7° C.), and two $T_m$'s (115.0 and 135.0° C.) on the DSC curve with the heating and cooling rate of 2° C./min, while it exhibited a $T_d$ 252° C. and a $T_{max}$ of 278° C.

Example 11. Copolymerization of rac-DL and ε-CL

The following illustrates a process for preparing a copolymer of rac-DL and ε-CL to provide a polymer of Formula IV.

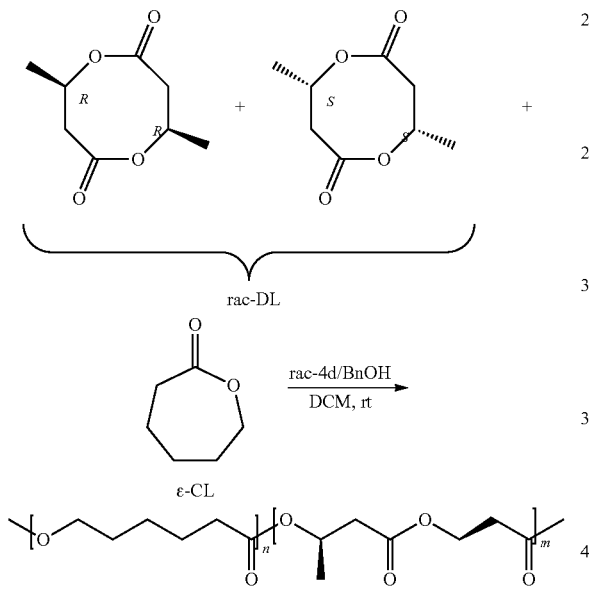

The copolymerization of rac-DL and ε-CL was performed in 5.5 mL glass reactors inside the inert glovebox at room temperature. The reactor was charged with rac-DL (138 mg, 0.8 mmol), ε-CL (91 mg, 0.8 mmol) and DCM (0.7 mL) in a glovebox, and the polymerization was started by rapid addition of the mixture of catalyst rac-4d (8.43 mg, 8 μmol) and BnOH (0.86 mg, 8 μmol) as an initiator in DCM (0.3 mL). After 25 min, the polymerization was immediately quenched by addition of 0.5 mL of benzoic acid/chloroform (10 mg/mL) and a 0.05 mL of aliquot was taken from the reaction mixture and prepared for $^1$H-NMR analysis to obtain the percent monomer conversion data (rac-DL: 100%; ε-CL: 100%). The quenched mixture was then precipitated into 80 mL of cold methanol while stirring, filtered, washed with cold methanol, and dried in a vacuum oven at room temperature overnight to a constant weight (198 mg). The resulting blocked copolymer P3HB-b-PCL ($M_n$=47.2 kg/mol, Đ=1.14) showed two $T_c$'s (10.9 and 55.5° C.), and two $T_m$s (54.2 and 161.2° C.) on DSC curve with the heating and cooling rate of 5° C./min, while it exhibited two onset degradation temperatures ($T_d$) (determined by the point of intersection of tangents to two branches of the thermogravimetric curve) of 256 and 374° C. and two maximum rate decomposition temperatures ($T_{max}$) of 279 and 403° C.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A copolymer comprising Formula II:

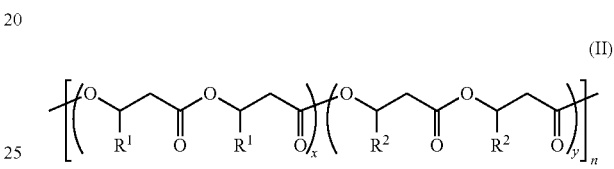

wherein:
x is 10 to about 100;
y is about 1 to about 100;
n is 10 to about 5,000;
each $R^1$ is ($C_1$-$C_{18}$)alkyl, ($C_1$-$C_8$)alkenyl, ($C_1$-$C_8$)alkynyl, benzyl, or aryl;
each $R^2$ is ($C_1$-$C_{18}$)alkyl, ($C_1$-$C_8$)alkenyl, ($C_1$-$C_8$)alkynyl, benzyl, or aryl;
the x block of Formula II comprises at least 95% isotactic triads with respect to the stereocenters of substituents $R^1$ on the polymer chain, wherein the at least 95% isotactic triads (mm) have consecutive (R) stereochemical configurations or consecutive (S) stereochemical configurations; and
the y block of Formula II comprises at least 95% isotactic triads with respect to the stereocenters of substituents $R^2$ on the polymer chain, wherein the at least 95% isotactic triads (mm) have consecutive (R) stereochemical configurations or consecutive (S) stereochemical configurations;
wherein the polymer of Formula II is an isotactic random copolymer.

2. A copolymer comprising Formula III:

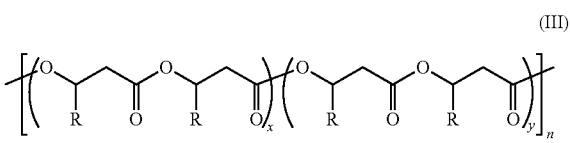

wherein:
x is 10 to about 5,000;
y is about 10 to about 5,000;
n is 10-50;
each R is ($C_1$-$C_{18}$)alkyl, ($C_1$-$C_8$)alkenyl, ($C_1$-$C_8$)alkynyl, benzyl, or aryl;
the x block of Formula III comprises at least 95% isotactic triads with respect to the stereocenters of substituents R on the polymer chain, wherein the at least 95% isotactic triads (mm) have consecutive (R) stereochemical configurations or consecutive (S) stereochemical configurations; and the y block of Formula III comprises consecutive R groups having (R) and (S) configurations, consecutive R groups having (S) and (R) configurations, or consecutive R groups having stereochemical configurations the opposite of the main stereochemical configuration of the x block;

wherein the polymer of Formula III is an isotactic-b-syndiotactic stereodiblock or stereotapered copolymer.

3. A copolymer comprising Formula IV:

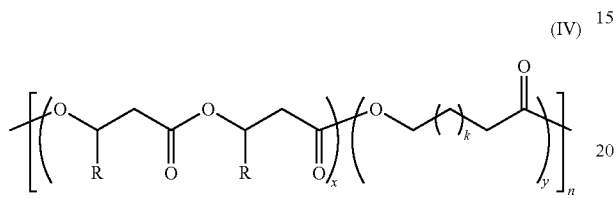

(IV)

wherein:
x is 10 to about 100;
y is about 1 to about 100;
k is about 1 to 16;
n is 10 to about 5,000;
R is $(C_1\text{-}C_{18})$alkyl, $(C_1\text{-}C_8)$alkenyl, $(C_1\text{-}C_8)$alkynyl, benzyl, or aryl; and the x block of Formula IV comprises at least 9500 isotactic triads with respect to the stereocenters of substituents R on the polymer chain, wherein the at least 9500 isotactic triads (mm) have consecutive (R) stereochemical configurations or consecutive (S) stereochemical configurations.

4. A method for preparing the copolymer according to claim 1 comprising:

contacting two or more monomers, an effective amount of a metal complex, and an alcohol initiator to initiate a ring opening polymerization reaction;

wherein:
the two or more monomers are monomers of Formula V-A and V-B:

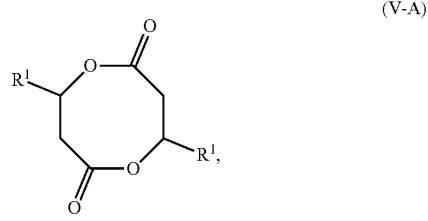

wherein $R^1$ and $R^2$ are as defined for Formula II; and the metal complex is a metal complex of Formula X:

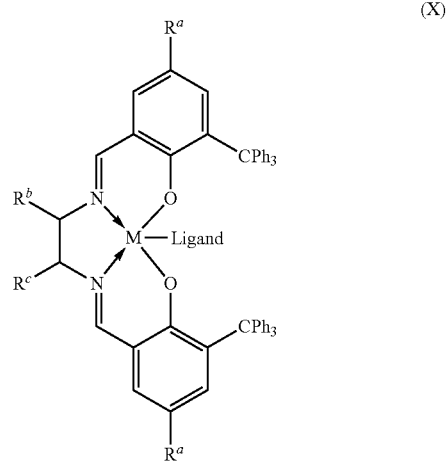

(X)

wherein:
M is Sc, Y, or a lanthanide(III) metal;
Ligand is —$OR^x$, —$NR^x_2$, or —$N(SiR^y_3)_2$, wherein $R^x$ is alkyl, and each $R^y$ is H or alkyl, wherein at least two $R^y$ groups are alkyl;
$R^a$ is H, alkyl, or phenyl; and
$R^b$ and $R^c$ are H, alkyl, or phenyl; or
$R^b$ and $R^c$ together with the carbon atoms to which they are attached form a 5, 6, 7, or 8 membered cycloalkyl group;
to thereby form an isotactic, syndiotactic, or isotactic-b-syndiotactic stereodiblock or stereotapered polymer of Formula II.

5. The method of claim 4 wherein the monomers of Formulas V-A and V-B comprise a mixture of meso and racemic diastereomers and the polymers formed are isotactic-b-syndiotactic stereodiblock or stereotapered polymers.

6. The method of claim 4 wherein the monomers of Formulas V-A and V-B comprise a mixture of racemic monomers wherein $R^1$ of Formula V-A is different than $R^2$ of Formula V-B, and the polymers formed are isotactic random copolymers.

7. The method of claim 4 wherein the monomers of Formulas V-A and V-B comprise a mixture of meso and racemic diastereomers and racemic monomers, and wherein $R^1$ of Formula V-A is different than $R^2$ of Formula V-B, and the polymers formed are isotactic-b-syndiotactic diblock copolymers or stereotapered copolymers.

8. A method for preparing an isotactic polymer of Formula I:

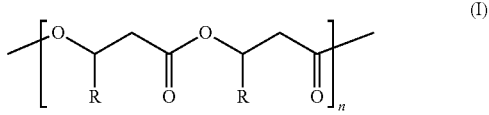

(I)

wherein:

n is about 10 to about 10,000;

R is $(C_1-C_{18})$alkyl, $(C_1-C_8)$alkenyl, $(C_1-C_8)$alkynyl, benzyl, or aryl; and Formula I comprises at least 95% isotactic triads with respect to the stereocenters of substituents R on the polymer chain, wherein the at least 95% isotactic triads (mm) have consecutive (R) stereochemical configurations or consecutive (S) stereochemical configurations;

the method comprising contacting one or more monomers, an effective amount of a metal complex, and an alcohol initiator to initiate a ring opening polymerization reaction;

wherein:

the monomer is a monomer of Formula V:

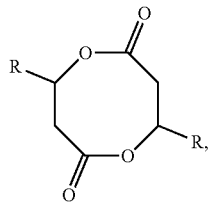

(V)

wherein R is as defined for Formula I; and the metal complex is a metal complex of Formula X:

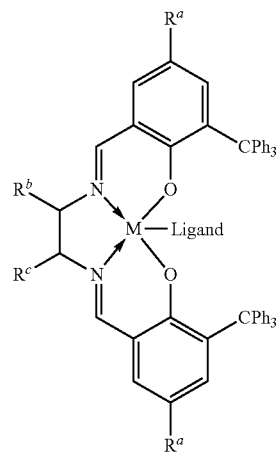

(X)

wherein:
M is Sc, Y, or a lanthanide metal;
Ligand is alkoxy, amide, or $-N(SiR^x_3)_2$ wherein each $R^x$ is H or alkyl, and at least two $R^x$ groups are alkyl;
$R^a$ is H, alkyl, or phenyl;
$R^b$ is alkyl or phenyl; and
$R^c$ is alkyl or phenyl; or
$R^b$ and $R^c$ together with the carbon atoms to which they are attached form a 5, 6, 7, or 8 membered cycloalkyl group;
to thereby form the isotactic polymer of Formula I.

9. The method of claim 8 wherein the monomer of Formula V is a racemic mixture, the metal complex of Formula X is a racemic mixture, and the polymers of Formula I formed are a mixture of highly isotactic (R) polymers and highly isotactic (S) polymers.

10. The method of claim 8 wherein the polymer of Formula I has a molecular weight $M_n$ of at least 40 kDa, a dispersity index of less than 1.2, and a melting temperature, $T_m$, of at least 171° C.

* * * * *

UNITED STATES PATENT AND TRADEMARK OFFICE
CERTIFICATE OF CORRECTION

PATENT NO. : 11,629,223 B2
APPLICATION NO. : 17/206400
DATED : April 18, 2023
INVENTOR(S) : Eugene Y. Chen et al.

Page 1 of 1

It is certified that error appears in the above-identified patent and that said Letters Patent is hereby corrected as shown below:

In the Claims

In Claim 3, at Column 59, Line 32, please delete "at least 9500" and insert -- at least 95% -- therefor.

In Claim 3, at Column 59, Line 35, please delete "least 9500" and insert -- least 95% -- therefor.

Signed and Sealed this
Twenty-third Day of May, 2023

Katherine Kelly Vidal
*Director of the United States Patent and Trademark Office*